US008205157B2

(12) United States Patent
Van Os et al.

(10) Patent No.: US 8,205,157 B2
(45) Date of Patent: Jun. 19, 2012

(54) METHODS AND GRAPHICAL USER INTERFACES FOR CONDUCTING SEARCHES ON A PORTABLE MULTIFUNCTION DEVICE

(75) Inventors: Marcel Van Os, San Francisco, CA (US); Stephen O. Lemay, San Francisco, CA (US); Paul D. Marcos, Los Altos, CA (US); Alexandre Aybes, San Francisco, CA (US); Scott Forstall, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 752 days.

(21) Appl. No.: 12/242,888

(22) Filed: Sep. 30, 2008

(65) Prior Publication Data

US 2009/0228825 A1 Sep. 10, 2009

Related U.S. Application Data

(60) Provisional application No. 61/033,785, filed on Mar. 4, 2008.

(51) Int. Cl.
*G06F 3/01* (2006.01)
*G06F 3/00* (2006.01)

(52) U.S. Cl. ........ 715/702; 715/710; 715/763; 715/766; 715/779; 715/780

(58) Field of Classification Search .................. 715/702, 715/763, 710, 766, 779, 780
See application file for complete search history.

(56) References Cited

U.S. PATENT DOCUMENTS

| | | | |
|---|---|---|---|
| 5,463,725 A | 10/1995 | Henckel et al. | |
| 5,495,566 A | 2/1996 | Kwatinetz | |
| 5,844,547 A | 12/1998 | Minakuchi et al. | |
| 5,867,158 A | 2/1999 | Murasaki et al. | |
| 5,924,090 A | 7/1999 | Krellenstein | 707/5 |
| 6,034,688 A | 3/2000 | Greenwood et al. | |
| 6,141,018 A | 10/2000 | Beri et al. | |
| 6,366,910 B1 | 4/2002 | Rajaraman et al. | 707/5 |

(Continued)

FOREIGN PATENT DOCUMENTS

AU 2007283771 A1 4/2007

(Continued)

OTHER PUBLICATIONS

Cheng et al., "Navigation Control and Gesture Recognition Input Device for Small, Portable User Interfaces," Synaptics Inc. of San Jose, California, pp. 1-13, 2004.

(Continued)

*Primary Examiner* — Nicholas Augustine
(74) *Attorney, Agent, or Firm* — Morgan, Lewis & Bockius LLP

(57) ABSTRACT

In accordance with some embodiments, a graphical user interface on a portable multifunction device with a touch screen display includes: an application interface of an application that includes an application interface region with an edge; and a search input area for entering a search query for the application. In response to detecting a movement of an object on or near the touch screen display, the application interface region is translated on the touch screen display in a first direction. In response to the edge of the application interface region being crossed while translating the application interface region in the first direction while the object is still detected on or near the touch screen display, the edge of the application interface region is displayed, and the search input area is displayed in an area beyond the application interface region.

34 Claims, 47 Drawing Sheets

U.S. PATENT DOCUMENTS

| | | | |
|---|---|---|---|
| 6,385,602 B1 | 5/2002 | Tso et al. | 707/3 |
| 6,434,556 B1 | 8/2002 | Levin et al. | 707/5 |
| 6,489,951 B1 | 12/2002 | Wong et al. | |
| 6,567,102 B2 | 5/2003 | Kung | |
| 6,661,409 B2 | 12/2003 | Demartines et al. | |
| 6,690,387 B2 | 2/2004 | Zimmerman et al. | |
| 6,707,449 B2 | 3/2004 | Hinckley et al. | |
| 6,809,724 B1 | 10/2004 | Shiraishi et al. | |
| 6,820,237 B1 | 11/2004 | Abu-Hakima et al. | |
| 6,847,977 B2 | 1/2005 | Abajian | 707/102 |
| 6,907,575 B2 | 6/2005 | Duarte | |
| 6,912,462 B2 | 6/2005 | Ogaki | |
| 6,972,776 B2 | 12/2005 | Davis et al. | |
| 6,975,306 B2 | 12/2005 | Hinckley et al. | |
| 7,009,599 B2 | 3/2006 | Pihlaja | |
| 7,046,230 B2 | 5/2006 | Zadesky et al. | |
| 7,075,512 B1 | 7/2006 | Fabre et al. | |
| 7,102,626 B2 | 9/2006 | Denny, III | |
| 7,152,210 B1 | 12/2006 | Van Den Hoven et al. | |
| 7,154,534 B2 | 12/2006 | Seki et al. | |
| 7,155,048 B2 | 12/2006 | Ohara | |
| 7,181,373 B2 | 2/2007 | Le Cocq et al. | |
| 7,185,088 B1 | 2/2007 | Joy et al. | 709/224 |
| 7,240,291 B2 | 7/2007 | Card et al. | |
| 7,290,223 B2 | 10/2007 | Decombe | 715/853 |
| 7,360,174 B2 | 4/2008 | Grossman et al. | 715/854 |
| 7,469,381 B2 * | 12/2008 | Ording | 715/702 |
| 2001/0028369 A1 | 10/2001 | Gallo et al. | |
| 2003/0095135 A1 | 5/2003 | Kaasila et al. | |
| 2003/0095697 A1 | 5/2003 | Wood et al. | |
| 2003/0184525 A1 | 10/2003 | Tsai | |
| 2004/0021676 A1 | 2/2004 | Chen et al. | |
| 2004/0027398 A1 | 2/2004 | Jaeger | |
| 2004/0080541 A1 | 4/2004 | Saiga et al. | |
| 2004/0109025 A1 | 6/2004 | Hullot et al. | |
| 2004/0155888 A1 | 8/2004 | Padgitt et al. | |
| 2004/0263486 A1 | 12/2004 | Seni | |
| 2005/0012723 A1 | 1/2005 | Pallakoff | |
| 2005/0122806 A1 | 6/2005 | Arakawa et al. | |
| 2005/0134578 A1 | 6/2005 | Chambers et al. | 345/184 |
| 2005/0145807 A1 | 7/2005 | Lapstun et al. | |
| 2005/0168488 A1 | 8/2005 | Montague | |
| 2005/0198588 A1 | 9/2005 | Lin et al. | |
| 2005/0237308 A1 | 10/2005 | Autio et al. | |
| 2005/0270269 A1 | 12/2005 | Tokkonen | |
| 2005/0275618 A1 | 12/2005 | Juh et al. | |
| 2005/0275636 A1 | 12/2005 | Dehlin et al. | |
| 2006/0004739 A1 | 1/2006 | Anthony et al. | 707/4 |
| 2006/0010400 A1 | 1/2006 | Dehlin et al. | |
| 2006/0025218 A1 | 2/2006 | Hotta | |
| 2006/0026521 A1 | 2/2006 | Hotelling et al. | |
| 2006/0048073 A1 | 3/2006 | Jarrett et al. | |
| 2006/0055669 A1 | 3/2006 | Das | |
| 2006/0061551 A1 | 3/2006 | Fateh | |
| 2006/0077544 A1 | 4/2006 | Stark | |
| 2006/0082549 A1 | 4/2006 | Hoshino et al. | |
| 2006/0094502 A1 | 5/2006 | Katayama et al. | |
| 2006/0156249 A1 | 7/2006 | Blythe et al. | |
| 2006/0181510 A1 | 8/2006 | Faith | |
| 2006/0187215 A1 | 8/2006 | Rosenberg et al. | |
| 2006/0197753 A1 | 9/2006 | Hotelling | |
| 2006/0238495 A1 | 10/2006 | Davis | |
| 2007/0008066 A1 | 1/2007 | Fukuda | |
| 2007/0024646 A1 | 2/2007 | Saarinen et al. | |
| 2007/0046646 A1 | 3/2007 | Kwon et al. | |
| 2007/0067745 A1 | 3/2007 | Choi et al. | |
| 2007/0109275 A1 | 5/2007 | Chuang | |
| 2007/0120835 A1 | 5/2007 | Sato | |
| 2007/0125860 A1 * | 6/2007 | Lapstun et al. | 235/462.01 |
| 2007/0150826 A1 | 6/2007 | Anzures et al. | |
| 2007/0150842 A1 | 6/2007 | Chaudhri et al. | |
| 2007/0152978 A1 | 7/2007 | Kocienda et al. | |
| 2007/0152979 A1 | 7/2007 | Jobs et al. | |
| 2007/0155434 A1 | 7/2007 | Jobs et al. | |
| 2007/0156364 A1 | 7/2007 | Rothkopf | |
| 2007/0262964 A1 | 11/2007 | Zotov et al. | |
| 2008/0104544 A1 | 5/2008 | Collins et al. | |
| 2008/0168382 A1 * | 7/2008 | Louch et al. | 715/781 |
| 2008/0282158 A1 * | 11/2008 | Aaltonen et al. | 715/700 |
| 2009/0007017 A1 | 1/2009 | Anzures et al. | |
| 2010/0153881 A1 * | 6/2010 | Dinn | 715/825 |

FOREIGN PATENT DOCUMENTS

| | | |
|---|---|---|
| CN | 1695105 A | 11/2005 |
| EP | 0 635 779 A1 | 1/1995 |
| EP | 0 701 220 A1 | 3/1996 |
| EP | 0 880 091 A2 | 11/1998 |
| JP | 02 140822 | 5/1990 |
| JP | 03 271976 | 12/1991 |
| WO | WO 98/48551 A2 | 10/1998 |
| WO | WO 02/01338 A1 | 1/2002 |
| WO | WO 03/060622 A2 | 7/2003 |
| WO | WO 2005/052773 A2 | 6/2005 |
| WO | WO 2006/003591 A2 | 1/2006 |
| WO | WO 2006/020305 A2 | 2/2006 |
| WO | WO 2006/045530 A2 | 5/2006 |

OTHER PUBLICATIONS

Hardy, E., "Apple Adds iTunes Wi-Fi Music Store to iPhone," Brighthand, Sep. 28, 2007, http://www.brighthand.com/printArticle.asp?newsID=13379.

iPhone Hacks, "iPhone Hackers Bring Contact and Calendar Search to iPhone," http://www.iphonehacks.com/2007/11/search-iphone.html.

PCWorld, "Apple Puts Wi-Fi in iPod Touch, Revamps Other iPods," Sep. 5, 2007, http://www.pcworld.com/printable/article/id,136850/printable.html.

PCWorld, "iPhone Fixes We Want to See," Jul. 31, 2007, http://www.pcworld.com/printable/article/id,135317/printable.html.

Polar Bear Farm, "About PBF Search," http://www.polarbearfarm.com/About_PBF_%22Search%22.html.

Rose, M., "Show Floor Video: Polar Bear Farm Demos iPhone Search Utility," Posted Jan. 18, 2008, http://www.tuaw.com/2008/01/18/show-floor-video-polar-bear-farm-demos-iphone-search-utility/.

IBM, "Scroll Control Box," IBM Technical Disclosure Bulletin, vol. 38, No. 04, Apr. 1993, pp. 399-403.

Microsoft Word 2003 Screen Shots, Microsoft 2003, 2 pages.

Miller, D., "Personal/Java Application Environment," Jun. 8, 1999, http://java.sun.com/products/personaljava/touchable/, 12 pages.

Photo Mesa 3.1.2 2006 Screen Shots, 5 pages.

Tidwell, J., "Magnetism," from Designing interfaces, Copyright© 2006 O'Reilly Media, Inc., pp. 279-280.

YouTube, "Steve Jobs—2007 iPhone Presentation (Part 1 of 2)," uploaded to YouTube by UG3genki Jan. 20, 2011, http/www.youtube.com/watch?v=6uW-E496FXg&feature=player_embedded, 3 pages.

Invitation to Pay Additional Fees dated Jul. 16, 2008, received in International Application No. PCT/US2008/050292, which corresponds to U.S. Appl. No. 11/956,969, 4 pages (Ording).

International Search Report and Written Opinion dated Sep. 19, 2008, received in International Application No. PCT/US2008/050292, which corresponds to U.S. Appl. No. 11/956,969, 25 pages (Ording).

European Search Report dated Nov. 29, 2011, received in European Patent Application No. 11182954.5, which corresponds to U.S. Appl. No. 11/956,969, 6 pages (Ording).

European Search Report dated Nov. 30, 2011, received in European Patent Application No. 11182959.4, which corresponds to U.S. Appl. No. 11/956,969, 7 pages (Ording).

European Search Report dated Dec. 1, 2011, received in European Patent Application No. 11182962.8, which corresponds to U.S. Appl. No. 11/956,960, 8 pages (Ordina).

European Search Report dated Dec. 1, 2011, received in European Patent Application No. 11182963.6, which corresponds to U.S. Appl. No. 11/956,969, 8 pages (Ording).

Examiner's Amendment dated Oct. 29, 2008, received in U.S. Appl. No. 11/956,969, 13 pages (Ording).

Notice of Allowance dated Oct. 29, 2008, U.S. Appl. No. 11/956,969, 5 pages (Ording).

Examiner's Report dated Feb. 19, 2009, received in Australian Patent Application No. 2008201540, which corresponds to U.S. Appl. No. 11/956,969, 2 pages (Ording).

Examiner's Report dated Jul. 15, 2009, received in Australian Patent Application No. 2008201540, which corresponds to U.S. Appl. No. 11/956,969, 2 pages (Ording).

Examiners's Report dated Jul. 1, 2009, received in Australian Patent Application No. 2008201540, which corresponds to U.S. Appl. No. 11/956,969, 2 pages (Ording).

Examiner's Report dated Feb. 11, 2009, received in Australian Patent Application No. 209200366, which corresponds to U.S. Appl. No. 11/956,969, 3 pages (Ording).

Notice of Acceptance dated Nov. 24, 2011, received in Austrial Patent Application No. 2009208099, which corresponds to U.S. Appl. No. 11/956,969, 3 pages (Ording).

Examiner's Report dated Apr. 8, 2010, received in Australian Patent Application No. 2009208103, which corresponds to U.S. Appl. No. 11/956,969, 2 pages (Ording).

Notice of Acceptance dated Apr. 14, 2011, received in Australian patent Application No. 2009208103, which corresponds to U.S. Appl. No. 11/956,969, 3 pages (Ording).

Notice of Acceptance dated Nov. 9, 2011, received in Australian Patent Application No. 2011201639, which corresponds to U.S Appl. No. 11/956,969, 3 pages (Ording).

Office Action dated Dec. 1, 2009, received in Canadian Patent Application No. 2,658,177, which corresponds to U.S. Appl. No. 11/956,969, 2 pages (Ording).

Office Action dated Jun. 22, 2011, received in Canadian Patent Application No. 2,658,177, which corresponds to U.S. Appl. No. 11/956,969, pages (Ording).

Office Action dated Nov. 23, 2010, received in Chinese Patent Application No. 200880000019.9, which corresponds to U.S. Appl. No. 11/956,969, 13 pages (Ording).

Office Action dated Jan. 5, 2012, received in 200880000019.9, which corresponds U.S. Appl. No. 11/956,969, 14 pages (Ording).

Office Action dated Oct. 29, 2010, received in German Patent Application No. DE 11 2008 000 144.8-53, which corresponds to U.S. Appl. No. 11/956,969, 5 pages (Ording).

Office Action dated Dec. 29, 2009, received in European Application No. 08 713 567.9, which corresponds to U.S. Appl. No. 11/956,969, 5 pages (Ording).

Decision to Grant dated Oct. 7, 2011, received in European Patent Application No. 08 713 567.9, which corresponds to U.S. Appl. No. 11/956,969, 1 page (Ording).

Office Action dated Feb. 2010, received in Japanese Patent Application No. 2009-544996, which corresponds to U.S. Appl. No. 11/956,969, 1 page (Ording).

Office Action dated Nov. 8, 2010, received in Japanese Patent Application No. 2009-544996, which corresponds to U.S. Appl. No. 11/956,969, 6 pages (Ording).

Japanese patent issued May 20, 2011, for Japanese patent application No. 2009-544996, which corresponds to U.S. Appl. No. 11/956,969, 1 page (Ording).

Office Action dated Aug. 27, 2009, received in Korean Patent Application No. 10-2009-7003574, which corresponds to U.S. Appl. No. 11/956,969, 1 page (Ording).

Office Action dated Apr. 4, 2011, U.S. Appl. No. 11/968,059, 46 pages, (Lamiraux).

Final Office action dated Oct. 31, 2011, received in U.S. Appl. No. 11/968,059, 30 pages (Lamiraux).

Notice of Allowance dated Mar. 14, 2012, received in U.S. Appl. No. 11/967,059, 42 pages (Lamiraux).

Office Action dated Dec. 28, 2009, received in European Patent Application No. 08 705 751.9, which corresponds to U.S. Appl. No. 11/968,059, 4 pages (Lamiraux).

Summons dated Oct. 28, 2011, received in European Patent Application No. 08705751.9, which corresponds to U.S. Appl. No. 11/968,059, 9 pages (Lamiraux).

Office Action dated Oct. 11, 2011, received in U.S. Appl. No. 12/270,805, 33 pages (Ording).

Office Action dated Oct. 11, 2011, received in U.S. Appl. No. 12/270,807, 32 pages (Ording).

Office Action dated Oct. 12, 2011, received in U.S. Appl. No. 12/270,810, 18 pages (Ording).

Office Action dated Oct. 13, 2011, received in U.S. Appl. No. 12/270,812, 18 pages (Ording).

Office Action dated Oct. 11, 2011, received in U.S. Appl. No. 12/270,815, 18 pages (Ording).

* cited by examiner

METHODS AND GRAPHICAL USER INTERFACES FOR CONDUCTING SEARCHES ON A PORTABLE MULTIFUNCTION DEVICE

RELATED APPLICATIONS

This application claims priority to U.S. Provisional Patent Application No. 61/033,785, "Methods and Graphical User Interfaces for Conducting Searches on a Portable Multifunction Device," filed Mar. 4, 2008, the content of which is hereby incorporated by reference in its entirety.

This application is related to the following applications: (1) U.S. patent application Ser. No. 10/188,182, "Touch Pad For Handheld Device," filed Jul. 1, 2002; (2) U.S. patent application Ser. No. 10/722,948, "Touch Pad For Handheld Device," filed Nov. 25, 2003; (3) U.S. patent application Ser. No. 10/643,256, "Movable Touch Pad With Added Functionality," filed Aug. 18, 2003; (4) U.S. patent application Ser. No. 10/654,108, "Ambidextrous Mouse," filed Sep. 2, 2003; (5) U.S. patent application Ser. No. 10/840,862, "Multipoint Touchscreen," filed May 6, 2004; (6) U.S. patent application Ser. No. 10/903,964, "Gestures For Touch Sensitive Input Devices," filed Jul. 30, 2004; (7) U.S. patent application Ser. No. 11/038,590, "Mode-Based Graphical User Interfaces For Touch Sensitive Input Devices" filed Jan. 18, 2005; (8) U.S. patent application Ser. No. 11/057,050, "Display Actuator," filed Feb. 11, 2005; (9) U.S. patent application Ser. No. 11/367,749, "Multi-Functional Hand-Held Device," filed Mar. 3, 2006; and (10) U.S. patent application Ser. No. 12/101,832, "Touch Screen Device, Method, and Graphical User Interface for Determining Commands by Applying Heuristics," filed Apr. 11, 2008. All of these applications are incorporated by reference herein in their entirety.

TECHNICAL FIELD

The disclosed embodiments relate generally to portable multifunction devices, and more particularly, to conducting searches on portable multifunction devices.

BACKGROUND

As portable electronic devices become more compact, and the number of functions performed by a given device increase, it has become a significant challenge to design a user interface that allows users to easily interact with a multifunction device. This challenge is particular significant for handheld portable devices, which have much smaller screens than desktop or laptop computers. This situation is unfortunate because the user interface is the gateway through which users receive not only content but also responses to user actions or behaviors, including user attempts to access a device's features, tools, and functions. Some portable communication devices (e.g., mobile telephones, sometimes called mobile phones, cell phones, cellular telephones, and the like) have resorted to adding more pushbuttons, increasing the density of push buttons, overloading the functions of pushbuttons, or using complex menu systems to allow a user to access, store and manipulate data. These conventional user interfaces often result in complicated key sequences and menu hierarchies that must be memorized by the user.

Many conventional user interfaces, such as those that include physical pushbuttons, are also inflexible. This is unfortunate because it may prevent a user interface from being configured and/or adapted by either an application running on the portable device or by users. When coupled with the time consuming requirement to memorize multiple key sequences and menu hierarchies, and the difficulty in activating a desired pushbutton, such inflexibility is frustrating to most users.

Some portable, multifunction electronic devices provide a number of user applications, such as email, contacts, and calendar applications. Due to limitations in the user interfaces of such devices, it is often challenging for users to search for items of interest within these applications. For example, it can be inconvenient to enter text, including search terms, using a phone-style keypad. Also, the search functionality, if any, provided on many of these devices is generally not well-integrated with the respective user applications. For instance, some multifunction devices require a user to enter search terms on a search form that is separate from the application in which a search is to be conducted, which provides very little user context or interactivity for user search term selection and/or entry.

In addition, given that many portable multifunction devices (such as smart phones) have limited memory, these devices generally store locally only a subset of the information associated with some applications, such as email. In one example, a smart phone might store in its local memory a hundred or fewer emails associated with a user email account that includes thousands of emails stored on a server. A user might want to search all of these emails, or just the ones stored locally, but the ability to selectively search application data stored in different locations is not generally provided on smart phones or other multifunction electronic devices.

Accordingly, there is a need for portable multifunction devices with more transparent and intuitive user interfaces for providing search functionality. Such interfaces increase the effectiveness, efficiency and user satisfaction with portable multifunction devices.

SUMMARY

The above deficiencies and other problems associated with user interfaces for portable devices are reduced or eliminated by the disclosed portable multifunction device. In some embodiments, the device has a touch-sensitive display (also known as a "touch screen") with a graphical user interface (GUI), one or more processors, memory and one or more modules, programs or sets of instructions stored in the memory for performing multiple functions. In some embodiments, the user interacts with the GUI primarily through finger contacts and gestures on the touch-sensitive display. In some embodiments, the functions may include telephoning, video conferencing, e-mailing, instant messaging, blogging, digital photographing, digital videoing, web browsing, digital music playing, and/or digital video playing (sometimes collectively referred to as digital media playing functions). In some embodiments, these functions are provided by one or more applications that execute on the device. In some embodiments, a search facility is provided that enables a user of the device to search for information associated with a variety of the above functions (or applications). The search facility can employ different attributes of a touch interface (including a touch screen) to facilitate intuitive user interaction with the search facility. In some embodiments, the search facility allows users to search different locations for information associated with a particular application, including locally (on the device), on a server, or on both locations simultaneously, or sequentially. Instructions for performing these functions, including the search facilities, may be included in a computer program product configured for execution by one or more processors.

In accordance with some embodiments, a computer-implemented method is performed at a portable multifunction device with a touch screen display. The computer-implemented method includes: detecting a movement of an object on or near the touch screen display while displaying an application interface of an application on the touch screen display; in response to detecting the movement of the object, translating an application interface region displayed on the touch screen display in a first direction; detecting an edge of the application interface region being crossed while translating the application interface region in the first direction while the object is still detected on or near the touch screen display; and, in response to the edge of the application interface region being crossed while translating the application interface region in the first direction while the object is still detected on or near the touch screen display, displaying the edge of the application interface region, and displaying a search input area in an area beyond the application interface region. The search input area is for entering a search query for the application.

In accordance with some embodiments, a graphical user interface on a portable multifunction device with a touch screen display includes: an application interface of an application that includes an application interface region with an edge; and a search input area for entering a search query for the application. In response to detecting a movement of an object on or near the touch screen display, the application interface region is translated on the touch screen display in a first direction. In response to the edge of the application interface region being crossed while translating the application interface region in the first direction while the object is still detected on or near the touch screen display, the edge of the application interface region is displayed, and the search input area is displayed in an area beyond the application interface region.

In accordance with some embodiments, a portable computing device includes: a touch screen display; one or more processors; memory; and one or more programs. The one or more programs are stored in the memory and configured to be executed by the one or more processors. The one or more programs include instructions for: detecting a movement of an object on or near the touch screen display while displaying an application interface of an application on the touch screen display; in response to detecting the movement of the object, translating an application interface region displayed on the touch screen display in a first direction; detecting an edge of the application interface region being crossed while translating the application interface region in the first direction while the object is still detected on or near the touch screen display; and, in response to the edge of the application interface region being crossed while translating the application interface region in the first direction while the object is still detected on or near the touch screen display, displaying the edge of the application interface region, and displaying a search input area in an area beyond the application interface region. The search input area is for entering a search query for the application.

In accordance with some embodiments, a computer readable storage medium has stored therein instructions, which when executed by a portable multifunction device with a touch screen display, cause the portable multifunction device to: detect a movement of an object on or near the touch screen display while displaying an application interface of an application on the touch screen display; in response to detecting the movement of the object, translate an application interface region displayed on the touch screen display in a first direction; detect an edge of the application interface region being crossed while translating the application interface region in the first direction while the object is still detected on or near the touch screen display; and, in response to the edge of the application interface region being crossed while translating the application interface region in the first direction while the object is still detected on or near the touch screen display, display the edge of the application interface region, and display a search input area in an area beyond the application interface region. The search input area is for entering a search query for the application.

In accordance with some embodiments, a portable multifunction device with a touch screen display includes: means for detecting a movement of an object on or near the touch screen display while displaying an application interface of an application on the touch screen display; means for, in response to detecting the movement of the object, translating an application interface region displayed on the touch screen display in a first direction; means for detecting an edge of the application interface region being crossed while translating the application interface region in the first direction while the object is still detected on or near the touch screen display; and means for, in response to the edge of the application interface region being crossed while translating the application interface region in the first direction while the object is still detected on or near the touch screen display, displaying the edge of the application interface region, and displaying a search input area in an area beyond the application interface region. The search input area is for entering a search query for the application.

In accordance with some embodiments, a portable computing device includes: one or more processors; a touch screen display; and memory storing a plurality of applications, including email, calendar, and contacts applications. The memory stores respective search input interfaces for the email, calendar, and contacts applications. Each search input interface is for entering a search query for the respective application. Each of the email, calendar, and contacts applications having an application interface region for simultaneous display with the corresponding search input interface.

In accordance with some embodiments, a computer-implemented method is performed at a portable multifunction device with a display. The computer-implemented method includes: displaying an application on the display; while displaying the application, entering a search mode for the application; while in the search mode for the application, receiving a search query for the application; displaying the search query in a search input area on the display; and, in response to receiving the search query: performing a search within the application for fields of application records with field values that include the search query, and displaying a list of search results. Each search result in the displayed list of search results corresponds to a unique combination of field and field value that includes the search query. At least one of the search results corresponds to a plurality of application records that match the search query. The computer-implemented method further includes: detecting selection of a particular search result in the list of search results, the particular search result corresponding to a particular field value in a particular field; and, in response to detecting selection of the particular search result in the list of search results: replacing display of the list of search results with display of a list of record descriptors for application records that have the particular field value in the particular field if more than one application record has the particular field value in the particular field, and replacing display of the list of search results with display of an application record that has the particular field value in the particular field if only one application record has the particular field value in the particular field.

In accordance with some embodiments, a portable multifunction device includes: a display; one or more processors; memory; and one or more programs. The one or more programs are stored in the memory and configured to be executed by the one or more processors. The one or more programs include instructions for: displaying an application on the display; while displaying the application, entering a search mode for the application; while in the search mode for the application, receiving a search query for the application; displaying the search query in a search input area on the display; and, in response to receiving the search query: performing a search within the application for fields of application records with field values that include the search query, and displaying a list of search results. Each search result in the displayed list of search results corresponds to a unique combination of field and field value that includes the search query. At least one of the search results corresponds to a plurality of application records that match the search query. The one or more programs further include instructions for: detecting selection of a particular search result in the list of search results, the particular search result corresponding to a particular field value in a particular field; and, in response to detecting selection of the particular search result in the list of search results: replacing display of the list of search results with display of a list of record descriptors for application records that have the particular field value in the particular field if more than one application record has the particular field value in the particular field, and replacing display of the list of search results with display of an application record that has the particular field value in the particular field if only one application record has the particular field value in the particular field.

In accordance with some embodiments, a computer readable storage medium has stored therein instructions, which when executed by a portable multifunction device with a display, cause the portable multifunction device to: display an application on the display; while displaying the application, enter a search mode for the application; while in the search mode for the application, receive a search query for the application; display the search query in a search input area on the display; and, in response to receiving the search query: perform a search within the application for fields of application records with field values that include the search query, and display a list of search results. Each search result in the displayed list of search results corresponds to a unique combination of field and field value that includes the search query. At least one of the search results corresponds to a plurality of application records that match the search query. The instructions further cause the portable multifunction device to: detect selection of a particular search result in the list of search results, the particular search result corresponding to a particular field value in a particular field; and, in response to detecting selection of the particular search result in the list of search results: replace display of the list of search results with display of a list of record descriptors for application records that have the particular field value in the particular field if more than one application record has the particular field value in the particular field, and replace display of the list of search results with display of an application record that has the particular field value in the particular field if only one application record has the particular field value in the particular field.

In accordance with some embodiments, a portable multifunction device with a touch screen display includes: means for displaying an application on the display; while displaying the application, means for entering a search mode for the application; while in the search mode for the application, means for receiving a search query for the application; means for displaying the search query in a search input area on the display; and, in response to receiving the search query: means for performing a search within the application for fields of application records with field values that include the search query, and means for displaying a list of search results. Each search result in the displayed list of search results corresponds to a unique combination of field and field value that includes the search query. At least one of the search results corresponds to a plurality of application records that match the search query. The portable multifunction device further includes: means for detecting selection of a particular search result in the list of search results, the particular search result corresponding to a particular field value in a particular field; and, in response to detecting selection of the particular search result in the list of search results: means for replacing display of the list of search results with display of a list of record descriptors for application records that have the particular field value in the particular field if more than one application record has the particular field value in the particular field, and means for replacing display of the list of search results with display of an application record that has the particular field value in the particular field if only one application record has the particular field value in the particular field.

Thus, a portable multifunction device is provided with a more efficient and intuitive methods and user interfaces for conducting searches.

BRIEF DESCRIPTION OF THE DRAWINGS

For a better understanding of the aforementioned embodiments of the invention as well as additional embodiments thereof, reference should be made to the Description of Embodiments below, in conjunction with the following drawings in which like reference numerals refer to corresponding parts throughout the figures.

DESCRIPTION OF EMBODIMENTS

Figure 1A:
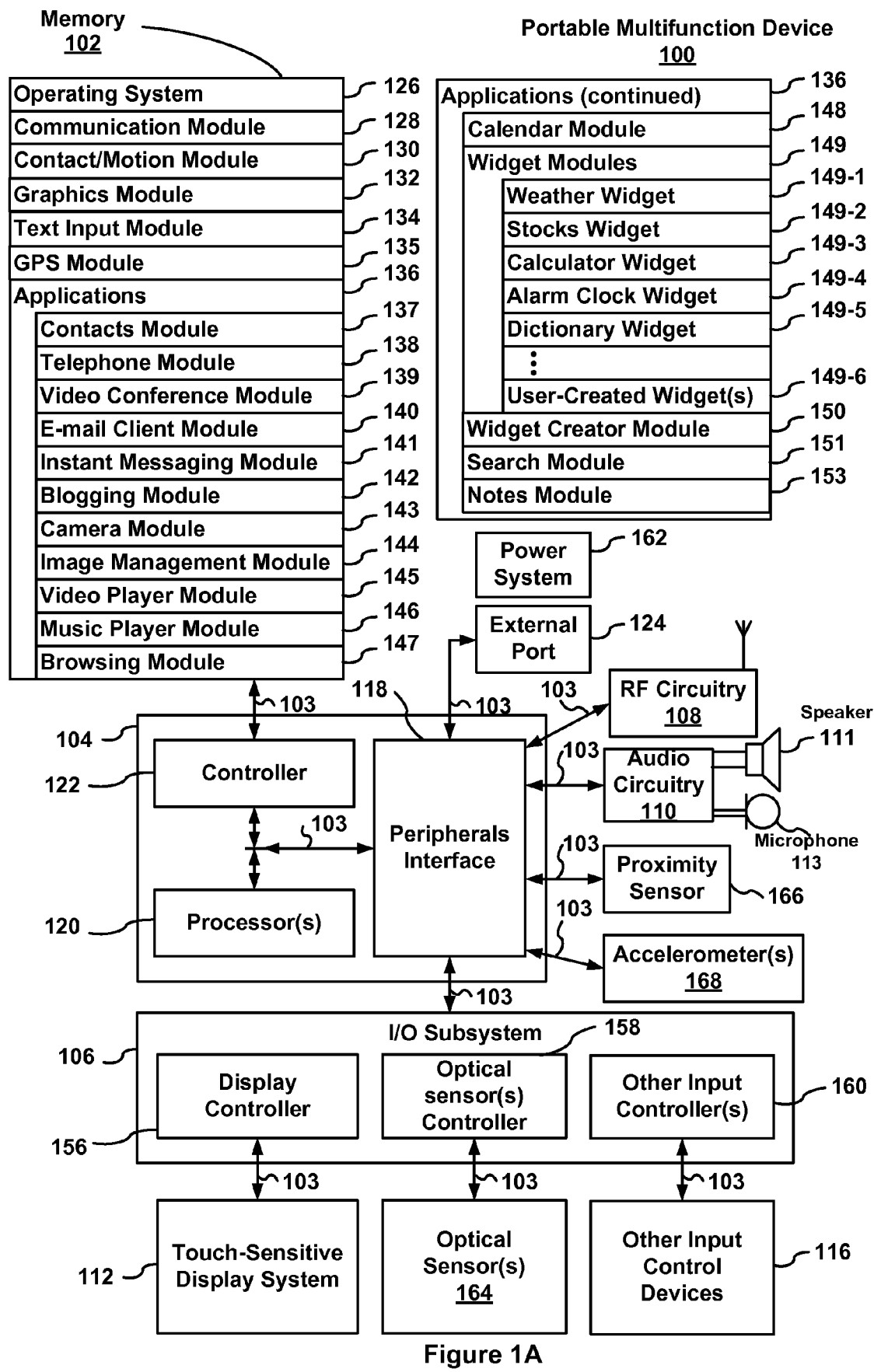
FIGS. 1A and 1B are block diagrams illustrating portable multifunction devices with touch-sensitive displays in accordance with some embodiments.

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first gesture could be termed a second gesture, and, similarly, a second gesture could be termed a first gesture, without departing from the scope of the present invention.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of a portable multifunction device, user interfaces for such devices, and associated processes for using such devices are described. In some embodiments, the device is a portable communications device such as a mobile telephone that also contains other functions, such as PDA and/or music player functions.

The user interface may include a physical click wheel in addition to a touch screen or a virtual click wheel displayed on the touch screen. A click wheel is a user-interface device that may provide navigation commands based on an angular displacement of the wheel or a point of contact with the wheel by a user of the device. A click wheel may also be used to provide a user command corresponding to selection of one or more items, for example, when the user of the device presses down on at least a portion of the wheel or the center of the wheel. Alternatively, breaking contact with a click wheel image on a touch screen surface may indicate a user command corresponding to selection. For simplicity, in the discussion that follows, a portable multifunction device that includes a touch screen is used as an exemplary embodiment. It should be understood, however, that some of the user interfaces and associated processes may be applied to other devices, such as personal computers and laptop computers that may include one or more other physical user-interface devices, such as a physical click wheel, a physical keyboard, a mouse and/or a joystick.

The device supports a variety of applications, such as one or more of the following: a telephone application, a video conferencing application, an e-mail application, an instant messaging application, a blogging application, a digital camera application, a digital video camera application, a web browsing application, a digital music player application, a digital video player application, a calendar application, a notes application, and a contacts application.

The various applications that may be executed on the device may use at least one common physical user-interface device, such as the touch screen. One or more functions of the touch screen as well as corresponding information displayed on the device may be adjusted and/or varied from one application to the next and/or within a respective application. In this way, a common physical architecture (such as the touch screen) of the device may support the variety of applications with user interfaces that are intuitive and transparent.

The user interfaces may include one or more soft keyboard embodiments. The soft keyboard embodiments may include standard (QWERTY) and/or non-standard configurations of symbols on the displayed icons of the keyboard, such as those described in U.S. patent application Ser. No. 11/459,606, "Keyboards For Portable Electronic Devices," filed Jul. 24, 2006, and Ser. No. 11/459,615, "Touch Screen Keyboards For Portable Electronic Devices," filed Jul. 24, 2006, the contents of which are hereby incorporated by reference in their entirety. The keyboard embodiments may include a reduced number of icons (or soft keys) relative to the number of keys in existing physical keyboards, such as that for a typewriter. This may make it easier for users to select one or more icons in the keyboard, and thus, one or more corresponding symbols. The keyboard embodiments may be adaptive. For example, displayed icons may be modified in accordance with user actions, such as selecting one or more icons and/or one or more corresponding symbols. One or more applications on the portable device may utilize common and/or different keyboard embodiments. Thus, the keyboard embodiment used may be tailored to at least some of the applications. In some embodiments, one or more keyboard embodiments may be tailored to a respective user. For example, one or more keyboard embodiments may be tailored to a respective user based on a word usage history (lexicography, slang, individual usage) of the respective user. Some of the keyboard embodiments may be adjusted to reduce a probability of a user error when selecting one or more icons, and thus one or more symbols, when using the soft keyboard embodiments.

Figure 1B:
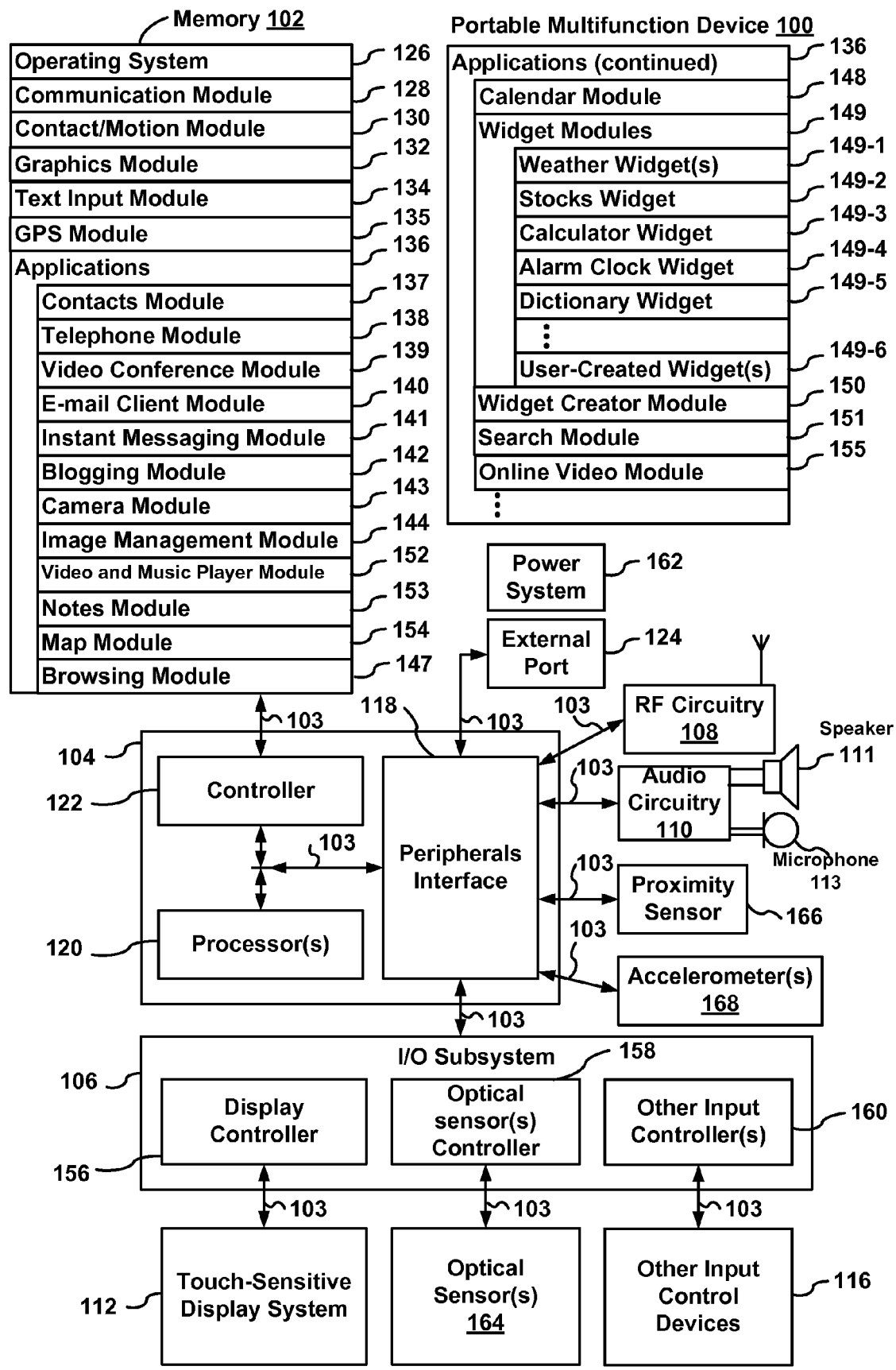

Attention is now directed towards embodiments of the device. FIGS. 1A and 1B are block diagrams illustrating portable multifunction devices 100 with touch-sensitive displays 112 in accordance with some embodiments. The touch-sensitive display 112 is sometimes called a "touch screen" for convenience, and may also be known as or called a touch-sensitive display system. The device 100 may include a memory 102 (which may include one or more computer readable storage mediums), a memory controller 122, one or more processing units (CPU's) 120, a peripherals interface 118, RF circuitry 108, audio circuitry 110, a speaker 111, a microphone 113, an input/output (I/O) subsystem 106, other input or control devices 116, and an external port 124. The device 100 may include one or more optical sensors 164. These components may communicate over one or more communication buses or signal lines 103.

It should be appreciated that the device 100 is only one example of a portable multifunction device 100, and that the device 100 may have more or fewer components than shown, may combine two or more components, or a may have a different configuration or arrangement of the components. The various components shown in FIGS. 1A and 1B may be implemented in hardware, software or a combination of both hardware and software, including one or more signal processing and/or application specific integrated circuits.

Memory 102 may include high-speed random access memory and may also include non-volatile memory, such as one or more magnetic disk storage devices, flash memory devices, or other non-volatile solid-state memory devices. Access to memory 102 by other components of the device 100, such as the CPU 120 and the peripherals interface 118, may be controlled by the memory controller 122.

The peripherals interface 118 couples the input and output peripherals of the device to the CPU 120 and memory 102. The one or more processors 120 run or execute various software programs and/or sets of instructions stored in memory 102 to perform various functions for the device 100 and to process data.

In some embodiments, the peripherals interface 118, the CPU 120, and the memory controller 122 may be implemented on a single chip, such as a chip 104. In some other embodiments, they may be implemented on separate chips.

The RF (radio frequency) circuitry 108 receives and sends RF signals, also called electromagnetic signals. The RF circuitry 108 converts electrical signals to/from electromagnetic signals and communicates with communications networks and other communications devices via the electromagnetic signals. The RF circuitry 108 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. The RF circuitry 108 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a plurality of communications standards, protocols and technologies, including but not limited to Global System for Mobile Communications (GSM), Enhanced Data GSM Environment (EDGE), high-speed downlink packet access (HSDPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for email (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), and/or Instant Messaging and Presence Service (IMPS)), and/or Short Message Service (SMS)), or any other suitable communication protocol, including communication protocols not yet developed as of the filing date of this document.

The audio circuitry 110, the speaker 111, and the microphone 113 provide an audio interface between a user and the device 100. The audio circuitry 110 receives audio data from the peripherals interface 118, converts the audio data to an electrical signal, and transmits the electrical signal to the speaker 111. The speaker 111 converts the electrical signal to human-audible sound waves. The audio circuitry 110 also receives electrical signals converted by the microphone 113 from sound waves. The audio circuitry 110 converts the electrical signal to audio data and transmits the audio data to the peripherals interface 118 for processing. Audio data may be retrieved from and/or transmitted to memory 102 and/or the RF circuitry 108 by the peripherals interface 118. In some embodiments, the audio circuitry 110 also includes a headset jack (e.g. 212, FIG. 2). The headset jack provides an interface between the audio circuitry 110 and removable audio input/output peripherals, such as output-only headphones or a headset with both output (e.g., a headphone for one or both ears) and input (e.g., a microphone).

The I/O subsystem 106 couples input/output peripherals on the device 100, such as the touch screen 112 and other input/control devices 116, to the peripherals interface 118. The I/O subsystem 106 may include a display controller 156 and one or more input controllers 160 for other input or control devices. The one or more input controllers 160 receive/send electrical signals from/to other input or control devices 116. The other input/control devices 116 may include physical buttons (e.g., push buttons, rocker buttons, etc.), dials, slider switches, joysticks, click wheels, and so forth. In some alternate embodiments, input controller(s) 160 may be coupled to any (or none) of the following: a keyboard, infrared port, USB port, and a pointer device such as a mouse. The one or more buttons (e.g., 208, FIG. 2) may include an up/down button for volume control of the speaker 111 and/or the microphone 113. The one or more buttons may include a push button (e.g., 206, FIG. 2). A quick press of the push button may disengage a lock of the touch screen 112 or begin a process that uses gestures on the touch screen to unlock the device, as described in U.S. patent application Ser. No. 11/322,549, "Unlocking a Device by Performing Gestures on an Unlock Image," filed Dec. 23, 2005, which is hereby incorporated by reference in its entirety. A longer press of the push button (e.g., 206) may turn power to the device 100 on or off. The user may be able to customize a functionality of one or more of the buttons. The touch screen 112 is used to implement virtual or soft buttons and one or more soft keyboards.

The touch-sensitive touch screen 112 provides an input interface and an output interface between the device and a user. The display controller 156 receives and/or sends electrical signals from/to the touch screen 112. The touch screen 112 displays visual output to the user. The visual output may include graphics, text, icons, video, and any combination thereof (collectively termed "graphics"). In some embodiments, some or all of the visual output may correspond to user-interface objects, further details of which are described below.

A touch screen 112 has a touch-sensitive surface, sensor or set of sensors that accepts input from the user based on haptic and/or tactile contact. The touch screen 112 and the display controller 156 (along with any associated modules and/or sets of instructions in memory 102) detect contact (and any movement or breaking of the contact) on the touch screen 112 and converts the detected contact into interaction with user-interface objects (e.g., one or more soft keys, icons, web pages or images) that are displayed on the touch screen. In an exemplary embodiment, a point of contact between a touch screen 112 and the user corresponds to a finger of the user.

The touch screen 112 may use LCD (liquid crystal display) technology, or LPD (light emitting polymer display) technology, although other display technologies may be used in other embodiments. The touch screen 112 and the display controller 156 may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with a touch screen 112.

A touch-sensitive display in some embodiments of the touch screen 112 may be analogous to the multi-touch sensitive tablets described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, a touch screen 112 displays visual output from the portable device 100, whereas touch sensitive tablets do not provide visual output.

A touch-sensitive display in some embodiments of the touch screen 112 may be as described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

The touch screen 112 may have a resolution in excess of 100 dpi. In an exemplary embodiment, the touch screen has a resolution of approximately 160 dpi. The user may make contact with the touch screen 112 using any suitable object or appendage, such as a stylus, a finger, and so forth. In some embodiments, the user interface is designed to work primarily with finger-based contacts and gestures, which are much less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, the device 100 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from the touch screen 112 or an extension of the touch-sensitive surface formed by the touch screen.

In some embodiments, the device 100 may include a physical or virtual click wheel as an input control device 116. A user may navigate among and interact with one or more graphical objects (henceforth referred to as icons) displayed in the touch screen 112 by rotating the click wheel or by moving a point of contact with the click wheel (e.g., where the amount of movement of the point of contact is measured by its angular displacement with respect to a center point of the click wheel). The click wheel may also be used to select one or more of the displayed icons. For example, the user may press down on at least a portion of the click wheel or an associated button. User commands and navigation commands provided by the user via the click wheel may be processed by an input controller 160 as well as one or more of the modules and/or sets of instructions in memory 102. For a virtual click wheel, the click wheel and click wheel controller may be part of the touch screen 112 and the display controller 156, respectively. For a virtual click wheel, the click wheel may be either an opaque or semitransparent object that appears and disappears on the touch screen display in response to user interaction with the device. In some embodiments, a virtual click wheel is displayed on the touch screen of a portable multifunction device and operated by user contact with the touch screen.

The device 100 also includes a power system 162 for powering the various components. The power system 162 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

The device 100 may also include one or more optical sensors 164. FIGS. 1A and 1B show an optical sensor coupled to an optical sensor controller 158 in I/O subsystem 106. The optical sensor 164 may include charge-coupled device (CCD) or complementary metal-oxide semiconductor (CMOS) phototransistors. The optical sensor 164 receives light from the environment, projected through one or more lens, and converts the light to data representing an image. In conjunction with an imaging module 143 (also called a camera module), the optical sensor 164 may capture still images or video. In some embodiments, an optical sensor is located on the back of the device 100, opposite the touch screen display 112 on the front of the device, so that the touch screen display may be used as a viewfinder for either still and/or video image acquisition. In some embodiments, an optical sensor is located on the front of the device so that the user's image may be obtained for videoconferencing while the user views the other video conference participants on the touch screen display. In some embodiments, the position of the optical sensor 164 can be changed by the user (e.g., by rotating the lens and the sensor in the device housing) so that a single optical sensor 164 may be used along with the touch screen display for both video conferencing and still and/or video image acquisition.

The device 100 may also include one or more proximity sensors 166. FIGS. 1A and 1B show a proximity sensor 166 coupled to the peripherals interface 118. Alternately, the proximity sensor 166 may be coupled to an input controller 160 in the I/O subsystem 106. The proximity sensor 166 may perform as described in U.S. patent application Ser. No. 11/241,839, "Proximity Detector In Handheld Device," filed Sep. 30, 3005; Ser. No. 11/240,788, "Proximity Detector In Handheld Device," filed Sep. 30, 3005; Ser. No. 11/620,702, "Using Ambient Light Sensor To Augment Proximity Sensor Output"; Ser. No. 11/586,862, "Automated Response To And Sensing Of User Activity In Portable Devices," filed Oct. 24, 2006; and Ser. No. 11/638,251, "Methods And Systems For Automatic Configuration Of Peripherals," which are hereby incorporated by reference in their entirety. In some embodiments, the proximity sensor turns off and disables the touch screen 112 when the multifunction device is placed near the user's ear (e.g., when the user is making a phone call). In some embodiments, the proximity sensor keeps the screen off when the device is in the user's pocket, purse, or other dark area to prevent unnecessary battery drainage when the device is a locked state.

The device 100 may also include one or more accelerometers 168. FIGS. 1A and 1B show an accelerometer 168 coupled to the peripherals interface 118. Alternately, the accelerometer 168 may be coupled to an input controller 160 in the I/O subsystem 106. The accelerometer 168 may perform as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are which are incorporated herein by reference in their entirety. In some embodiments, information is displayed on the touch screen display in a portrait view or a landscape view based on an analysis of data received from the one or more accelerometers.

In some embodiments, the software components stored in memory 102 may include an operating system 126, a communication module (or set of instructions) 128, a contact/motion module (or set of instructions) 130, a graphics module (or set of instructions) 132, a text input module (or set of instructions) 134, a Global Positioning System (GPS) module (or set of instructions) 135, and applications (or set of instructions) 136.

The operating system 126 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

The communication module 128 facilitates communication with other devices over one or more external ports 124 and also includes various software components for handling data received by the RF circuitry 108 and/or the external port 124. The external port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple Computer, Inc.) devices.

The contact/motion module 130 may detect contact with the touch screen 112 (in conjunction with the display controller 156) and other touch sensitive devices (e.g., a touchpad or physical click wheel). The contact/motion module 130 includes various software components for performing various operations related to detection of contact, such as determining if contact has occurred, determining if there is movement of the contact and tracking the movement across the touch screen 112, and determining if the contact has been broken (i.e., if the contact has ceased). Determining movement of the point of contact may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts). In some embodiments, the contact/motion module 130 and the display controller 156 also detects contact on a touchpad. In some embodiments, the contact/motion module 130 and the controller 160 detects contact on a click wheel.

The graphics module 132 includes various known software components for rendering and displaying graphics on the touch screen 112, including components for changing the intensity of graphics that are displayed. As used herein, the term "graphics" includes any object that can be displayed to a user, including without limitation text, web pages, icons (such as user-interface objects including soft keys), digital images, videos, animations and the like.

The text input module 134, which may be a component of graphics module 132, provides soft keyboards for entering text in various applications (e.g., contacts 137, e-mail 140, IM 141, blogging 142, browser 147, and any other application that needs text input).

The GPS module 135 determines the location of the device and provides this information for use in various applications (e.g., to telephone 138 for use in location-based dialing, to camera 143 and/or blogger 142 as picture/video metadata, and to applications that provide location-based services such as weather widgets, local yellow page widgets, and map/navigation widgets).

The applications 136 may include the following modules (or sets of instructions), or a subset or superset thereof:
- a contacts module 137 (sometimes called an address book or contact list);
- a telephone module 138;
- a video conferencing module 139;
- an e-mail client module 140;
- an instant messaging (IM) module 141;
- a blogging module 142;
- a camera module 143 for still and/or video images;
- an image management module 144;
- a video player module 145;
- a music player module 146;
- a browser module 147;
- a calendar module 148;
- widget modules 149, which may include weather widget 149-1, stocks widget 149-2, calculator widget 149-3, alarm clock widget 149-4, dictionary widget 149-5, and other widgets obtained by the user, as well as user-created widgets 149-6;
- widget creator module 150 for making user-created widgets 149-6;
- search module 151;
- video and music player module 152, which merges video player module 145 and music player module 146;
- notes module 153;
- map module 154; and/or
- online video module 155.

Examples of other applications 136 that may be stored in memory 102 include other word processing applications, JAVA-enabled applications, encryption, digital rights management, voice recognition, and voice replication.

In conjunction with touch screen 112, display controller 156, contact module 130, graphics module 132, and text input module 134, the contacts module 137 may be used to manage an address book or contact list, including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch screen 112, display controller 156, contact module 130, graphics module 132, and text input module 134, the telephone module 138 may be used to enter a sequence of characters corresponding to a telephone number, access one or more telephone numbers in the address book 137, modify a telephone number that has been entered, dial a respective telephone number, conduct a conversation and disconnect or hang up when the conversation is completed. As noted above, the wireless communication may use any of a plurality of communications standards, protocols and technologies.

In conjunction with RF circuitry 108, audio circuitry 110, speaker 111, microphone 113, touch screen 112, display controller 156, optical sensor 164, optical sensor controller 158, contact module 130, graphics module 132, text input module 134, contact list 137, and telephone module 138, the video-conferencing module 139 may be used to initiate, conduct, and terminate a video conference between a user and one or more other participants.

In conjunction with RF circuitry 108, touch screen 112, display controller 156, contact module 130, graphics module 132, and text input module 134, the e-mail client module 140 may be used to create, send, receive, and manage e-mail. In conjunction with image management module 144, the e-mail module 140 makes it very easy to create and send e-mails with still or video images taken with camera module 143.

In conjunction with RF circuitry 108, touch screen 112, display controller 156, contact module 130, graphics module 132, and text input module 134, the instant messaging module 141 may be used to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages and to view received instant messages. In some embodiments, transmitted and/or received instant messages may include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact module 130, graphics module 132, text input module 134, image management module 144, and browsing module 147, the blogging module 142 may be used to send text, still images, video, and/or other graphics to a blog (e.g., the user's blog).

In conjunction with touch screen 112, display controller 156, optical sensor(s) 164, optical sensor controller 158, contact module 130, graphics module 132, and image management module 144, the camera module 143 may be used to capture still images or video (including a video stream) and store them into memory 102, modify characteristics of a still image or video, or delete a still image or video from memory 102.

In conjunction with touch screen 112, display controller 156, contact module 130, graphics module 132, text input module 134, and camera module 143, the image management module 144 may be used to arrange, modify or otherwise manipulate, label, delete, present (e.g., in a digital slide show or album), and store still and/or video images.

In conjunction with touch screen 112, display controller 156, contact module 130, graphics module 132, audio circuitry 110, and speaker 111, the video player module 145 may be used to display, present or otherwise play back videos (e.g., on the touch screen or on an external, connected display via external port 124).

In conjunction with touch screen 112, display system controller 156, contact module 130, graphics module 132, audio circuitry 110, speaker 111, RF circuitry 108, and browser module 147, the music player module 146 allows the user to download and play back recorded music and other sound files stored in one or more file formats, such as MP3 or AAC files. In some embodiments, the device 100 may include the functionality of an MP3 player, such as an iPod (trademark of Apple Computer, Inc.).

In conjunction with RF circuitry 108, touch screen 112, display system controller 156, contact module 130, graphics module 132, and text input module 134, the browser module 147 may be used to browse the Internet, including searching, linking to, receiving, and displaying web pages or portions thereof, as well as attachments and other files linked to web pages.

In conjunction with RF circuitry 108, touch screen 112, display system controller 156, contact module 130, graphics module 132, text input module 134, e-mail module 140, and browser module 147, the calendar module 148 may be used to create, display, modify, and store calendars and data associated with calendars (e.g., calendar entries, to do lists, etc.).

In conjunction with RF circuitry 108, touch screen 112, display system controller 156, contact module 130, graphics module 132, text input module 134, and browser module 147, the widget modules 149 are mini-applications that may be downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display system controller 156, contact module 130, graphics module 132, text input module 134, and browser module 147, the widget creator module 150 may be used by a user to create widgets (e.g., turning a user-specified portion of a web page into a widget).

In conjunction with the touch screen 112, display system controller 156, contact module 130, graphics module 132, and text input module 134, the search module 151 may be used to search for text, music, sound, image, video, and/or other files in memory 102 that match one or more search criteria (e.g., one or more user-specified search terms), as described in more detail below. In some embodiments, the search module in conjunction with RF circuitry 108 may be used to send search queries to a remote server and receive corresponding search results. In some embodiments, the search functionality for a given application is part of search module 151. In some other embodiments, the search functionality for a given application is incorporated within the application, rather than being contained in a separate search module 151.

In conjunction with touch screen 112, display controller 156, contact module 130, graphics module 132, and text input module 134, the notes module 153 may be used to create and manage notes, to do lists, and the like.

In conjunction with RF circuitry 108, touch screen 112, display system controller 156, contact module 130, graphics module 132, text input module 134, GPS module 135, and browser module 147, the map module 154 may be used to receive, display, modify, and store maps and data associated with maps (e.g., driving directions; data on stores and other points of interest at or near a particular location; and other location-based data).

In conjunction with touch screen 112, display system controller 156, contact module 130, graphics module 132, audio circuitry 110, speaker 111, RF circuitry 108, text input module 134, e-mail client module 140, and browser module 147, the online video module 155 allows the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video.

Each of the above identified modules and applications correspond to a set of instructions for performing one or more functions described above. These modules (i.e., sets of instructions) need not be implemented as separate software programs, procedures or modules, and thus various subsets of these modules may be combined or otherwise re-arranged in various embodiments. For example, video player module 145 may be combined with music player module 146 into a single module (e.g., video and music player module 152, FIG. 1B). Similarly, as noted above, the search functionality for a given application may be part of the application, rather than part of a separate search module 151. In some embodiments, memory 102 may store a subset of the modules and data structures identified above. Furthermore, memory 102 may store additional modules and data structures not described above.

In some embodiments, the device 100 is a device where operation of a predefined set of functions on the device is performed exclusively through a touch screen 112 and/or a touchpad. By using a touch screen and/or a touchpad as the primary input/control device for operation of the device 100, the number of physical input/control devices (such as push buttons, dials, and the like) on the device 100 may be reduced.

The predefined set of functions that may be performed exclusively through a touch screen and/or a touchpad include navigation between user interfaces. In some embodiments, the touchpad, when touched by the user, navigates the device 100 to a main, home, or root menu from any user interface that may be displayed on the device 100. In such embodiments, the touchpad may be referred to as a "menu button." In some other embodiments, the menu button may be a physical push button or other physical input/control device instead of a touchpad.

Figure 2:
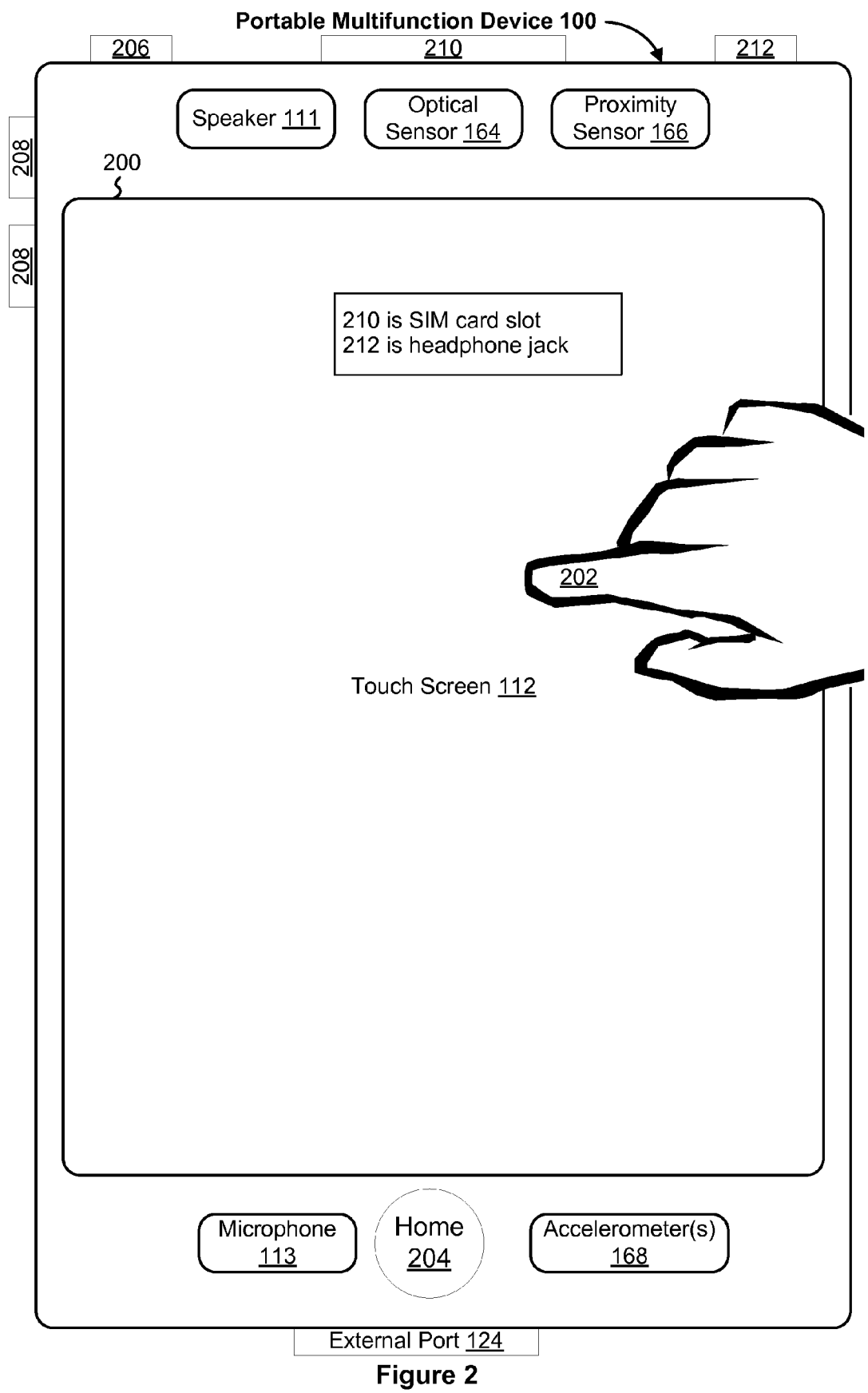
FIG. 2 illustrates a portable multifunction device having a touch screen in accordance with some embodiments.

FIG. 2 illustrates a portable multifunction device 100 having a touch screen 112 in accordance with some embodiments. The touch screen may display one or more graphics within user interface (UI) 200. In this embodiment, as well as others described below, a user may select one or more of the graphics by making contact or touching the graphics, for example, with one or more fingers 202 (not drawn to scale in the figure). In some embodiments, selection of one or more graphics occurs when the user breaks contact with the one or more graphics. In some embodiments, the contact may include a gesture, such as one or more taps, one or more swipes (from left to right, right to left, upward and/or downward) and/or a rolling of a finger (from right to left, left to right, upward and/or downward) that has made contact with the device 100. In some embodiments, inadvertent contact with a graphic may not select the graphic. For example, a swipe gesture that sweeps over an application icon may not select the corresponding application when the gesture corresponding to selection is a tap.

The device 100 may also include one or more physical buttons, such as "home" or menu button 204. As described previously, the menu button 204 may be used to navigate to any application 136 in a set of applications that may be executed on the device 100. Alternatively, in some embodiments, the menu button is implemented as a soft key in a GUI in touch screen 112.

In one embodiment, the device 100 includes a touch screen 112, a menu button 204, a push button 206 for powering the device on/off and locking the device, volume adjustment button(s) 208, a Subscriber Identity Module (SIM) card slot 210, a head set jack 212, and a docking/charging external port 124. The push button 206 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, the device 100 also may accept verbal input for activation or deactivation of some functions through the microphone 113.

Attention is now directed towards embodiments of user interfaces ("UI") and associated processes that may be implemented on a portable multifunction device 100.

Figure 3:
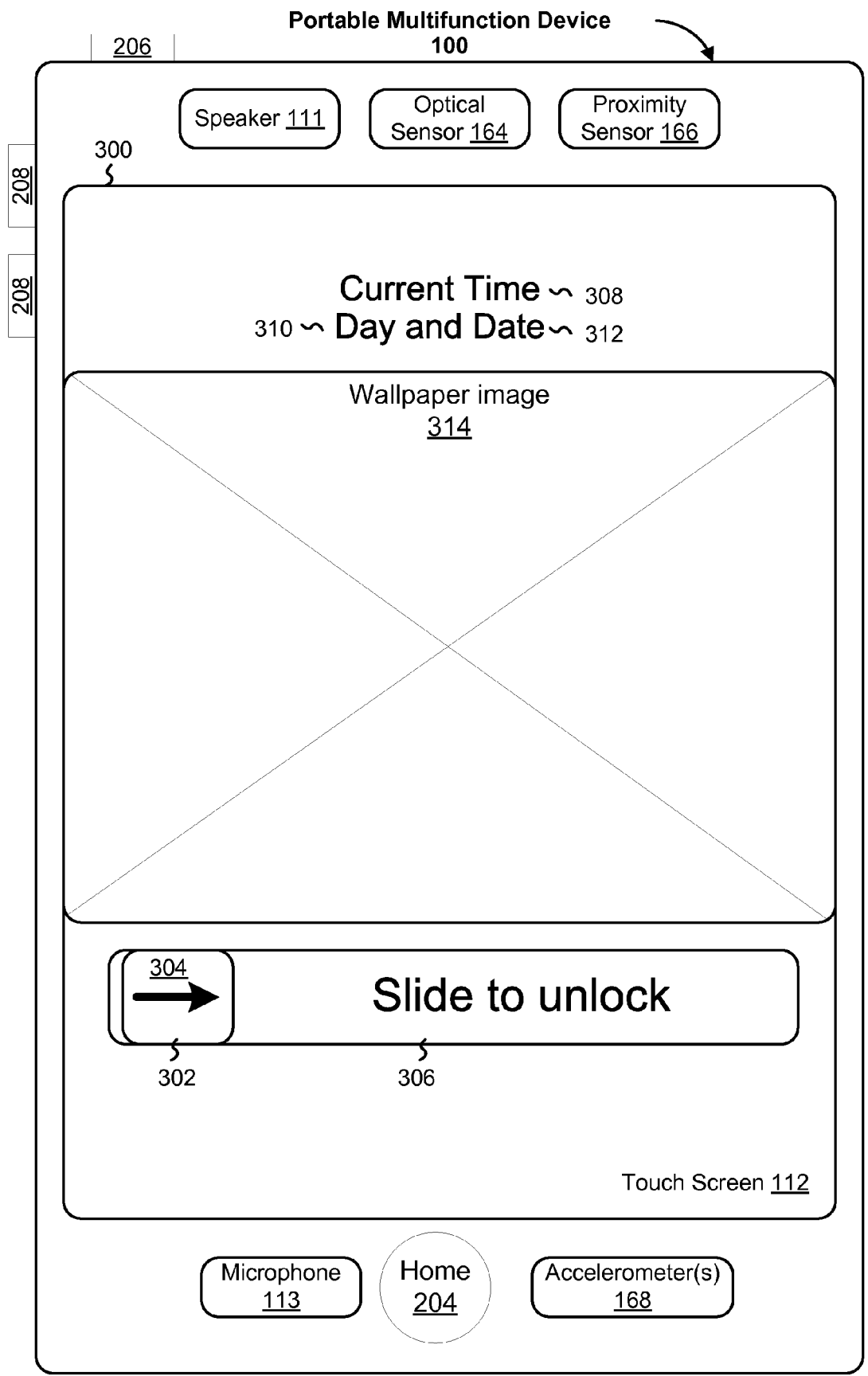
FIG. 3 illustrates an exemplary user interface for unlocking a portable electronic device in accordance with some embodiments.

FIG. 3 illustrates an exemplary user interface for unlocking a portable electronic device in accordance with some embodiments. In some embodiments, user interface 300 includes the following elements, or a subset or superset thereof:

Unlock image 302 that is moved with a finger gesture to unlock the device;

Arrow 304 that provides a visual cue to the unlock gesture;

Channel 306 that provides additional cues to the unlock gesture;

Time 308;

Day 310;

Date 312; and

Wallpaper image 314.

In some embodiments, the device detects contact with the touch-sensitive display (e.g., a user's finger making contact on or near the unlock image 302) while the device is in a user-interface lock state. The device moves the unlock image 302 in accordance with the contact. The device transitions to a user-interface unlock state if the detected contact corresponds to a predefined gesture, such as moving the unlock image across channel 306. Conversely, the device maintains the user-interface lock state if the detected contact does not correspond to the predefined gesture. As noted above, processes that use gestures on the touch screen to unlock the device are described in U.S. patent application Ser. No. 11/322,549, "Unlocking A Device By Performing Gestures On An Unlock Image," filed Dec. 23, 2005, and Ser. No. 11/322,550, "Indication Of Progress Towards Satisfaction Of A User Input Condition," filed Dec. 23, 2005, which are hereby incorporated by reference in their entirety.

Figure 4A:
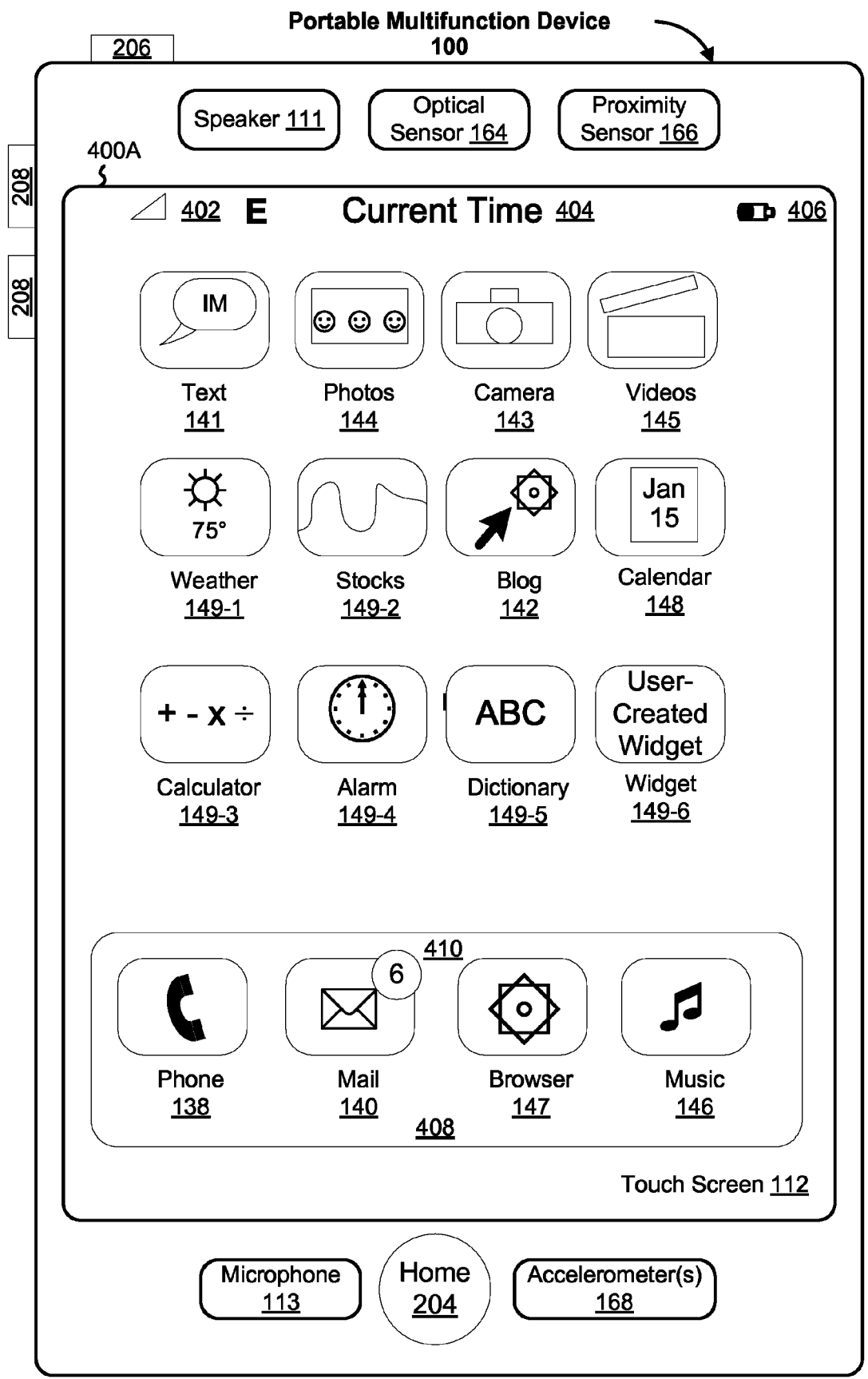
FIGS. 4A and 4B illustrate exemplary user interfaces for a menu of applications on a portable multifunction device in accordance with some embodiments.
Figure 4B:
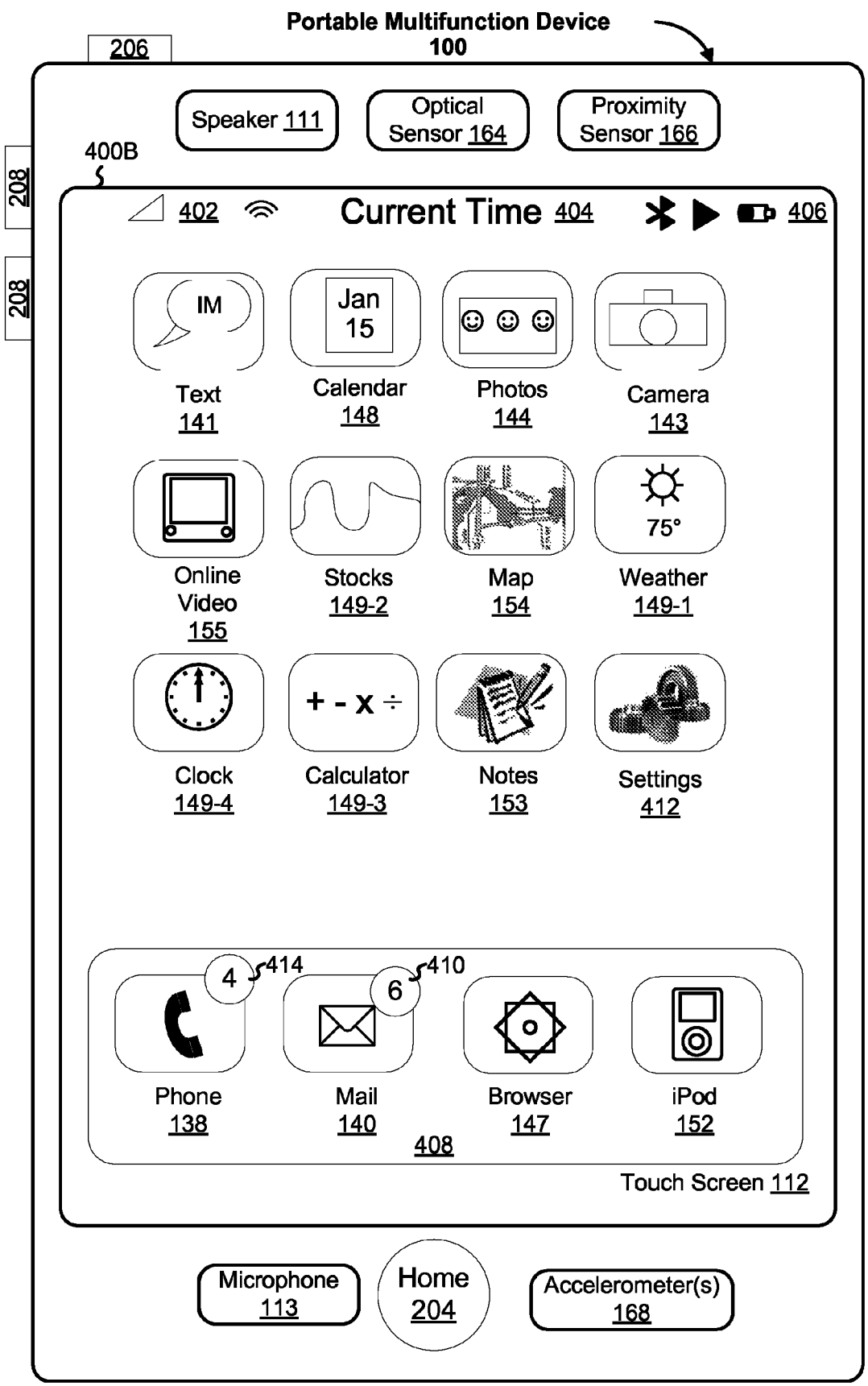

FIGS. 4A and 4B illustrate exemplary user interfaces for a menu of applications on a portable multifunction device in accordance with some embodiments. In some embodiments, user interface 400A includes the following elements, or a subset or superset thereof:

Signal strength indicator(s) 402 for wireless communication(s), such as cellular and Wi-Fi signals;

Time 404;

Battery status indicator 406;

Tray 408 with icons for frequently used applications, such as:

Phone 138, which may include an indicator 414 of the number of missed calls or voicemail messages;

E-mail client 140, which may include an indicator 410 of the number of unread e-mails;

Browser 147; and

Music player 146; and

Icons for other applications, such as:
IM 141;
Image management 144;
Camera 143;
Video player 145;
Weather 149-1;
Stocks 149-2;
Blog 142;
Calendar 148;
Calculator 149-3;
Alarm clock 149-4;
Dictionary 149-5; and
User-created widget 149-6.

In some embodiments, user interface 400B includes the following elements, or a subset or superset thereof:
- 402, 404, 406, 141, 148, 144, 143, 149-3, 149-2, 149-1, 149-4, 410, 414, 138, 140, and 147, as described above;
- Map 154;
- Notes 153;
- Settings 412, which provides access to settings for the device 100 and its various applications 136, as described further below;
- Video and music player module 152, also referred to as iPod (trademark of Apple Computer, Inc.) module 152; and
- Online video module 155, also referred to as YouTube (trademark of Google, Inc.) module 155.

In some embodiments, UI 400A or 400B displays all of the available applications 136 on one screen so that there is no need to scroll through a list of applications (e.g., via a scroll bar). In some embodiments, as the number of applications increase, the icons corresponding to the applications may decrease in size so that all applications may be displayed on a single screen without scrolling. In some embodiments, having all applications on one screen and a menu button enables a user to access any desired application with at most two inputs, such as activating the menu button 204 and then activating the desired application (e.g., by a tap or other finger gesture on the icon corresponding to the application).

In some embodiments, UI 400A or 400B provides integrated access to both widget-based applications and non-widget-based applications. In some embodiments, all of the widgets, whether user-created or not, are displayed in UI 400A or 400B. In other embodiments, activating the icon for user-created widget 149-6 may lead to another UI that contains the user-created widgets or icons corresponding to the user-created widgets.

In some embodiments, a user may rearrange the icons in UI 400A or 400B, e.g., using processes described in U.S. patent application Ser. No. 11/459,602, "Portable Electronic Device With Interface Reconfiguration Mode," filed Jul. 24, 2006, which is hereby incorporated by reference in its entirety. For example, a user may move application icons in and out of tray 408 using finger gestures.

In some embodiments, UI 400A or 400B includes a gauge (not shown) that displays an updated account usage metric for an account associated with usage of the device (e.g., a cellular phone account), as described in U.S. patent application Ser. No. 11/322,552, "Account Information Display For Portable Communication Device," filed Dec. 23, 2005, which is hereby incorporated by reference in its entirety.

FIGS. 5A-5I, 6A-6D, 7A-7H, 8A-8E, 9A-9H and 10A-10B illustrate exemplary user interfaces for searching a variety of application data in accordance with some embodiments. The user interfaces in these Figures are used to illustrate the processes described below with respect to FIGS. 11A-11C, and 12A-12B. These embodiments are described with reference to particular applications (e.g., email mailboxes, calendar entries, contacts, media files and instant messages); however, the described embodiments are only exemplary and do not preclude use of the inventions described herein to conduct searches within different software applications that can be implemented on a device 100. For example, the methods and user interfaces described herein may be used with some of the other applications 136 described with reference to FIGS. 1A and 1B.

User interfaces for searching data associated with an email application 140 (FIG. 1A) are now described with reference to FIG. 5A-5I.

Figure 5A:
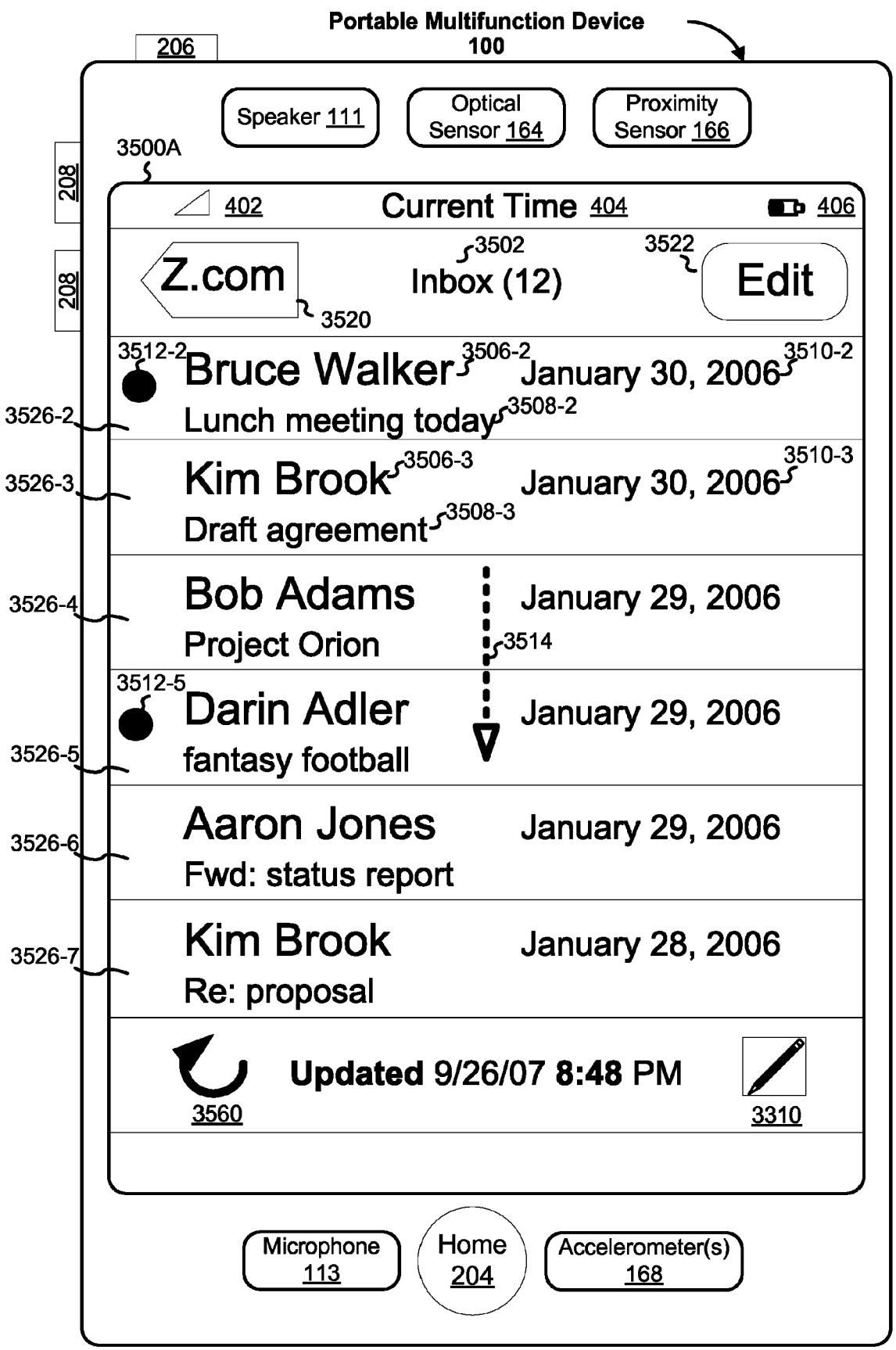
FIGS. 5A-5I illustrate exemplary user interfaces for a search facility for use with an email application in accordance with some embodiments.

As shown in FIG. 5A, an exemplary UI 3500A for an email application includes the following elements, or a subset or superset thereof:
- Elements 402, 404, 406, as described above.
- A UI heading 3502 that indicates the identity of the email mailbox (in this case, "Inbox") whose information is displayed on the UI 3500A; the heading also shows the number of unread messages (e.g., 12) in that mailbox.
- A "back" icon 3520 that indicates the name of the account for the inbox (e.g., "Z.com") that, when activated (e.g., by a finger tap on the icon 3520), initiates display of information related to that account. For example, in response to activation of the "back" icon 3520 shown in FIG. 5A, a set of folders in the user's email account at Z.com would be displayed, possibly including "Inbox," "Drafts," "Sent," "Trash," "Projects," etc.
- An "edit" icon 3522 ("Edit") that when activated (e.g., by a finger tap on the icon) initiates display of an edit interface in which a user can edit contents of a mailbox (e.g., to delete emails).
- A collection of email message descriptors 3526-i, each of which may include for a respective email message: the name of a sender 3506-i, a date 3510-i that indicates when the email was sent (or received), and a subject descriptor 3508-i (typically assigned by the sender). The email message descriptors 3526-i may also include a status icon 3512-i that, among other things, indicates whether an email is unread (shown here as a filled-in circle 3512-2, 3512-5), or has been selected for some further operation thereon. For example, the message 3536-2 sent by "Bruce Walker" 3506-2 on "Jan. 30, 2006" regarding the subject, "Lunch meeting today" 3508-2, is unread 3512-2. The contents and other information associated with a particular email with a displayed descriptor 3526-i is displayed in response to user selection of that particular message descriptor (e.g., in some embodiments, by a finger tap on the corresponding region of the UI 3500A).
- A refresh icon 3560 that when activated (e.g., by a finger tap on the icon) initiates a refresh of the email message descriptors 3526-i displayed in the inbox 3502.
- A compose icon 3310 that when activated (e.g., by a finger tap on the icon) initiates display of a compose window and on-screen keyboard interface to allow creation of a new email.

Figure 5B:
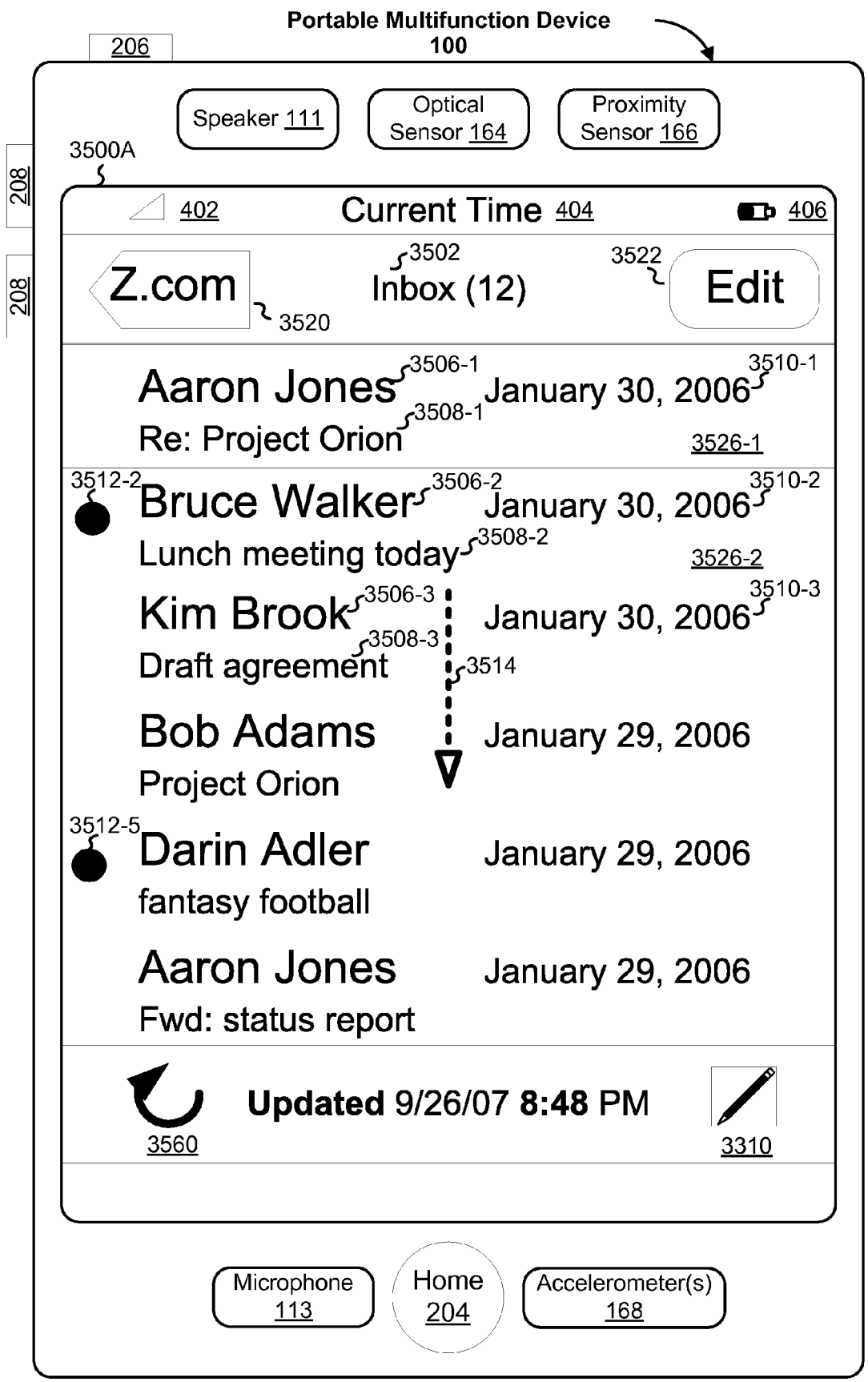

The UI 3500A typically shows information for a subset of the emails that are stored locally on the device 100. In some embodiments, additional emails that are not in view on the UI 3500A (i.e., emails than can't fit on the touch screen) may be displayed in response to a user scroll gesture 3514, which, in some embodiments, is executed as a downward or upward finger drag in contact with the UI 3500A. For example, referring to FIG. 5A, only some of the messages in the local inbox 3502 are displayed on the UI 3500A. FIG. 5B shows a different view of the same twelve messages displayed in response to detecting a user finger gesture scrolling downward through the list of email message descriptors 3526-*i*, thereby revealing an additional email descriptor 3526-1 at the top of the list of emails 3526-*i*. This descriptor 3526-1 corresponds to an email sent by "Aaron Jones" 3506-1 on "Jan. 30, 2006" 3510-1 regarding "Project Orion" 3508-1.

In other embodiments, different gestures may be used to accomplish the same purpose of scrolling through and displaying emails that are not currently in view on the UI 3500A. This scrolling functionality is generally present in all of the UIs described herein in FIGS. 5A-5I, 6A-6D, 7A-7H, 8A-8E, 9A-9H and 10A-10B.

Further information on operation of these elements and the functionality of an email application for use with a portable multifunction device 100 is disclosed in a pending U.S. patent application Ser. No. 11/850,630, "Email Client for a Portable Multifunction Device," filed Sep. 5, 2007, which is incorporated by reference herein in its entirety.

Figure 5C:
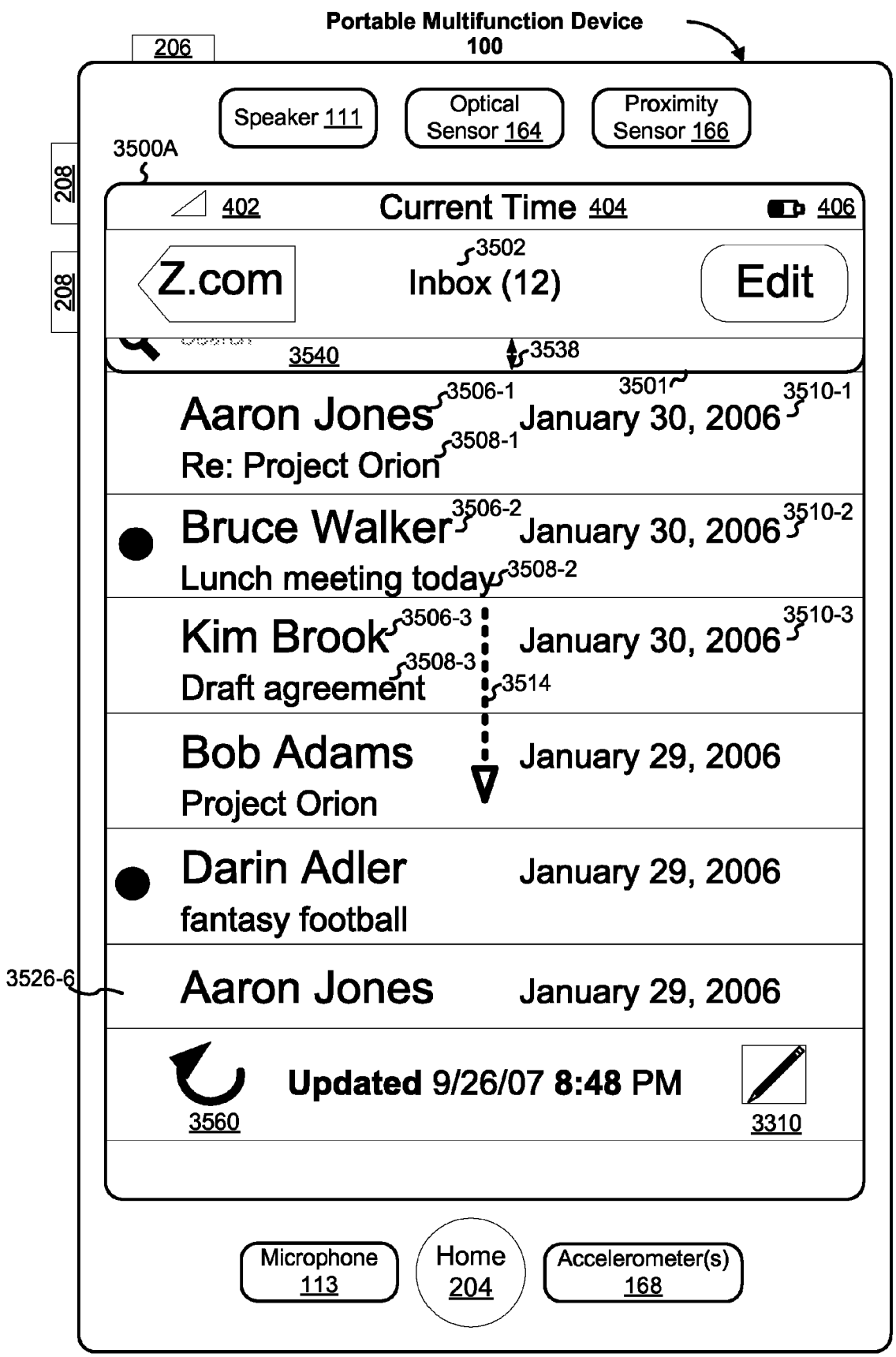

In some embodiments, in response to detecting a continuing downward scroll gesture 3514 after information for the top email in the list (e.g., the email descriptor 3526-1) is displayed in the UI 3500A, the device initiates display of a search input area 3540 (also called a search window) within the email application. FIG. 5C illustrates an exemplary appearance of the UI 3500A during the process of initiating display of a search input area 3540 in this manner. In some embodiments, in response to detecting the continued downward scroll gesture 3514, the device displays the lower portion 3538 of a search window 3540 (FIG. 5C) below the mailbox heading 3502 (in a manner similar to a drawer opening). At the same time, the email descriptors 3526-*i* visible on the UI 3500A begin to scroll down in concert with the scroll gesture 3514, resulting in the email descriptor 3526-6 becoming partially concealed as compared to FIG. 5B.

Figure 5D:
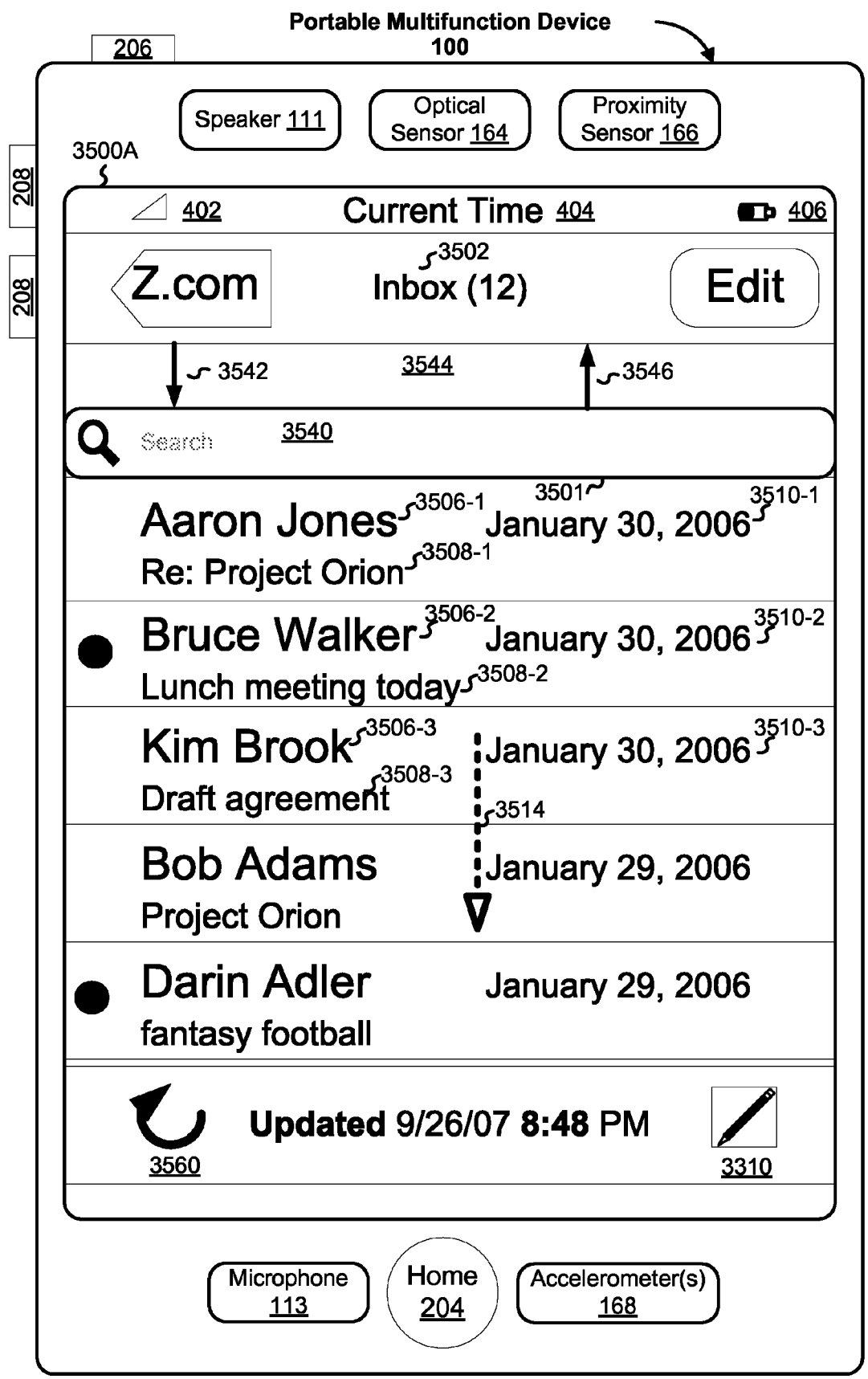
Figure 5E:
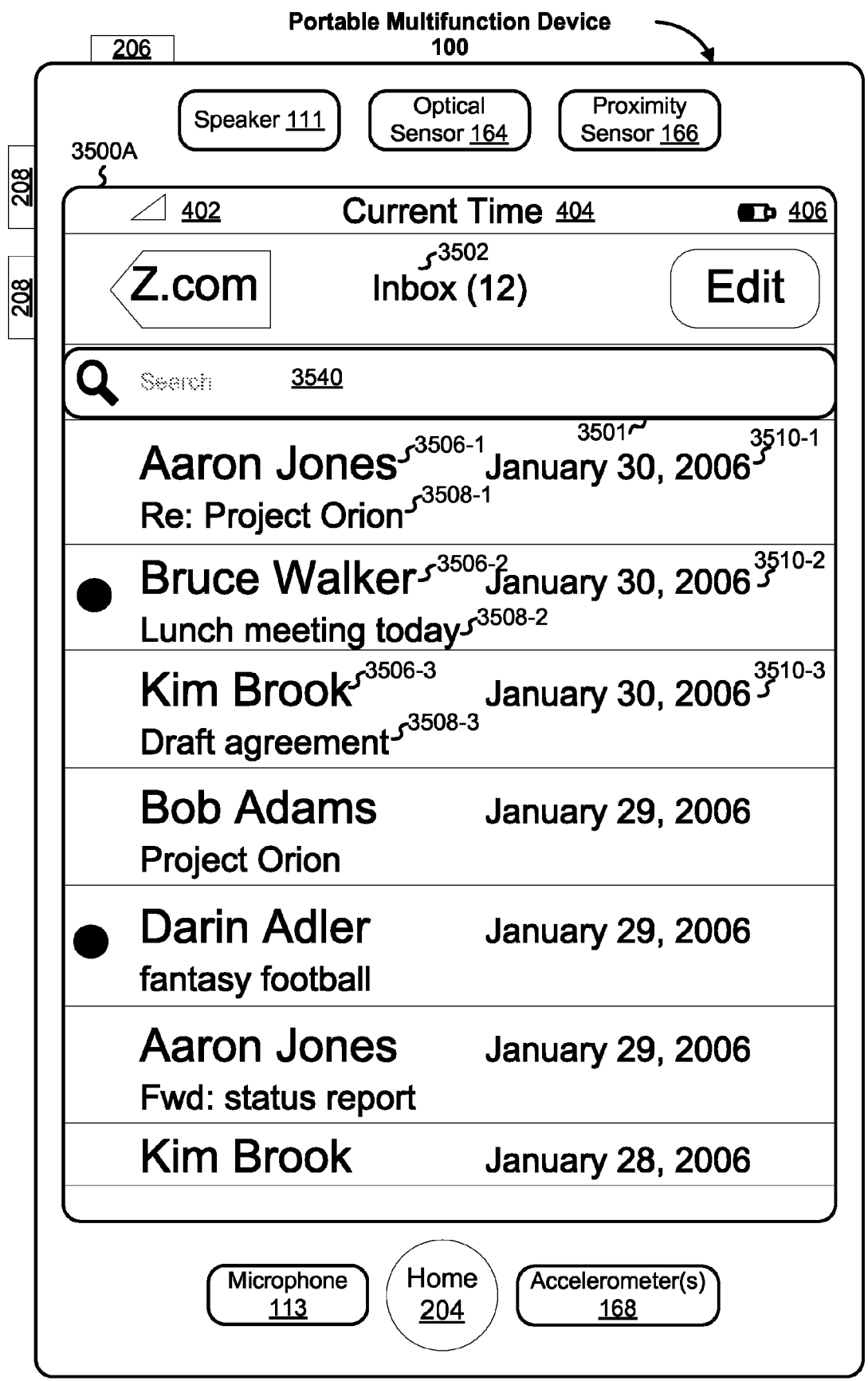

FIG. 5D illustrates further progress of the search input area display initiation operation begun in FIG. 5C. In FIG. 5D, the user has continued the downward scroll gesture 3514 until the search window 3540 is completely revealed 3542, with the result that the device shows a space 3544 above the search window. In some embodiments, the background of the UI 3500A shows in the space 3544 above the search window. In other embodiments, a different color/pattern from the background shows in the space 3544 above the search window. During this operation, the email descriptors 3526 continue to move in concert with the downward scroll gesture, with the result that the email descriptor 3526-6 is no longer visible on the UI 3500A. In response to detecting cessation of user contact with the UI 3500A (e.g., due to the user lifting the finger that is executing the downward scroll operation 3514), the device displays the search window 3540 and the email descriptors 3526 snapping back up 3546 towards the mailbox heading 3502 (in a UI operation that resembles a "rubber-band effect"). FIG. 5E shows the UI 3500A after the completion of the rubber-band effect illustrated in FIG. 5D. In this figure, the search window 3540 is in its final, user-operable position adjacent to the Inbox heading 3502.

The foregoing describes one possible way in which the device 100 may initiate display of a search input area within an application (e.g., in response to detecting a finger gesture that scrolls down past the top of a list of items displayed in the application). In other embodiments, the device 100 may initiate display of a search input area within an application by detecting activation of a search icon that is provided on an application view, detecting another predetermined "search" gesture on the touch screen, or detecting a physical gesture with the entire device 100 (such as shaking the device) with the accelerometer 168 and interpreting the physical gesture in predetermined contexts as a request to initiate display of a search input area. All such different embodiments, and any combinations thereof, are ways in which the device can initiate display of a search input area within an application. Using any of these different embodiments, including the embodiment described in reference to FIGS. 5A-5I, a search window is opened in which a user is able to specify search terms.

Figure 5F:
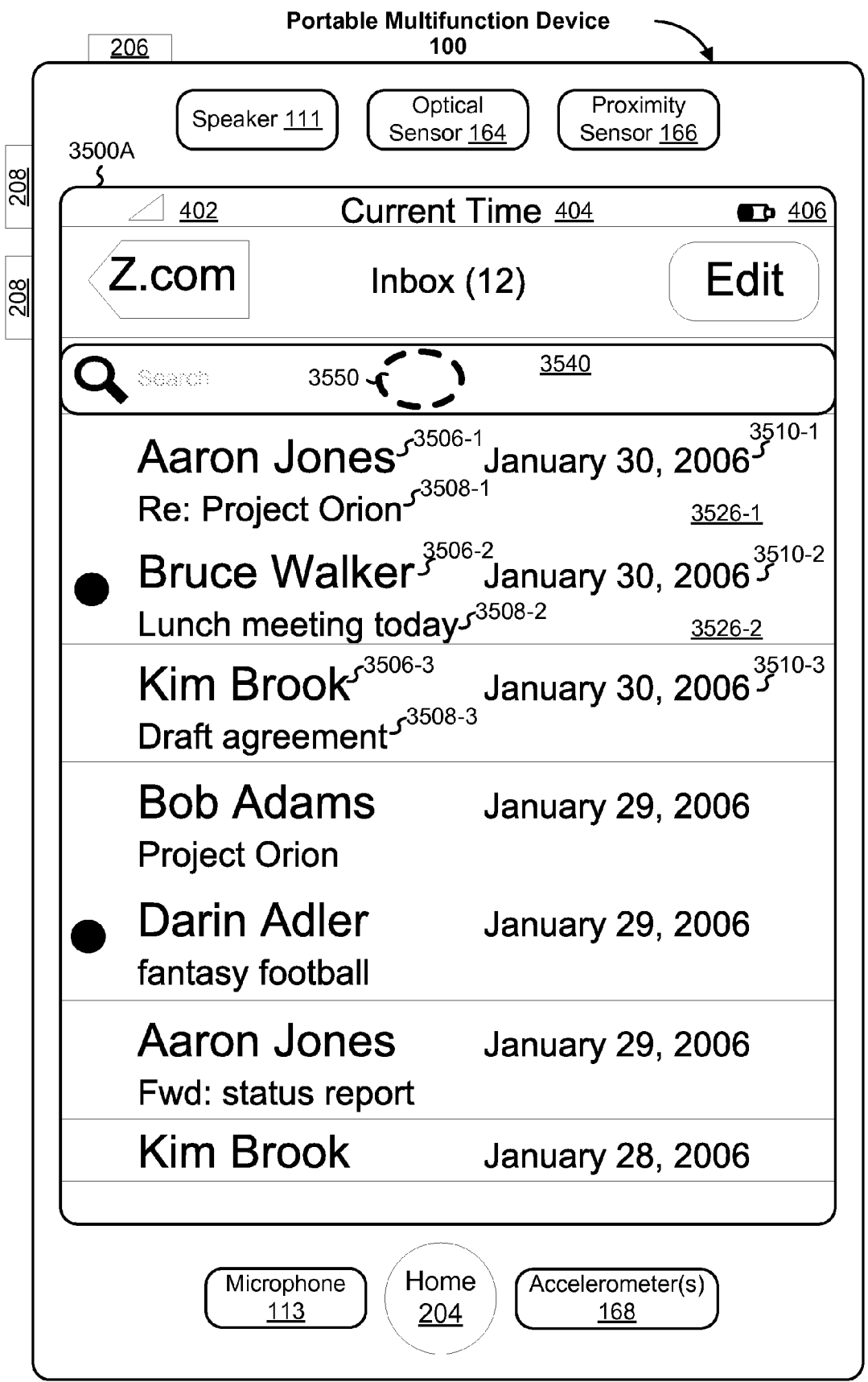
Figure 5G:
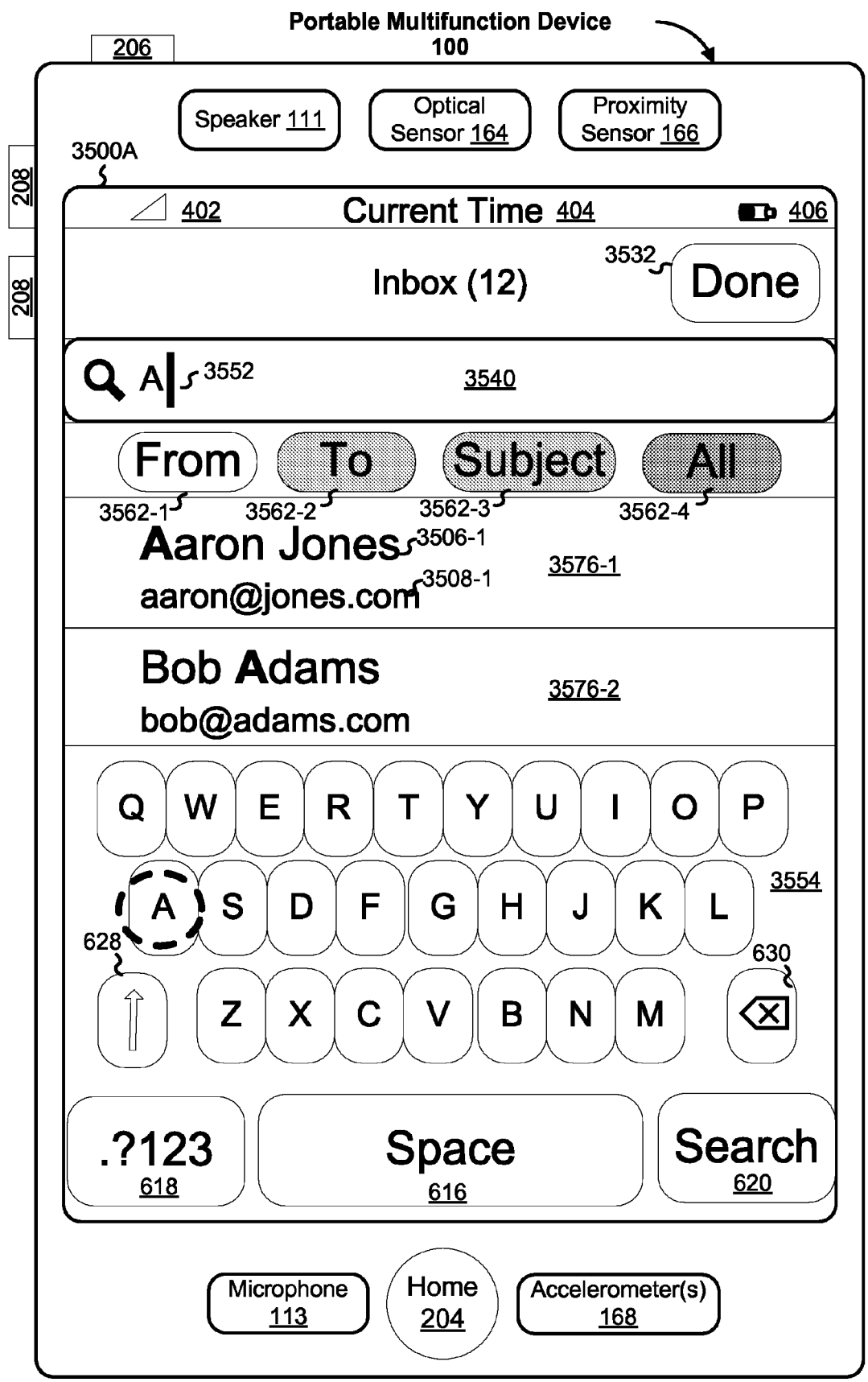

Exemplary user interactions with the UI 3500A and search window 3540 to conduct a search in an email application are now described with reference to FIGS. 5F through 5I. As shown in FIG. 5F, a contact 3550 (e.g., a finger tap) is detected on a portion of the search window 3540. (In this and subsequent figures, a contact or touch on the UI 3500A is illustrated by a dashed oval, such as the oval 3550.) As shown in FIG. 5G, in response to detecting the contact 3550, a cursor 3552 is displayed in the search window 3540, a collection of search scope limiter icons 3562 (also called search field specification icons) is displayed below the search window 3540, and a virtual keyboard 3554 is displayed in the lower portion of the UI 3500A. A "Done" icon 3532 is also displayed in the Inbox heading (in roughly the same position as the Edit icon shown in FIGS. 5A-5E). A user can cancel a search mode for the application and cause the UI 3500A to return to a normal mode for the application (e.g., FIG. 5B) by selecting the Done icon 3532.

FIG. 5G illustrates the UI 3500A during further progress of the search operation illustrated in FIG. 5F.

Referring to FIG. 5G, in some embodiments, the activation of a search field specification icon 3562 (e.g., by detecting a finger tap on the icon) enables a user to limit a search in a mailbox (e.g., the user's Z.com "Inbox" 3502) to a particular email field or fields (some of which correspond to information displayed in an email descriptor 3526). In some embodiments, a search is limited to information in the From (sender) field of email in the user's Z.com Inbox 3502 in response to detecting selection of the "From" icon 3562-1. Similarly, in some embodiments, a search is limited to information in the To (recipient) or the Subject fields of email in the user's Z.com Inbox 3502 in response to detecting selection of the "To" or "Subject" icons 3562-2, 3562-3, respectively. In some embodiments, these icons can be selected alone, or in combination, in which case the search would be conducted within the email information corresponding to the selected icons. In some embodiments, the user can specify a search within all information associated with email in the user's Z.com Inbox 3502 by selecting the "All" icon 3562-4. In FIG. 5G, the search is limited to information in the From field of the emails in the user's Z.com Inbox 3502 in response to detecting selection of only the "From" icon 3562-1. Different embodiments can provide different search scope limiters 3562, including a subset or superset of the illustrated options. In some embodiments, only one search scope limiter at a time may be selected.

Referring to FIG. 5G, in some embodiments, the activation of a search field specification icon 3562 (e.g., by detecting a finger tap on the icon) enables a user to limit a search in the email application to a particular email field or fields (some of which correspond to information displayed in an email descriptor 3526). In some embodiments, a search is limited to information in the From (sender) field of emails in the user's email application in response to detecting selection of the "From" icon 3562-1. Similarly, in some embodiments, a search is limited to information in the To (recipient) or the Subject fields of email in the user's email application in response to detecting selection of the "To" or "Subject" icons 3562-2, 3562-3, respectively. In some embodiments, these icons can be selected alone, or in combination, in which case the search would be conducted within the email information corresponding to the selected icons. In some embodiments, the user can specify a search within all information associated with emails in the email application (e.g., searching multiple email accounts on the device 100, rather than just within emails in the user's Z.com inbox) by selecting the "All" icon 3562-4. Different embodiments can provide different search scope limiters 3562, including a subset or superset of the illustrated options. In some embodiments, only one search scope limiter at a time may be selected. In some embodiments, the user can select whether the search is applied to all emails in the email application or just emails in the currently displayed mailbox via a settings interface (e.g., via setting 412 in FIG. 4B).

The virtual keyboard 3554 when displayed conceals whatever email descriptors 3526 or portions thereof were previously displayed on the UI 3500A in that position. In some embodiments, the keyboard 3554 includes the following elements, or a subset or superset thereof:

touch sensitive keys, e.g., in a QWERTY arrangement;
a shift icon 628;
a delete icon 630;
a symbols/numbers icon 618 that when activated (e.g., by a finger tap on the icon) initiates display of an alternate keyboard with user-selectable symbols and numbers;
a space icon 616; and
a search key 620, the activation of which (e.g., by a finger tap) initiates a search for messages with information that matches the sequence of characters (any combination of letters, numbers and/or symbols) entered by the user in the search window 3540.

FIG. 5G also shows subsequent steps in a search operation in which the user has typed an "A" on the virtual keyboard 3554, in response to which an "A" character is displayed in the search window 3540 at position next to the cursor 3552. In response to user entry of the "A" in the search window 3540, the search module 151 (FIG. 1A) identifies emails whose senders' first or last name or email address or domain (or any combination, subset or superset thereof) begins with an "A." Email search results 3576 (e.g., name and email address information) of at least a subset of the matching senders is then displayed below the search window 3540 and search specification icons 3562. For example, FIG. 5G displays name and email information 3576-1, 3576-2 for "Aaron Jones" and "Bob Adams," both of whom are email senders whose names and/or email addresses match the search criteria entered by the user thus far (i.e., "A"). As described below with reference to FIG. 5H, the displayed search results 3576 are updated with matching information as the user continues to enter characters in the search window 3540.

More generally, the search module 151 identifies emails with information in specific fields (corresponding to selected search field specification icons 3562 in some embodiments) that matches one or more characters entered by the user in the search window 3540. In some embodiments, this matching is done as the user enters characters in the search window 3540. In such embodiments, the search results 3576 are updated in real time, as the user enters characters. Furthermore, it is a characteristic of some embodiments, as illustrated in FIG. 5G, that the search results 3576 include one entry for each unique matching email field. For example, as shown in FIG. 5G, the search results 3576 include one record with sender information for "Aaron Jones" and one record with sender information for "Bob Adams". The search results 3576 would include one entry for each of these senders regardless of whether there are 1, 10 or 100 emails sent by each of these two senders.

Figure 5H:
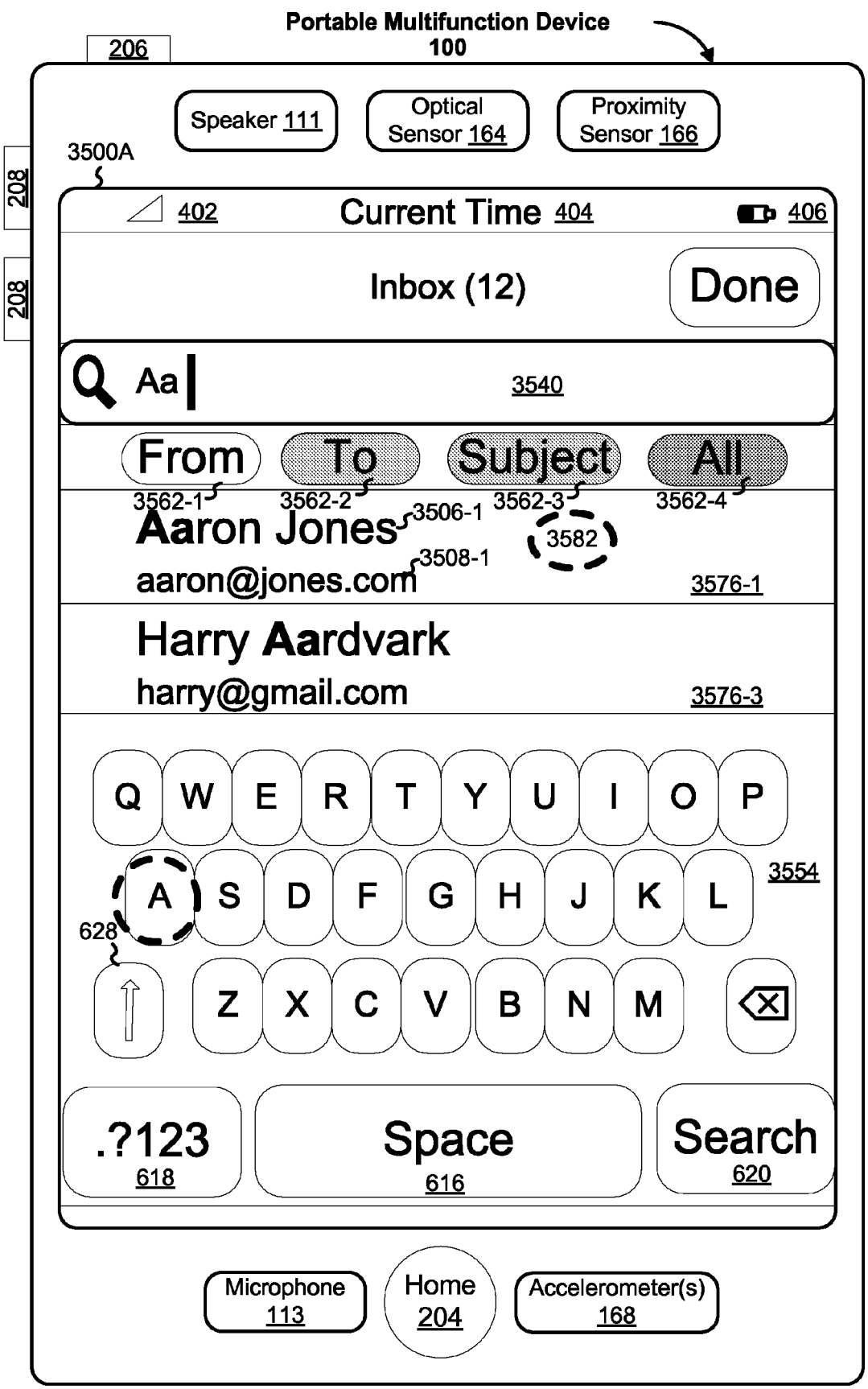

As described further with reference to FIG. 5H, after one or more characters are entered in the search window 3540 and corresponding matching results 3576 are displayed on the UI 3500A, the search module 151 may initiate display of email descriptors corresponding to a particular search result (e.g., emails associated with a particular sender, recipient or email subject in some embodiments) in response to detecting selection of that search result on the UI 3500A (e.g., by a finger tap). For example, the search module 151 initiates display of emails descriptors that correspond to emails from Aaron Jones (FIG. 5I) in response to detecting selection of the Aaron Jones search result 3576-1 by finger tap 3582 (FIG. 5H). This two-stage search result display process enables a user who is performing a search on a portable multifunction device 100 with a relatively small display to first identify a sender (or recipient or subject, etc.) of interest before viewing email descriptors from that sender (or emails associated with a particular recipient or subject of interest).

Figure 5I:
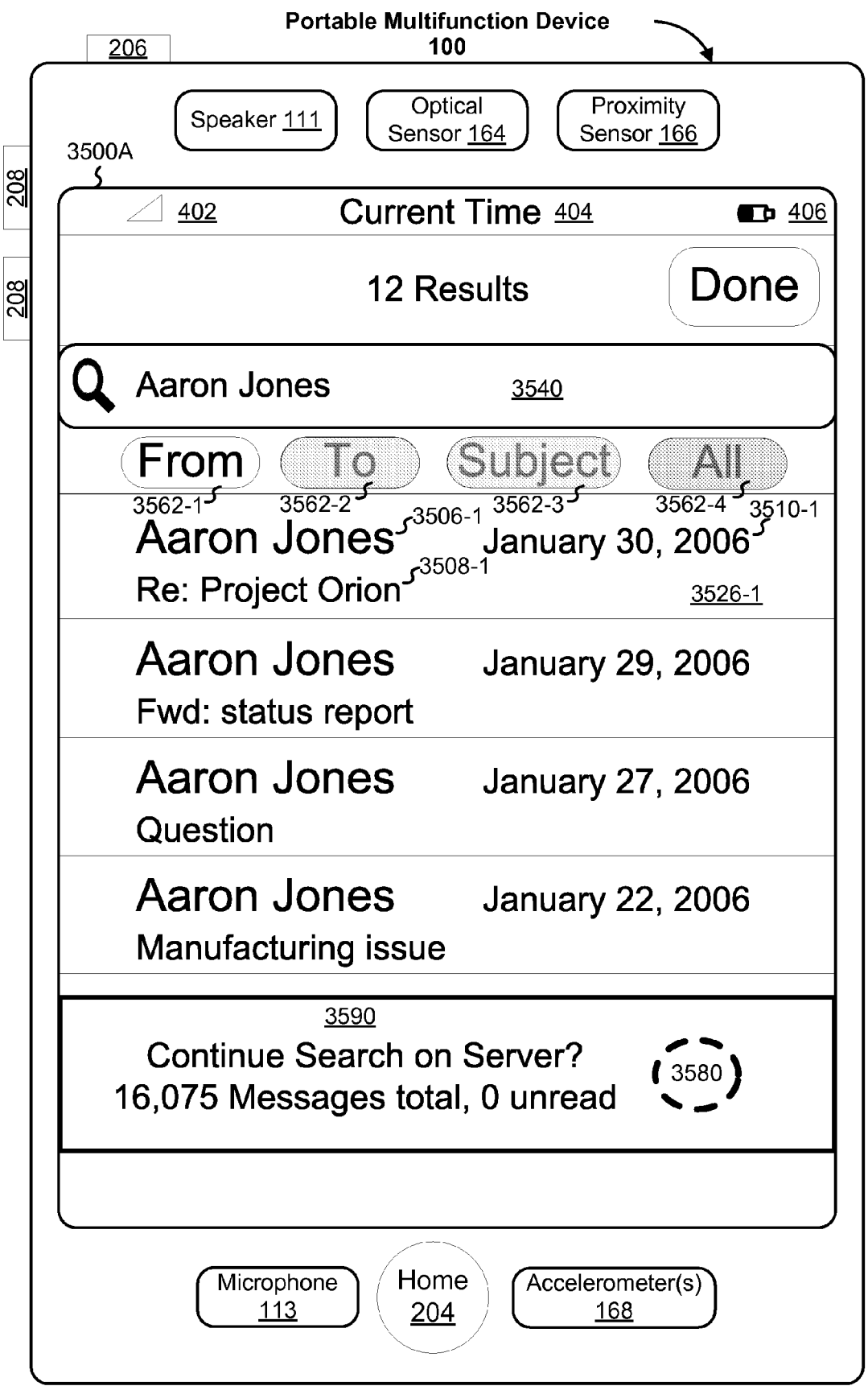

FIG. 5H illustrates the UI 3500A after the user has entered an additional "a" into the search window 3540, which results in the display of a search string of "Aa." In response to the user entering the "Aa" search string, the search results 3576 displayed on the UI 3500A are updated to include sender information for Aaron Jones 3576-1 and Harry Aardvark 3576-3, both of which match the user search string, "Aa." In response to the user selection of the sender information for Aaron Jones 3576-1 (e.g., by a finger tap 3582), the search module 151 causes the UI 3500A to display all of the email descriptors for emails stored locally on the device that were sent by Aaron Jones (FIG. 5I). As shown on FIG. 5I, in some embodiments the UI 3500A also provides a message icon 3590 that asks whether the user wants to "Continue Search on Server?" The UI 3500A may also display a message that indicates the total number of messages that are on the server (e.g., "16,075 Messages total, 0 unread".) In response to user selection of this message icon (e.g., by a finger tap 3580), the search module 151, in concert with the communication module 128 and RF circuitry, initiates a communication session with a respective email server to conduct a corresponding search on the server and display of the remote search results or a portion thereof (e.g., as a scrollable list of email descriptors 3526 analogous to those shown in FIG. 5I).

In some embodiments, a particular search query may be saved so that it may be easily repeated at a later time. For example, in FIG. 5I, in addition to the "Done" icon, UI 3500A may also include a "Save" icon (not shown) that when activated (e.g., by a finger tap gesture) initiates display of a user interface for naming and saving the current search query ("search for all emails from Aaron Jones" in this example). For an email application, the search may be saved as a "smart mailbox." Similarly, for a music player application, the search may be saved as a "smart playlist." More generally, a search query in a given application (including the applications described below) may be saved for later reuse with the application.

Figure 6A:
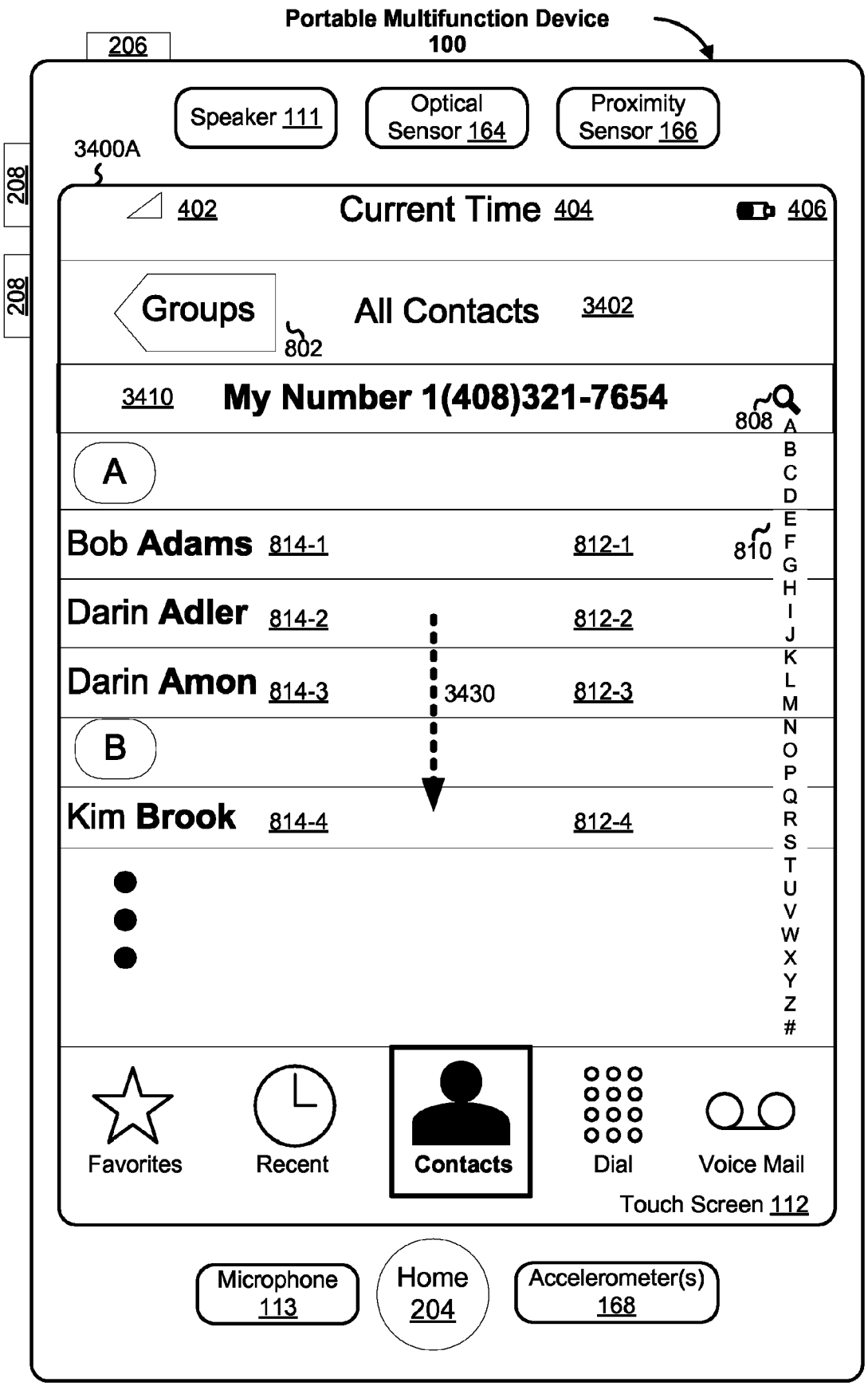
FIGS. 6A-6D illustrate exemplary user interfaces for a search facility for use with a contacts application in accordance with some embodiments.

FIGS. 6A-6D illustrate exemplary user interfaces for a search facility for use with a contacts module/application 137 in accordance with some embodiments. As shown in FIG. 6A, an exemplary UI 3400A for a contacts application (which may be incorporated in a phone application UI) includes the following elements, or a subset or superset thereof:

Elements 402, 404 and 406, as described above.
A heading 3402 that indicates the identity of the current contacts list (in this case, "All Contacts"), information for which is shown in the interface 3400A.
A navigation icon 802 that indicates the name of another user interface (here, "Groups") that, when activated, initiates navigation to and display of information for that user interface (e.g., a user interface for choosing the contacts list or subgroup of the contacts list to be displayed).

A display field 3410 that shows a phone number of the device 100.

Figure 6B:
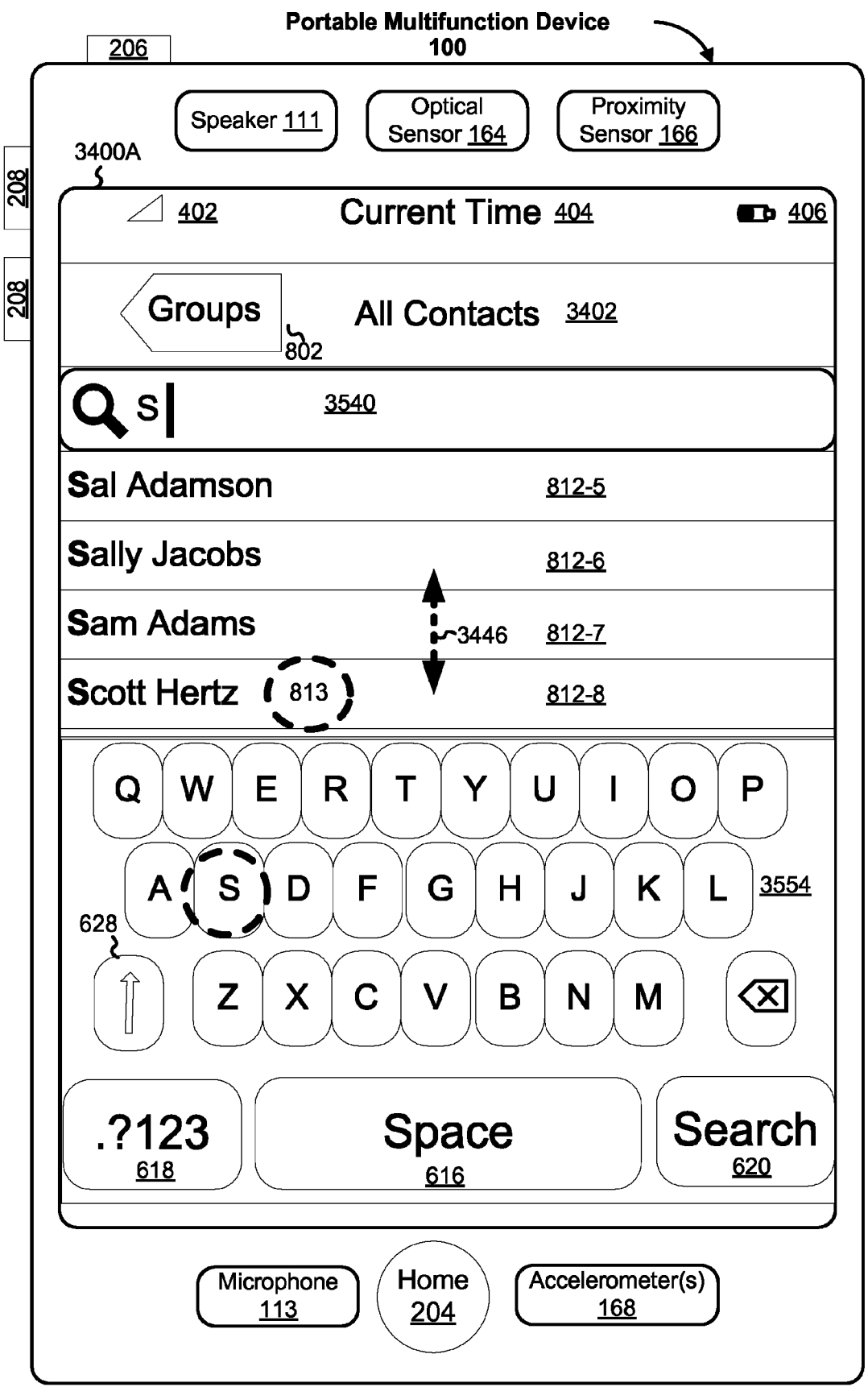

A "Search" icon 808 (shown in some embodiments as a magnifying glass) that in some embodiments provides a visual reminder that the search input area may be displayed by a continued scroll down gesture at the top of the contact list (the "rubber band effect" described above) and that in some embodiments initiates display when activated (e.g., by a finger tap gesture) of the search input area 3540 (FIG. 6B).

An index 810 of contacts stored locally on the device 100. Each letter of the index 810 may be selected individually, resulting in the display on the UI 3400A of contacts with a component (e.g., first or last name) that begins with the selected letter.

A collection of contact descriptors 812-*i*, each of which includes the name of a contact 814-*i*.

A "Favorites" icon that, when activated, triggers display of a UI with contacts designated as favorites.

A "Recents" icon that, when activated, triggers display of a UI with contacts and/or phone numbers recently employed by a user for communications (e.g., recent phone calls).

A "Contacts" icon that, when activated, triggers display of a contacts UI (e.g., UI 3400A, FIG. 6A).

A "Dial" icon that, when activated, initiates display of a UI with a numeric keypad for dialing.

A "Voicemail" icon that, when activated, initiates display of a UI for accessing the user's voicemail.

The UI 3400A in FIG. 6A typically shows information for a subset of the contacts that are stored locally on the device 100. In some embodiments, additional contacts that are not in view on the UI 3400A may be displayed in response to a user scroll gesture 3430, which operates in some embodiments as described above in reference to FIG. 5A.

The device may initiate display of a search input area 3540 (FIG. 6B) within the contacts application in an analogous manner to that described above with respect to FIGS. 5A-5I. In some embodiments, a search window is opened in an analogous manner to the rubber band effect described above in reference to FIGS. 5C-5E. In response to detecting a user scrolling gesture that continues downward after display of the top of the contacts list (e.g., after display of field 3410, which appears at the top of the contacts list), a search window 3540 appears little by little until it is completely visible, and then snaps back into position adjacent to the contacts heading 3402 when the user ceases the scrolling gesture. In some embodiments, a user can open a search window within contacts by activating/tapping a search icon (e.g., icon 808).

FIG. 6B shows the UI 3400A after the user has opened a search window 3540 and then typed an "S" on the virtual keyboard 3554 (which may be displayed as described in reference to FIGS. 5C-5E in response to a user tap gesture on the area within the search window 3540). In response to entry of the "S" in the search window, the search module 151 identifies and causes contact descriptor information 812-*i* to be displayed on the UI 3400A for contacts with components (e.g., first or last name) that have a leading "S." In this case, contact information 812-*i* is shown for four contacts, "Sal Adamson" 812-5, "Sally Jacobs" 812-6, "Sam Adams" 812-7, and "Scott Hertz" 812-8. The search may also identify contacts that are not displayed due to display space limitations. A user may view these additional matching contacts in the UI 3400A by scrolling upward or downward through the displayed list of contact descriptor information 812-*i*, as indicated by the dashed arrow 3446. In FIG. 6B, the user has also tapped 813 on the "Scott Hertz" contact descriptor 812-8, which results in the display of detailed information for that contact (e.g., UI 2600M, FIG. 6C).

In some embodiments, Search icon 620 (FIG. 6B) when activated (e.g., by a finger tap) initiates a search for all contacts with components that match the characters entered thus far in the search window.

Figure 6C:
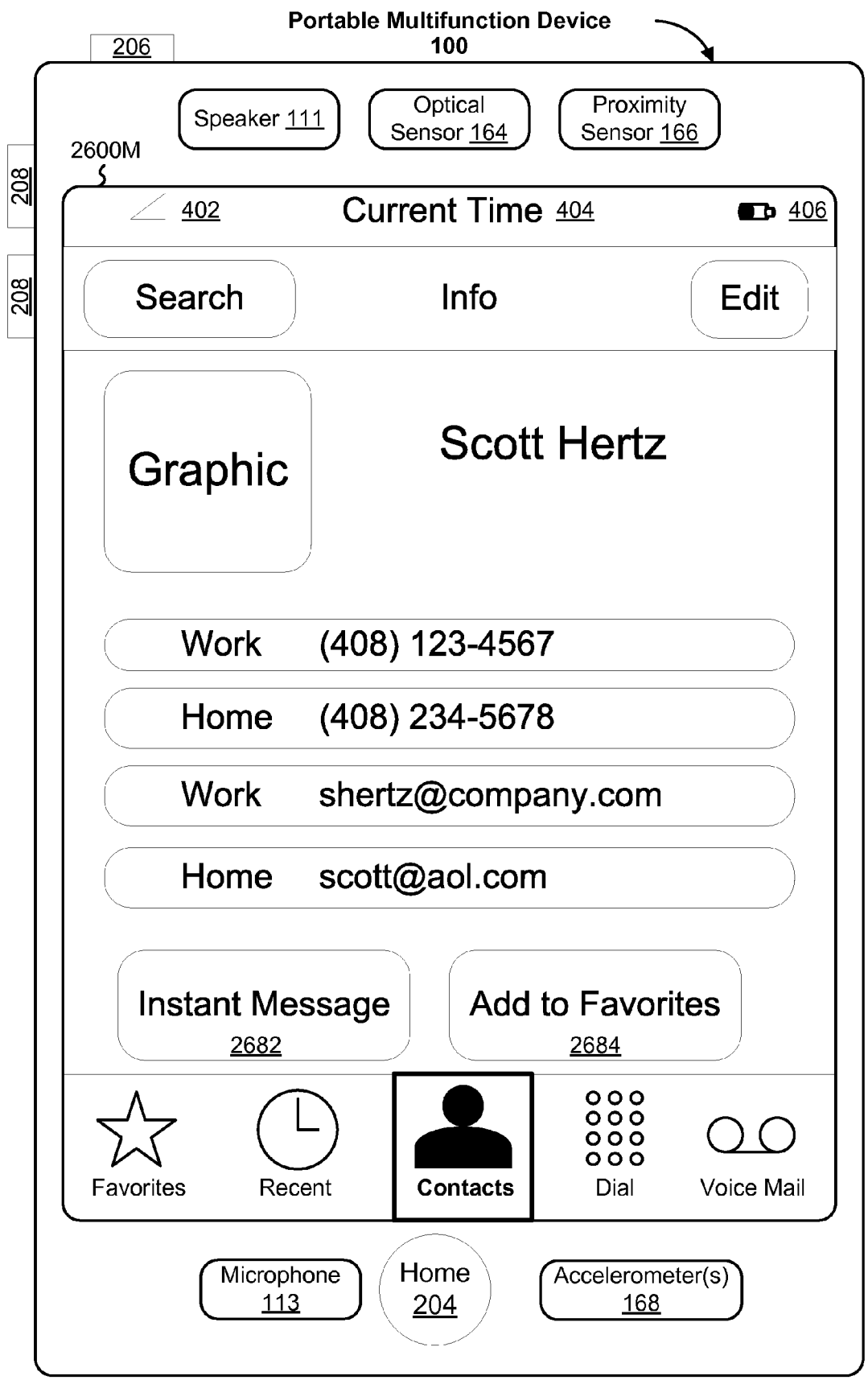

FIG. 6C shows UI 2600M with the detailed information for the exemplary "Scott Hertz" contact displayed in response to the user tap 813 (FIG. 6B). In some embodiments, the detailed contact information includes: a graphic (e.g., a picture or drawing) that represents the contact, phone numbers and/or email addresses of the contact, and icons 2682 and 2684 that the user can tap to initiate an IM to this contact, or to add this contact to the user's Favorites, respectively.

In some embodiments, a user has the option of specifying where to search for contacts. For example, possible locations where a user might want to search for contacts include any combination of the following, or a superset or subset thereof:
  locally—on the device itself,
  on a server (such as in a database of the user's own contacts or in a corporate directory), and
  in a database of all contacts to which the user has access (such as in marketing databases or web-based databases).

Figure 6D:
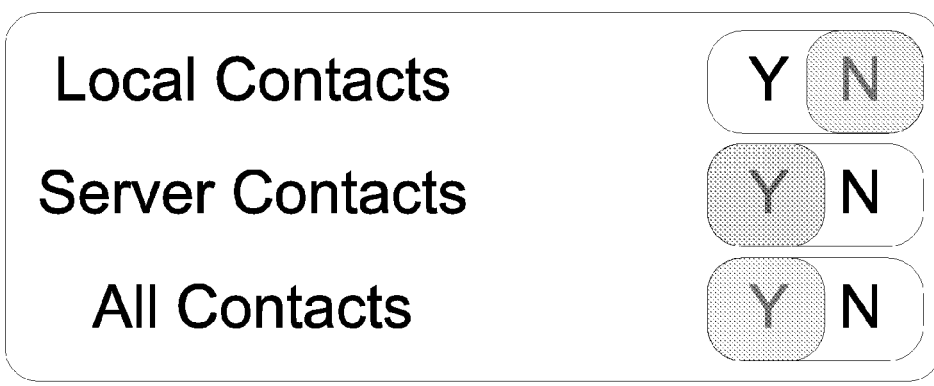

FIG. 6D shows one embodiment of a user interface in which a user can specify preferences for searching in contacts. In this embodiment, there are three options, described above, which may be elected individually (Yes or No) in any combination. In some embodiments, these preferences are defined in a settings UI associated with the contacts module 137 (e.g., via settings 412, FIG. 4B).

Alternatively, in some embodiments, UI 3400A includes a message icon in the local contact search results that asks whether the user wants to "Continue Search on Server?", which is analogous to the message icon 3590 in FIG. 5I for remote email searches. In response to user selection of this message icon (e.g., by a finger tap), the search module 151, in concert with the communication module 128 and RF circuitry, initiates a communication session with a respective contacts server to conduct a corresponding search on the server and display of the search results or a portion thereof (e.g., as a scrollable list of contact descriptors 812).

Figure 7A:
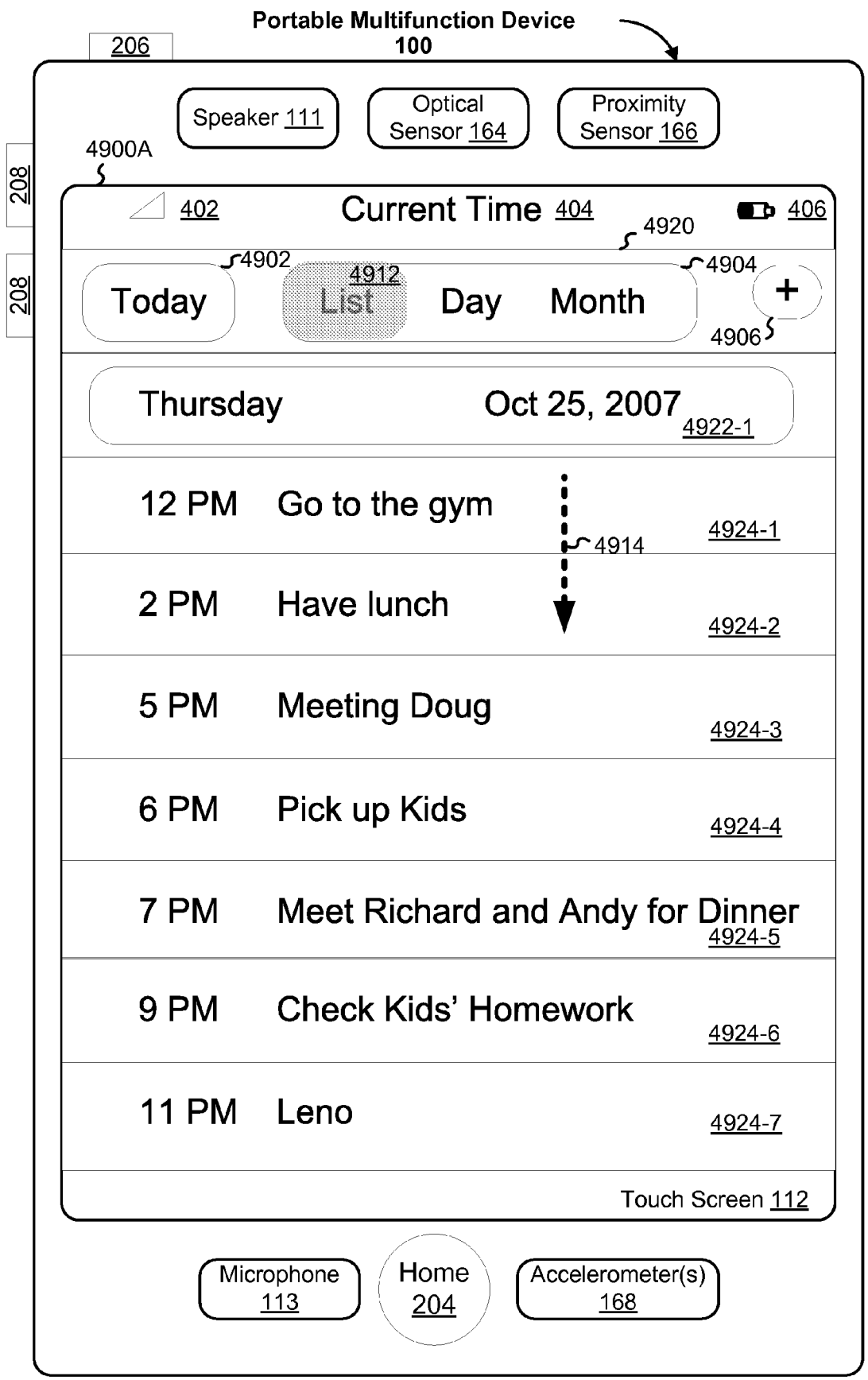
FIGS. 7A-7H illustrate exemplary user interfaces for a search facility for use with a calendar application in accordance with some embodiments.

FIGS. 7A-7H illustrate exemplary user interfaces for a search facility for use with a calendar application/module 148 (FIG. 1A) in accordance with some embodiments. As shown in FIG. 7A, an exemplary UI 4900A for a calendar application includes the following elements, or a subset or superset thereof:

Elements 402, 404 and 406, as described above.

A heading 4920 that includes basic calendar navigation information, including:
  a "Today" icon 4902 that, when activated (e.g., by a finger tap), initiates a jump to calendar entries for today's date (whatever that is);
  a focus bar 4904 that allows a user to select (e.g., via selection shading 4912) a different calendar view, selected in some embodiments from "List," "Day" and "Month"; and
  an "add" icon ("+") 4906 that when activated (e.g., by a finger tap) initiates display of a user interface for adding a new calendar entry.

A secondary heading 4922 that indicates the day and date of calendar entries displayed underneath the heading 4922. For example, the calendar entries 4924 shown in UI 4900A (FIG. 7A) are for the date, Thursday, Oct. 25, 2007.

A collection of calendar entry descriptors 4924-*i* that indicate basic information (e.g., time and description) for respective calendar entries.

In the "List" view (which is illustrated in FIG. 7A), the UI 4900A typically shows information for a subset of the calendar entries stored on the device 100, organized in a flat list. In some embodiments, calendar entries that are not in view on the UI 4900A may be displayed in response to a user scroll gesture 4914, which operates in some embodiments as described above in reference to FIGS. 5A-5I. The scrolling gesture may also be used for the other views (e.g., Day and Month).

UI 4900B (FIG. 7B) illustrates the UI of FIG. 7A after a search window 3540 has been opened. In some embodiments, a search window 3540 is opened in response to detecting a continuing downward scroll gesture 4914, as described above with reference to FIGS. 5A-5I (for e-mail applications) and FIGS. 6A-6C (for contacts applications). However, because there is no "top" of the calendar entries in the List view as there is for email entries (because calendar entries in the List view may continue indefinitely both backwards and forwards in time), in some embodiments the device initiates opening of the search window 3540 in response to a user scroll gesture that scrolls the list above (i.e., before) the current date (e.g., before the secondary heading 4922-1 if the current date is Oct. 25, 2007).

Figure 7B:
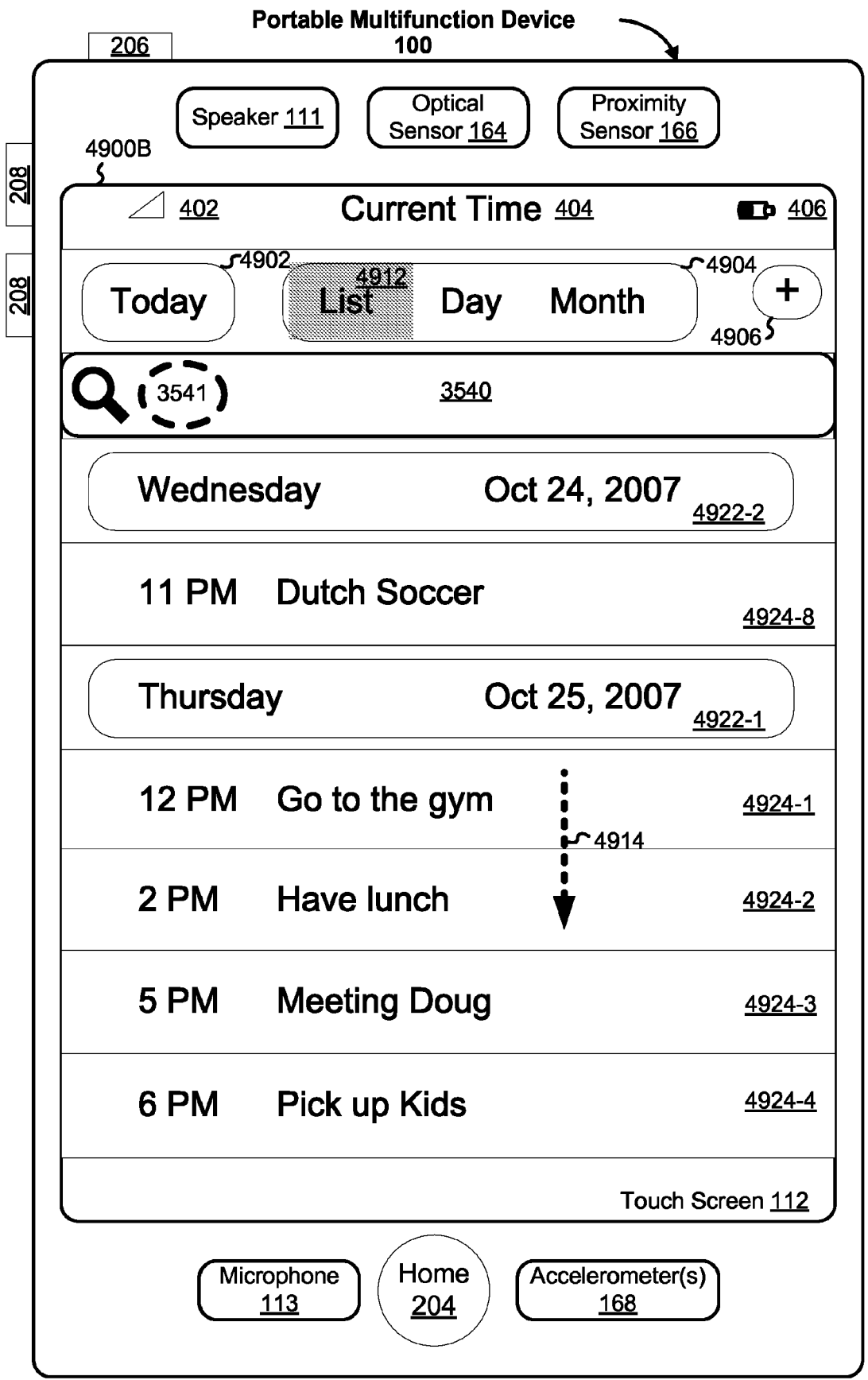
Figure 7C:
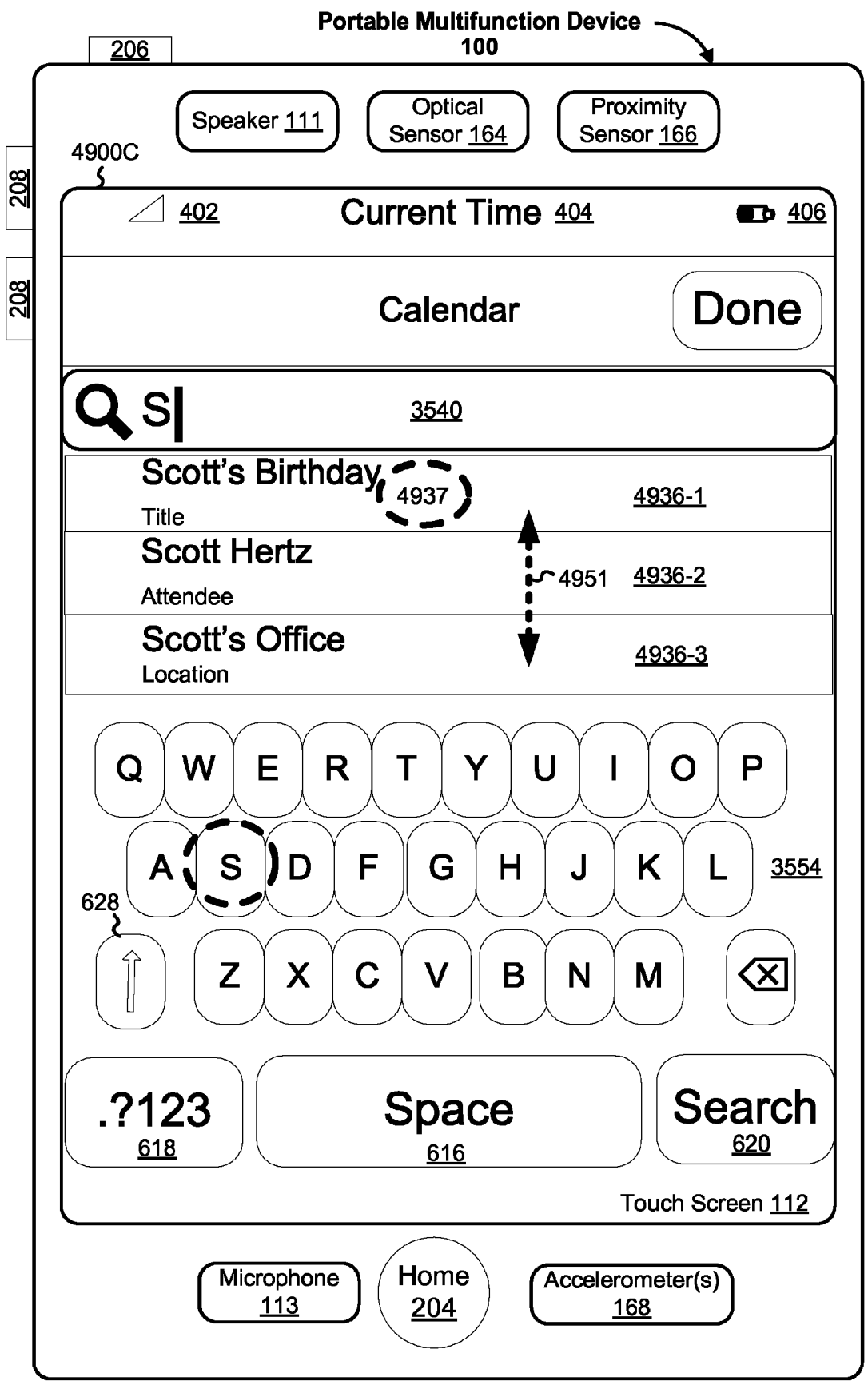

FIG. 7C shows the UI 4900C after the user has opened a search window 3540 and then typed an "S" on the virtual keyboard 3554 (which may be displayed as described above in reference to FIGS. 5C-5E in response to a user tap 3541 (FIG. 7B) on the area within the search window 3540). In response to entry of the "S" in the search window, the search module 151 identifies and causes calendar components 4936 with a leading "S" to be displayed in the UI 4900C.

Note that calendar components 4936 are calendar search results. These search results include one entry for each unique matching calendar field. Calendar components 4936 are analogous to the email search results 3576, which are correspondingly different from email message descriptors 3526. Similar to email search, calendar search uses a two-stage display process to enable a user who is performing a search on a portable multifunction device 100 with a relatively small display to first identify a calendar component of interest before viewing calendar entry descriptors 4924 that correspond to the calendar component of interest.

The calendar components 4936 may include the first or last name of an attendee, the title of an appointment/event, the location of an appointment/event, or other content in a calendar appointment/event. For example, as shown in FIG. 7C, there are displayed components for "Scott's Birthday" (an event title) 4936-1, "Scott Hertz" (an attendee) 4936-2, and "Scott's Office" (a location) 4936-3. The search may also identify components that are not displayed due to display space limitations. A user can view these additional matching components in the UI 4900C by scrolling upward or downward through the display as indicated by the dashed arrow 4951 (FIG. 7C). In some embodiments, the UI 4900C in FIG. 7C also includes a Search icon 620 at the bottom of the virtual keyboard that when activated (e.g., by a finger tap) initiates a search for all calendar entries with components that match the characters entered thus far in the search window, and a Done icon that when activated initiates exiting of the calendar search mode.

Figure 7D:
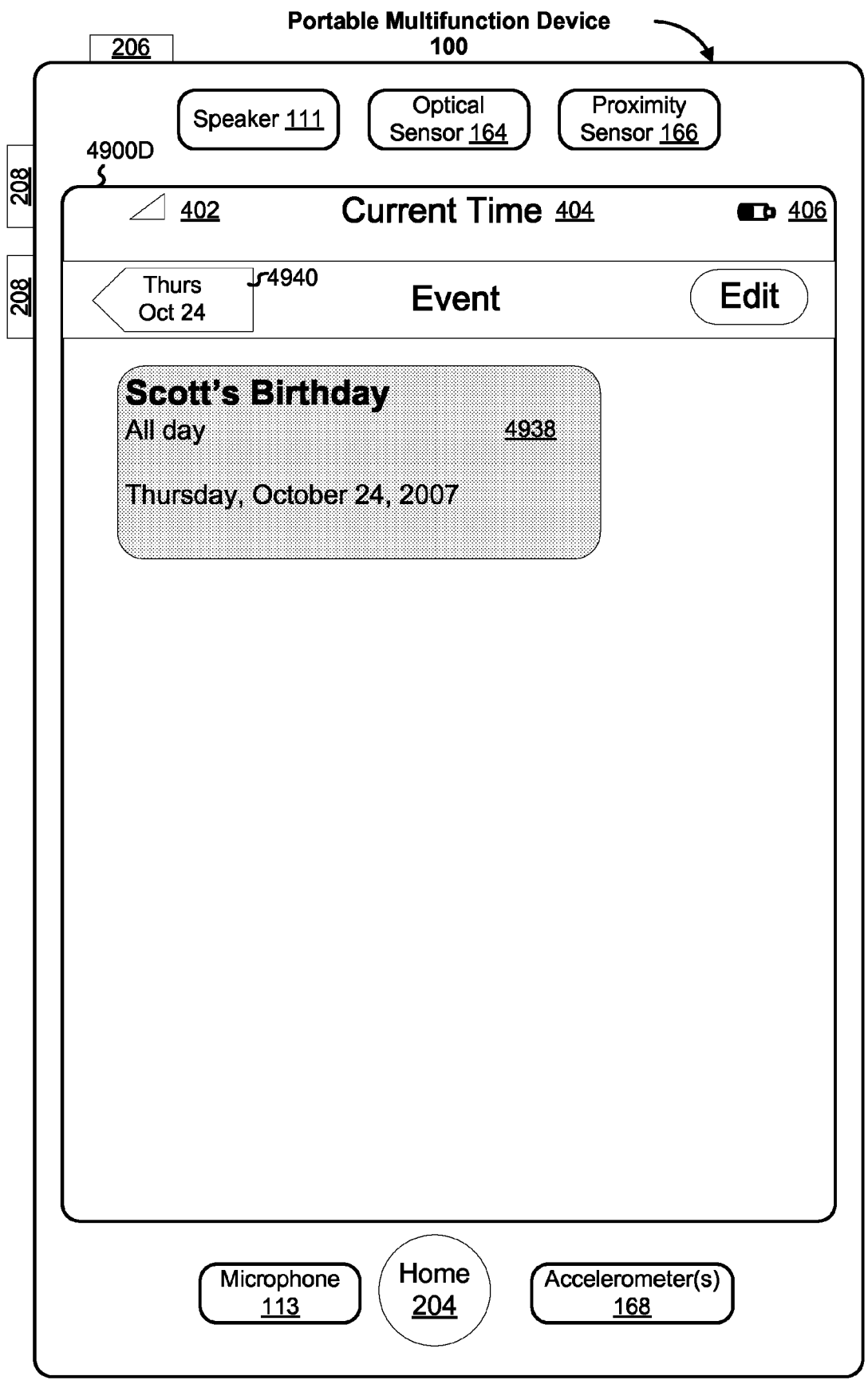

In response to user selection of one of the displayed matching calendar components 4936-*i* (e.g., by a finger tap on the calendar component), a corresponding event or list of calendar entry descriptors 4924 that are associated with the component 4936-*i* are displayed. For example, FIG. 7D shows a UI 4900D that is displayed in response to detecting the user tap 4937 on the component, "Scotts Birthday" 4936-1 (FIG. 7C). Because there is only a single event associated with this component 4936, in some embodiments the detailed associated information 4938 for this event is shown directly (e.g., in UI 4900D, FIG. 7D). In some embodiments, UI 4900D also includes a navigation icon 4940 that when activated (e.g., by a finger tap) displays another level associated with the displayed entry. For example, in the illustrated embodiment, the other level is a listing of calendar entry descriptors for the same date—Oct. 24, 2007—as the displayed event information 4938.

Figure 7E:
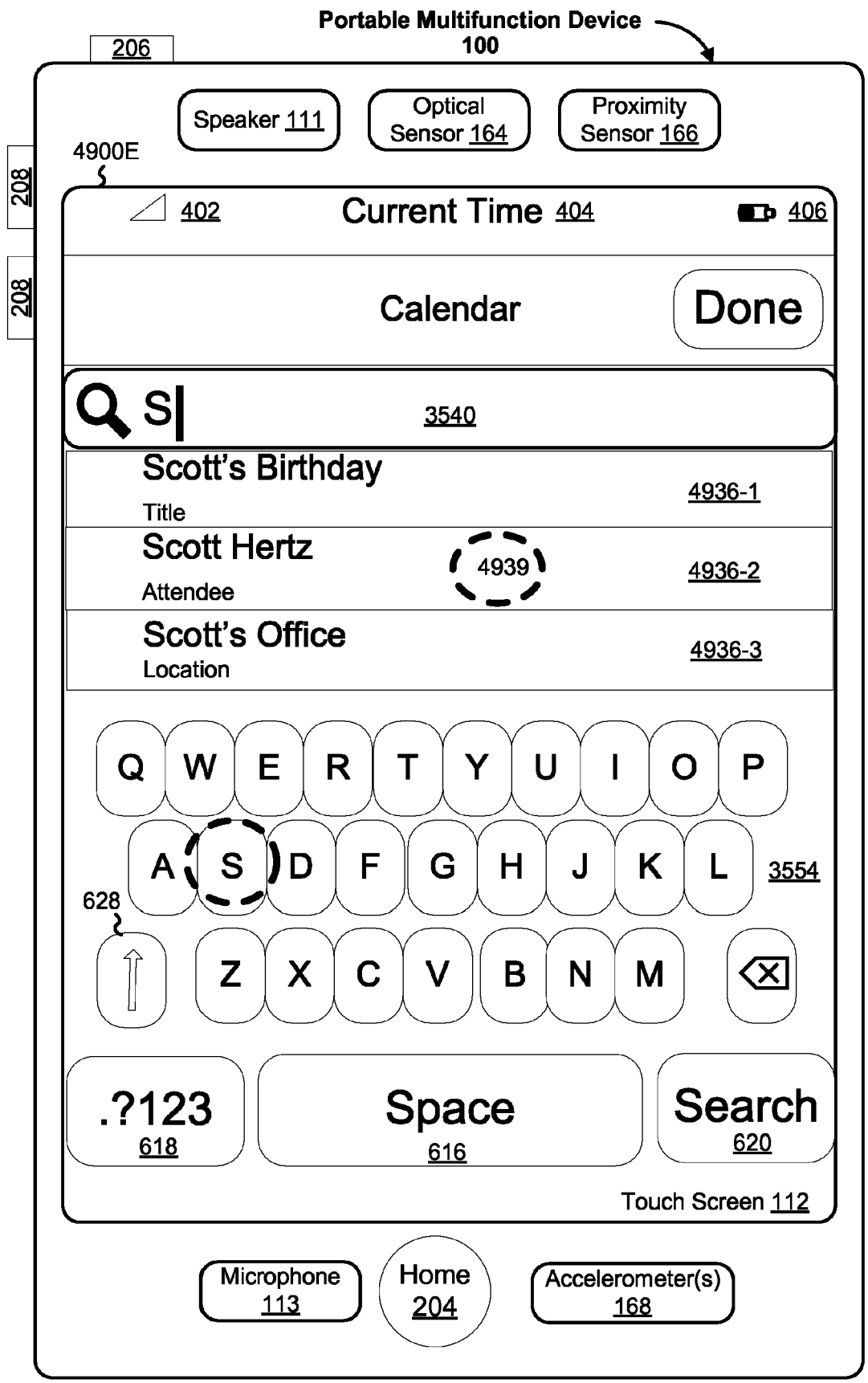
Figure 7F:
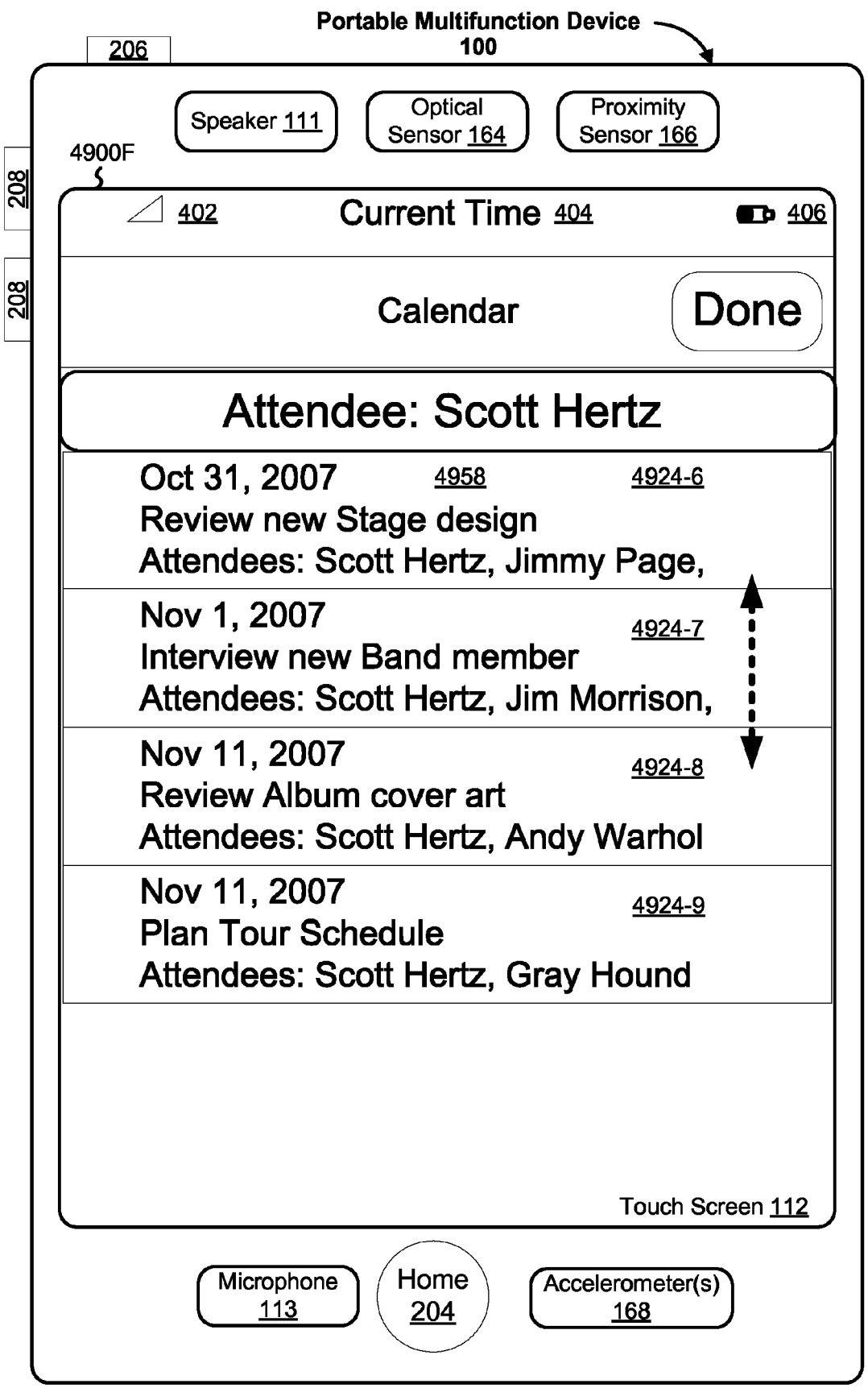

FIG. 7E is similar to FIG. 7C, except the user has selected (e.g., with finger tap 4939) the displayed component "Scott Hertz" in order to view the events in which Scott Hertz is an attendee. FIG. 7F shows UI 4900F, which is displayed in response to detecting the user tap 4939 on the component, "Scotts Hertz" 4936-2 (FIG. 7E). Because there are multiple events associated with this component (i.e., multiple events for which Scott Hertz is an attendee), the UI 4900F in FIG. 7F displays a corresponding list 4958 of event descriptors 4924. In response to detecting activation of an event descriptor in the list of event descriptors (e.g., by a finger tap gesture on the event descriptors), the device displays details for the corresponding event (e.g., event details analogous to those shown in FIG. 7D). In some embodiments, UI4900F includes a back icon that a user can activate (e.g., by a finger gesture) to initiate return to the previous UI (e.g., UI4900E).

Figure 7G:
Figure 7H:
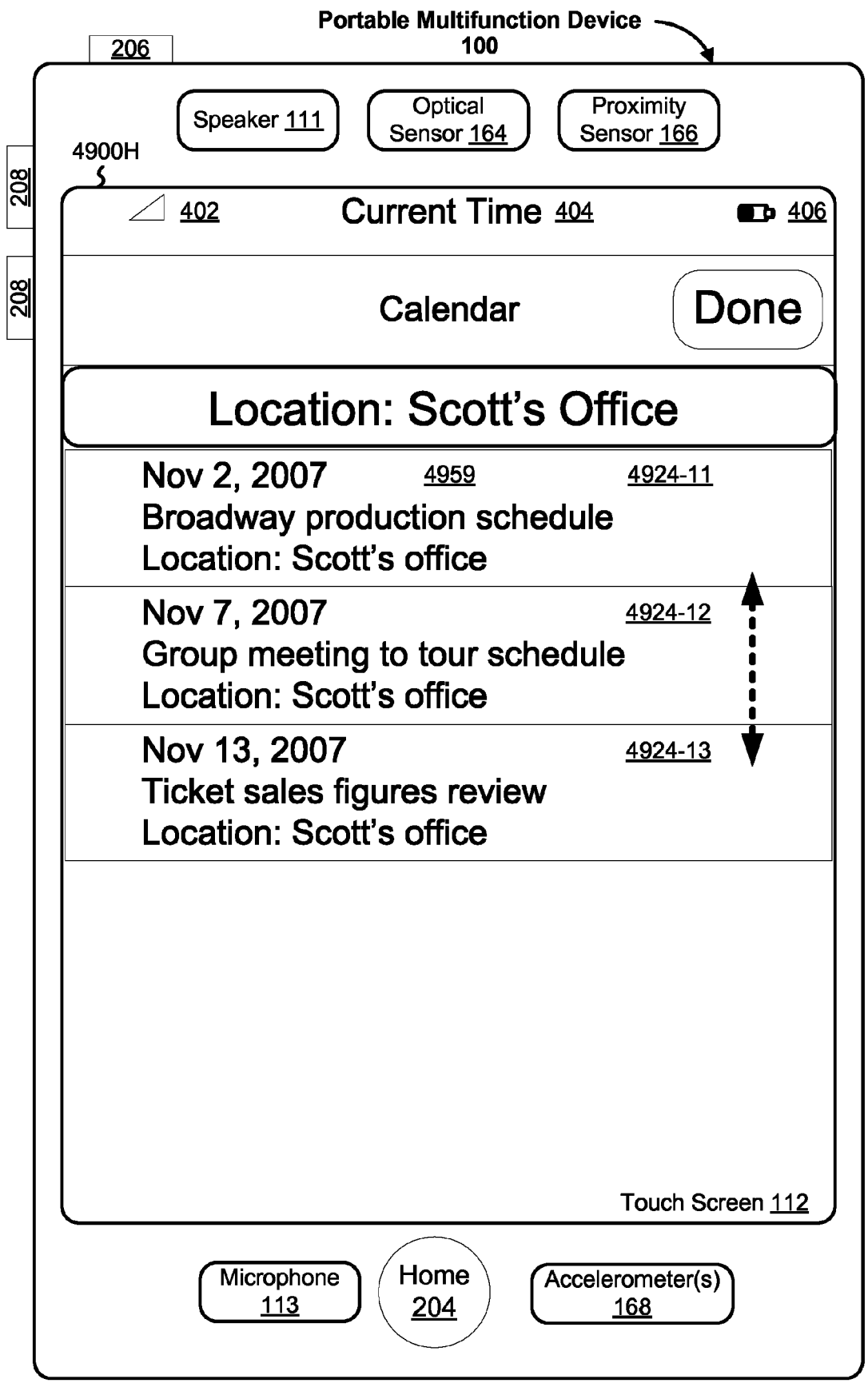

FIG. 7G is similar to FIG. 7C, except the user has selected (e.g., with finger gesture 4941) the displayed component 'Scott's Office" in order to view the meetings that are being held at Scott's Office. FIG. 7H shows UI 4900H after the user has tapped the component, "Scotts Office" 4936-3 (FIG. 7G). Because there are multiple events associated with this component (i.e., multiple events that are held at that location), the UI 4900H displays a corresponding list 4959 of event descriptors 4924. In response to detecting activation of an event descriptor in the list of event descriptors (e.g., by a finger tap gesture on the event descriptor), the device displays details for the corresponding event (e.g., event details analogous to those shown in FIG. 7D). In some embodiments, UI4900H includes a back icon that a user can activate (e.g., by a finger gesture) to initiate return to the previous UI (e.g., UI4900G).

Figure 8A:
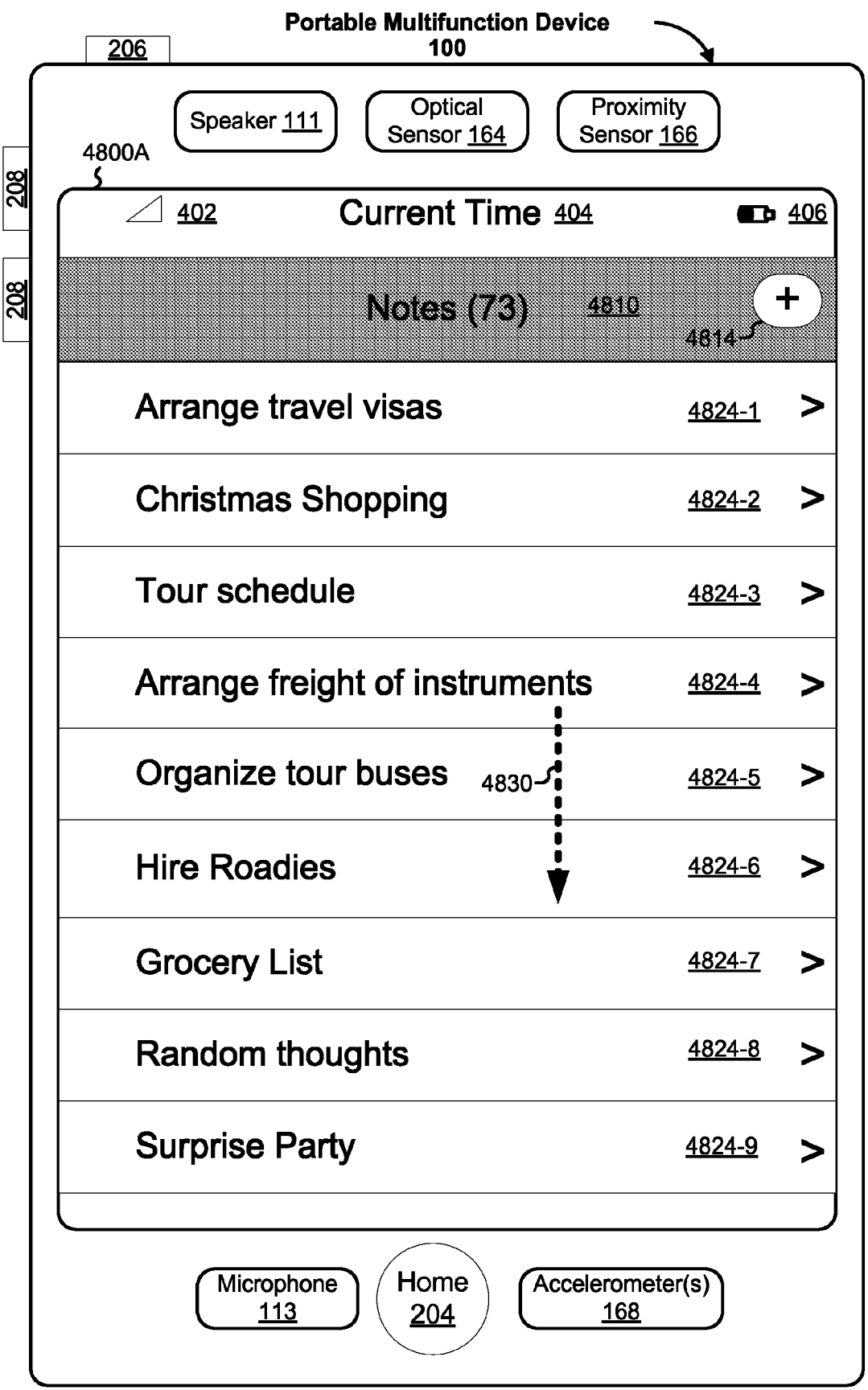
FIGS. 8A-8E illustrate exemplary user interfaces for a search facility for use with a notes application in accordance with some embodiments.

FIGS. 8A-8E illustrate exemplary user interfaces for a search facility for use with a notes application/module 153 in accordance with some embodiments. As shown in FIG. 8A, an exemplary UI 4800A for a notes application 153 includes the following elements, or a subset or superset thereof:

Elements 402, 404 and 406, as described above.

A heading 4810 that indicates the identity of the current application (in this case, "Notes")

An "add" icon (e.g., "+") 4814 that when activated (e.g., by a finger tap on the icon) allows a user to add a new note.

A collection of notes descriptors 4824-*i*, each of which in some embodiments includes an extract (or title) of a respective note.

The UI 4800A typically shows information for at least a subset of the notes that are stored locally on the device 100. In some embodiments, additional notes that are not in view on the UI 4800A may be displayed in response to a user scroll gesture 4830, which operates in some embodiments as described above in reference to FIG. 5A.

The device may initiate display of a search input area 3540 (FIG. 8B) in the notes application in an analogous manner to that described above with respect to FIGS. 5A-5I. In some embodiments, a search window is opened in an analogous manner to the rubber band effect described above in reference to FIGS. 5C-5E. In response to detecting a user scrolling gesture that continues downward after display of the top of the notes list (e.g., after display of note descriptor 4824-1, which appears at the top of the notes list), a search window 3540 appears little by little until it is completely visible, and then snaps back into position as part of (or adjacent to) the notes heading 4810 when the user ceases the scrolling gesture. In some embodiments, a user can open a search window within the notes application by activating/tapping a search icon (not shown).

Figure 8B:
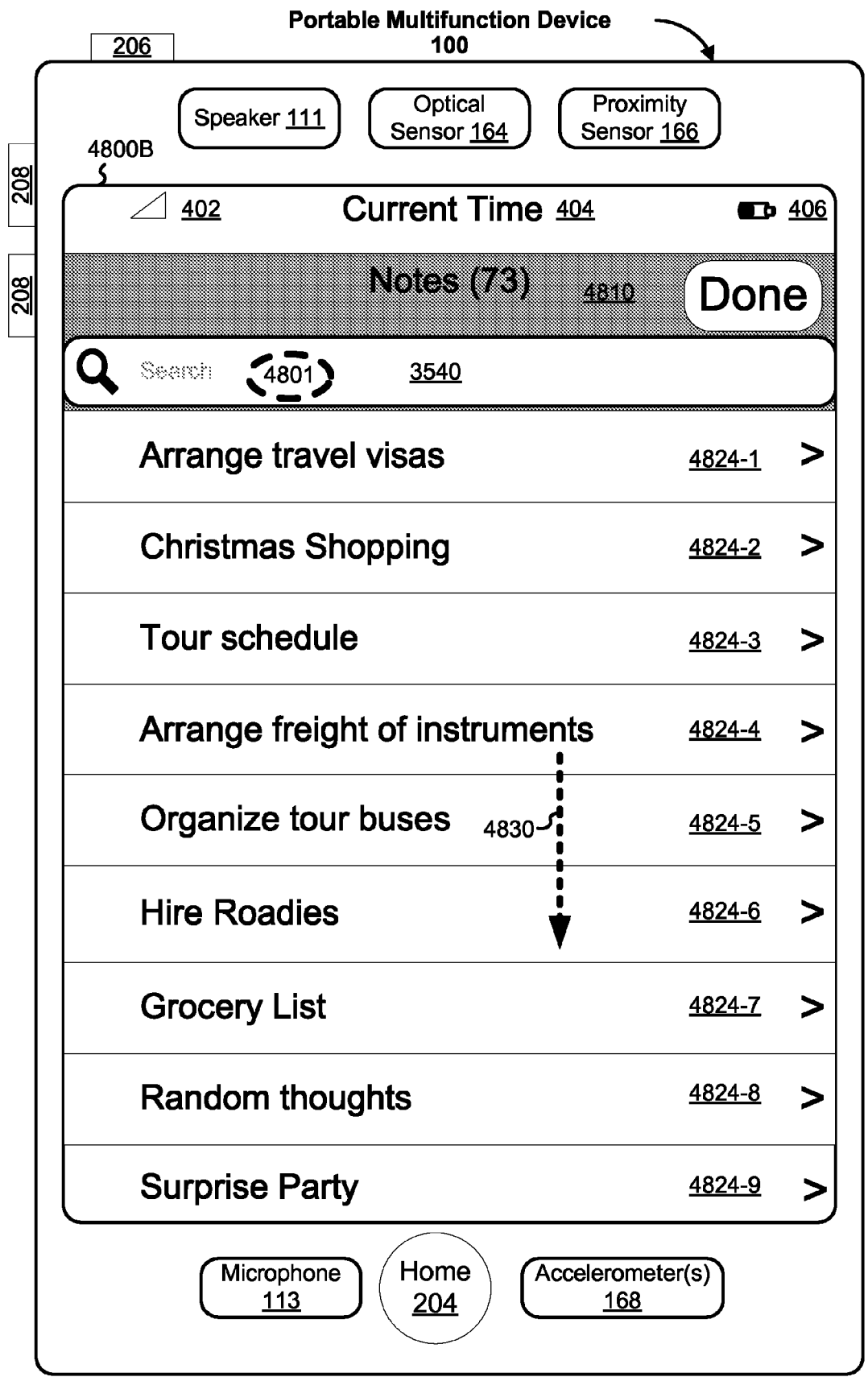

FIG. 8B shows the UI 4800A after the user has opened a search window 3540 and tapped 4801 on the window, which initiates display of a virtual keyboard 3554 (FIG. 8C) for entry of one or more search terms.

Figure 8C:
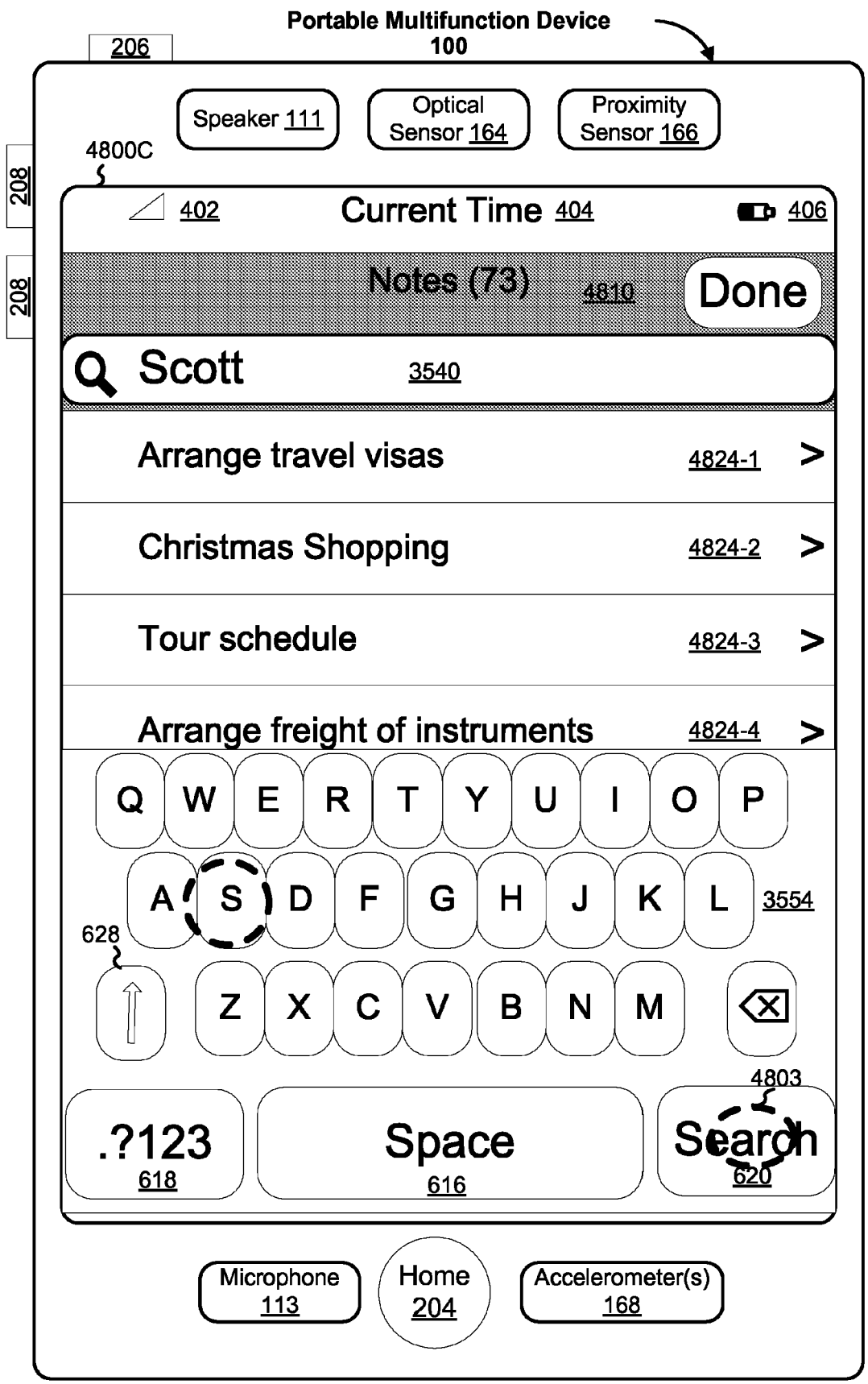

FIG. 8C shows a UI 4800C after the user has entered "Scott" on the virtual keyboard 4836. In response to detecting activation of Search icon 620 (e.g., by tap 4803), the search module 151 initiates a search for notes that contain the search string "Scott." The search module 151 identifies and causes notes descriptors 4824 to be displayed that contain the search string (e.g., as shown in UI 4800D, FIG. 8D).

Figure 8D:
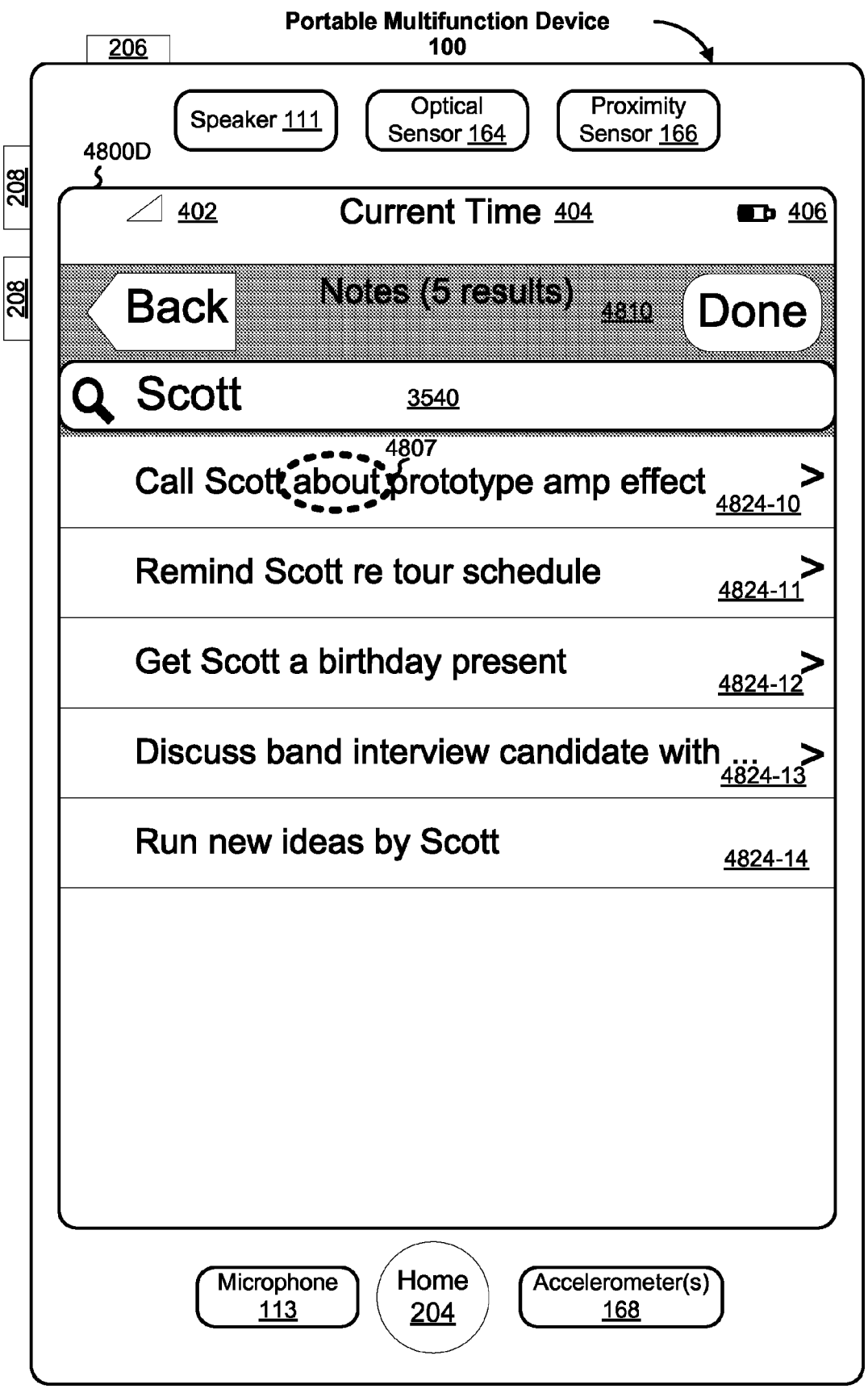
Figure 8E:
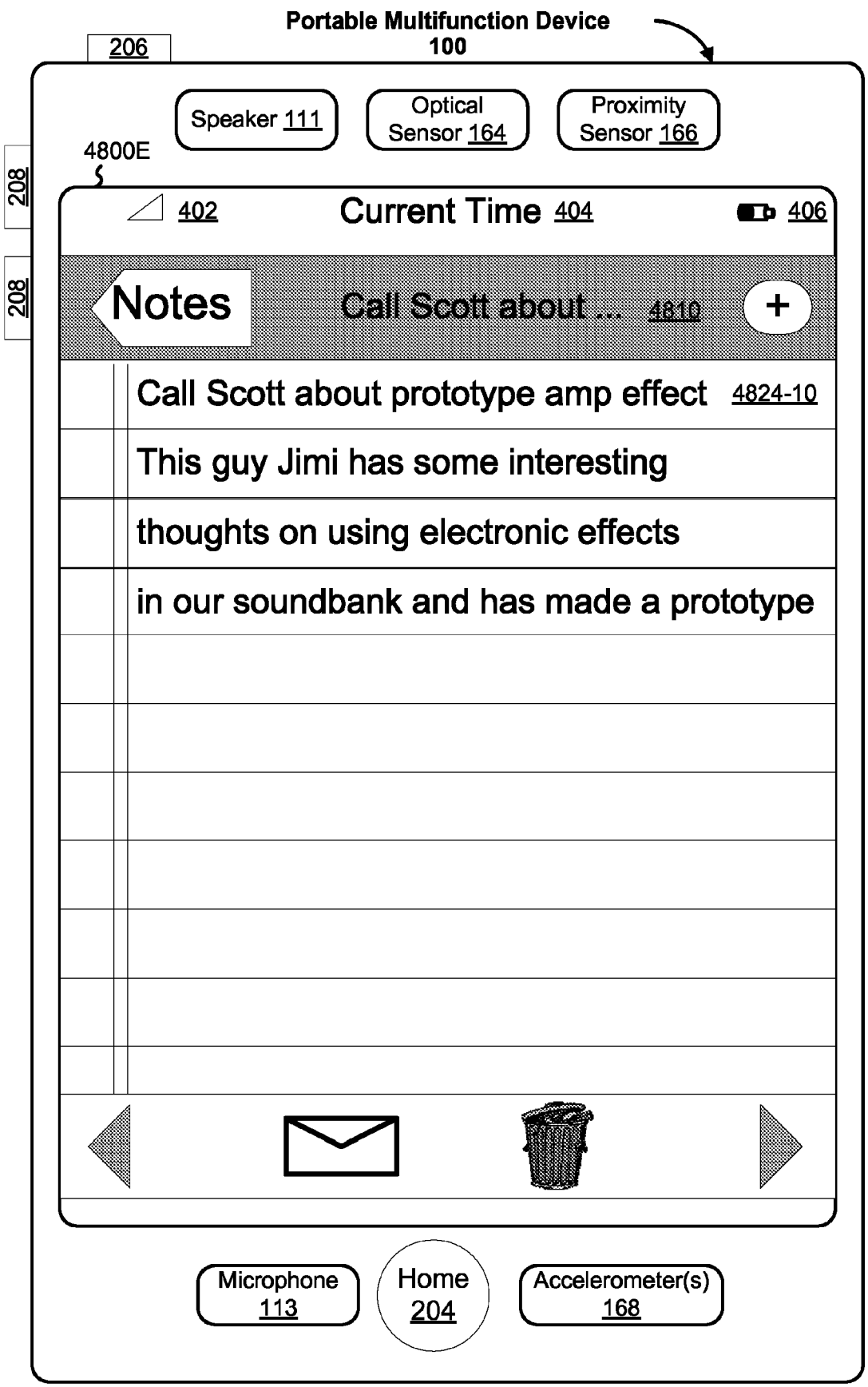

FIG. 8D illustrates UI 4800D following execution of the search. In particular, FIG. 8D shows notes descriptors 4824-10 to 4824-14 for the five notes (which is noted in the header as "5 results") identified by the search module 151 as including the search string, "Scott." A user can scroll among these entries as described above and can view the text of a note by tapping on the corresponding note descriptor 4824. For example, in response to detecting a user tap 4807 on the note descriptor 4824-10 ("Call Scott about prototype amp effect"), the device will display the corresponding note (FIG. 8E). In some embodiments, the search terms are highlighted in the corresponding note (not shown in FIG. 8E).

In some embodiments, as shown in FIG. 8E, the note descriptors 4824 are derived from information entered into the first line of the notes. In other embodiments, the note descriptors may correspond to notes titles or subjects entered by the user or derived, for example, from the subject line/title of a related media file, email or calendar entry. In UI 4800E, the user may activate (e.g., with a finger tap) the "back" icon (e.g., "Notes") to return to the list of note descriptors 4824, or may activate (e.g., with a finger tap) the "add" button (e.g., "+") to initiate creation of a new note.

Figure 9A:
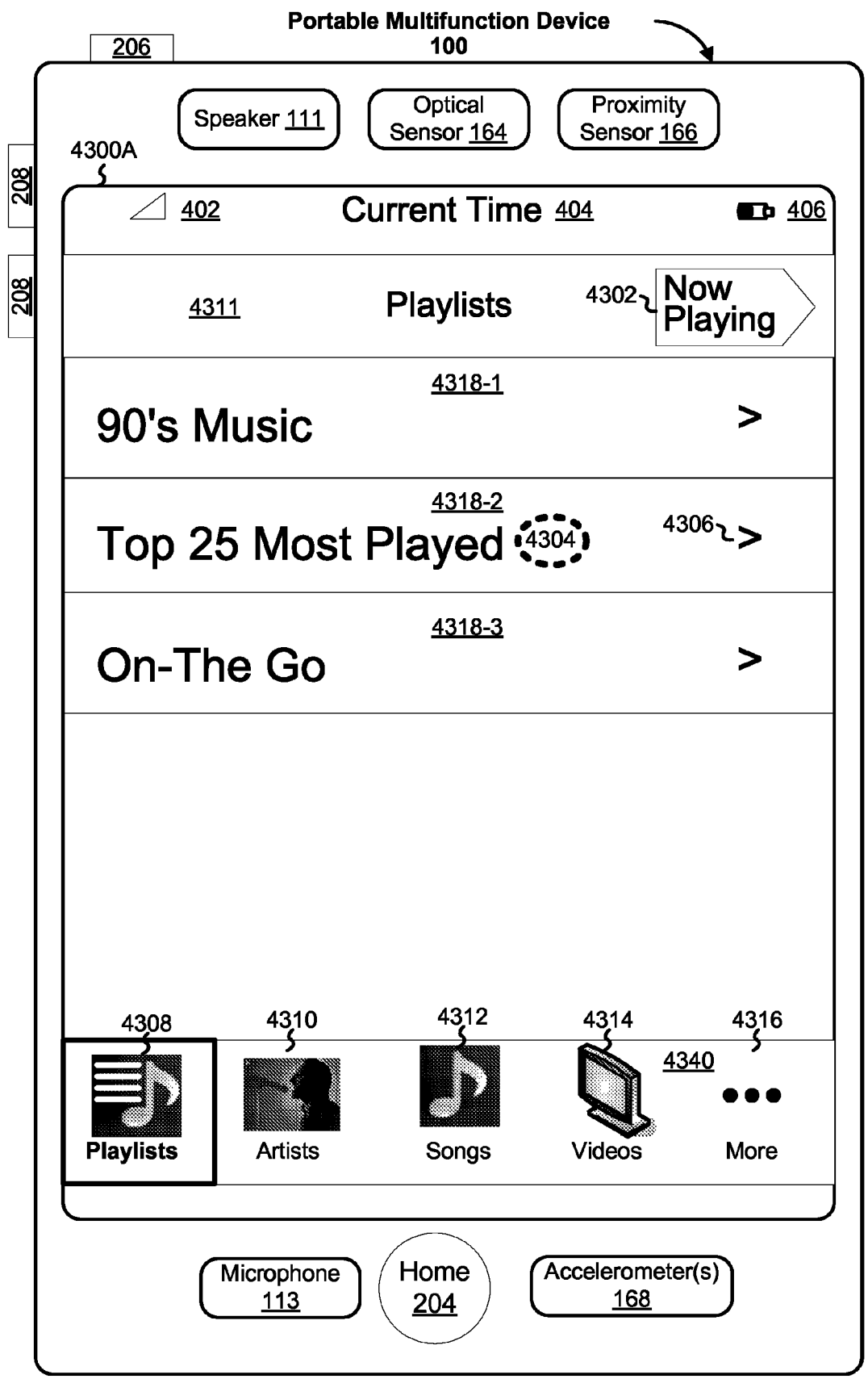
FIGS. 9A-9H illustrate exemplary user interfaces for a search facility for use with a media player application in accordance with some embodiments.
Figure 9B:

FIGS. 9A-9H illustrate exemplary user interfaces for a search facility for use with a media player application, such as a video player module 145, a music player module 146, or a combination thereof (e.g., iPod 152). As shown in FIG. 9A, an exemplary UI 4300A for a media player application includes the following elements, or a subset or superset thereof:
  Elements 402, 404 and 406, as described above.
  Browse icons 4340 that allow a user to view media files stored on the device 100 sorted by different criteria or file types. For example, in one embodiment, as shown in FIG. 9A, the browse icons (or buttons) may include "Playlists" 4308 (in which user-defined playlists and/or automatically generated playlists are displayed, e.g., UI 4300A), "Artists" 4310 (in which artist names for media files on the device are displayed alphabetically), "Songs" 4312 (in which media files are displayed sorted by song names), "Videos" 4314 (in which only media files that are videos are displayed) and "More" 4316 (which, when selected, allows a user to select additional sorting categories such as albums, audiobooks, compilations, composers, genres, and/or podcasts).
  A heading 4311 that indicates the current display view shown (in this case, "Playlists")
  A "Now Playing" icon 4302 that when selected (e.g., by a finger tap) initiates display of information about the media file currently being played by the device 100.
  A collection of media file or playlist descriptors 4318-*i*, each of which includes a title of a respective media file or playlist (playlists are shown in FIG. 9A), and a selection icon 4306-*i* that, when activated (e.g., by a finger tap gesture 4304 on the icon 4306 or in the area of a descriptor 4318), causes the device to display a UI with the names of the songs that are part of the selected playlist 4318-*i* (e.g., as shown in FIG. 9B). The exemplary playlists shown in FIG. 9A include "90's Music," 4318-1, "Top 25 Most Played" 4318-2, and "On-The Go" 4318-3.

The UI 4300A typically shows information for at least a subset of the media files and/or playlists that are stored locally on the device 100 and that match a particular view in accordance with the selected browse icons 4340. In some embodiments, additional media files and/or playlists that are not in view on the UI 4300 may be displayed in response to a user scroll gesture, as described above in reference to FIG. 5A. Additional information related to user interfaces for a media player application for use on a portable multifunction device 100 is provided in U.S. patent application Ser. No. 12/101,832, "Touch Screen Device, Method, and Graphical User Interface for Determining Commands by Applying Heuristics," filed Apr. 11, 2008, which is incorporated by reference herein in its entirety.

FIG. 9B shows an exemplary illustration of a UI 4300B that displays the media files that make up the "Top 25 Most Played" playlist 4324 in response to the user selecting (e.g., by tap 4304) the "Top 25 Most Played" descriptor 4318-2 in FIG. 9A. Items in this playlist 4324 include a Shuffle option 4330 that, when selected, causes the playback order of the tracks in the playlist 4324 to be varied. The playlist also includes individual tracks 4332-*i*, each of which may be shown with a duration indicator.

The device may initiate display of a search input area 3540 in the media player application (FIGS. 9B-9D) in an analogous manner to that described above with respect to FIGS. 5A-5I. In some embodiments, a search window is opened in an analogous manner to the rubber band effect described above in reference to FIGS. 5C-5E. In response to detecting a user scrolling gesture that continues downward after display of the top of a scrollable list (e.g., after display of shuffle option 4330, which appears at the top of the "Top 25 Most Played" scrollable playlist), a search window 3540 appears little by little until it is completely visible, and then snaps back into position adjacent to the playlist heading 4324 when the user ceases the scrolling gesture. In some embodiments, a user can open a search window by activating/tapping a search icon (not shown).

Figure 9C:
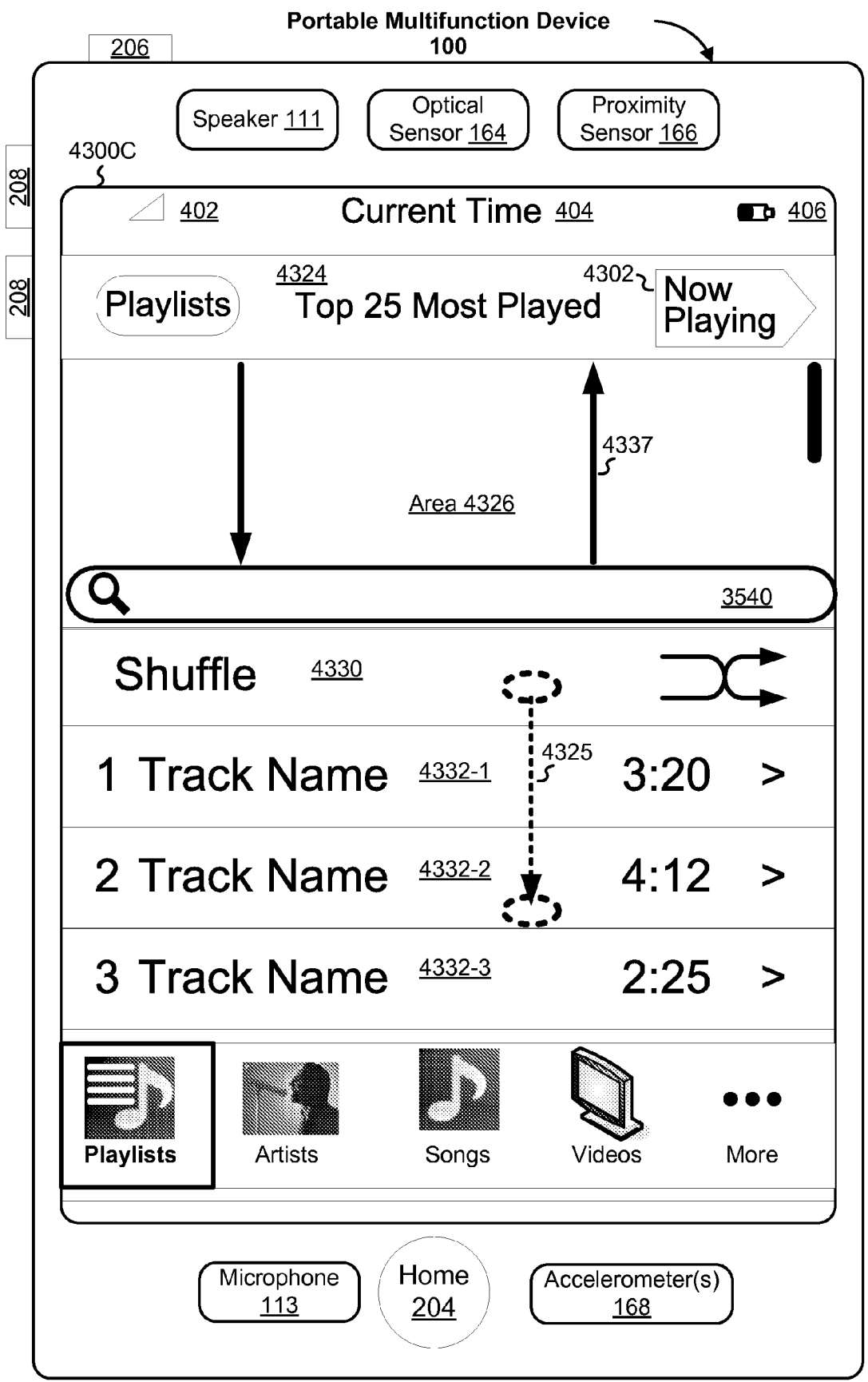

FIG. 9C illustrates an exemplary appearance of the UI 4300C during the process of initiating display of a search input area 3540 in this manner. In some embodiments, in response to detecting the continued downward scroll gesture 4325, the device displays progressively more of the search window 3540 until the window is completely displayed.

In some embodiments, in response to detecting the continued downward scroll gesture 4325 after the window 3540 is completely displayed, the device displays progressively more of an area (e.g., area 4326, FIG. 9C) above the search window 3540 and below the playlist heading 4324. In some embodiments, the background of the UI 4300C shows in the area 4326 above the search window. In other embodiments, a different color/pattern from the background shows in the area 4326 above the search window. During this operation, the media file descriptors 4332-*i* continue to move in concert with the downward scroll gesture 4325, with the result that the media file descriptors 4332-4 through 4332-6 are no longer visible in the UI 4300C.

In response to detecting cessation of user contact with the UI 4300C (e.g., due to the user lifting the finger that is executing the downward scroll operation 4325), the device displays the search window 3540 and the media file descriptors 4332 snapping back up 4337 towards the heading 4324 (the "rubber-band effect").

Figure 9D:

FIG. 9D shows the UI 4300D after the completion of the rubber-band effect illustrated in FIG. 9C. In this figure, the search window 3540 is in its final, user-operable position adjacent to the heading 4324.

Figure 9E:

In response to detecting a gesture on the search input area (e.g., a finger tap 4350, FIG. 9D), the device displays a keyboard 3554 and a plurality of search scope limiter icons 3562 (UI 4300E, FIG. 9E).

In some embodiments, UI 4300E (FIG. 9E) includes the following elements, or a subset or superset thereof:
  402, 404, 406, 616, 618, 620, 628, 3532, 3540, 3552, 3554, and 3562, as described above;
  a heading 4381 for the media player search mode (e.g., "iPod"); and
  4366 media player search results.

As described above with reference to FIG. 5G, activation of a search field specification icon 3562 (e.g., by a finger tap) enables a user to limit the scope of a search associated with application files/data. For media files, exemplary search scope limitations include "Songs" 3562-5, "Album" 3562-6, "Artist" 3562-7, and "All" 3562-8. In some embodiments, these icons can be selected alone or in combination, in which case a search is conducted within media file information that corresponds to the selected icons. For example, to search for a particular search string in Song titles, the user would select the icon "Songs" 3562-5 (e.g., with a finger gesture). In some embodiments, to search for the same string in association with Song and Album titles, the user would select the icons "Songs" 3562-5 and "Albums" 3562-6. In some embodiments, the user can specify a search within all information associated with media files by selecting the "All" icon 3562-8. In some embodiments, only one search scope limiter at a time may be selected.

For example, in FIG. 9E the user selected the search scope limiter All 3562-8 and input "U2" in the search window 3540. This input corresponds to a request to search in the media files stored on the device 100 for all files that are associated with the string "U2." In some embodiments, the search module 151 determines and returns media player search results 4366 as the user types search terms. In such embodiments, given the search string "U2," the search module 151 returns one set of results after entry of the "U" and a second updated set of results (for the string "U2") after entry of the second character, "2". In other embodiments, the search module 151 returns search results 4366 only after the user explicitly requests that the search be performed (e.g., by activating a search button 620 after typing "U2" in the search window). In this example, the UI 4300E shows that two Albums associated with U2 have been returned ("18 Singles" 4366-2 and "How to dismantle an atomic bomb" 4366-3) and one Artist has been returned ("U2" 4366-1). Like the email search results 3576 described above, in some embodiments, the media player search results 4366 that are returned (such as those shown on FIG. 9E) do not include descriptors for every media file stored on the device 100 that contains information that matches the search string. Instead, the UI 4300E may display one entry for each unique match in the media files, whether or not that unique match was found in association with one or many media files. For example, the UI 4300E in FIG. 9E shows one Artist entry for "U2," which would be the case whether there are one or 20 different media files (e.g., Songs, Albums or other files) by the Artist "U2" stored on the device 100.

In some embodiments, a user can see descriptors/information for the individual media files associated with a particular search result entry 4366 by selecting that entry within the UI 4300E. For example, in FIG. 9E, in response to detecting user selection (e.g., by a finger tap) of the album "How to dismantle an atomic bomb" search result, media file descriptors for the album "How to dismantle an atomic bomb" search result are displayed.

Figure 9F:
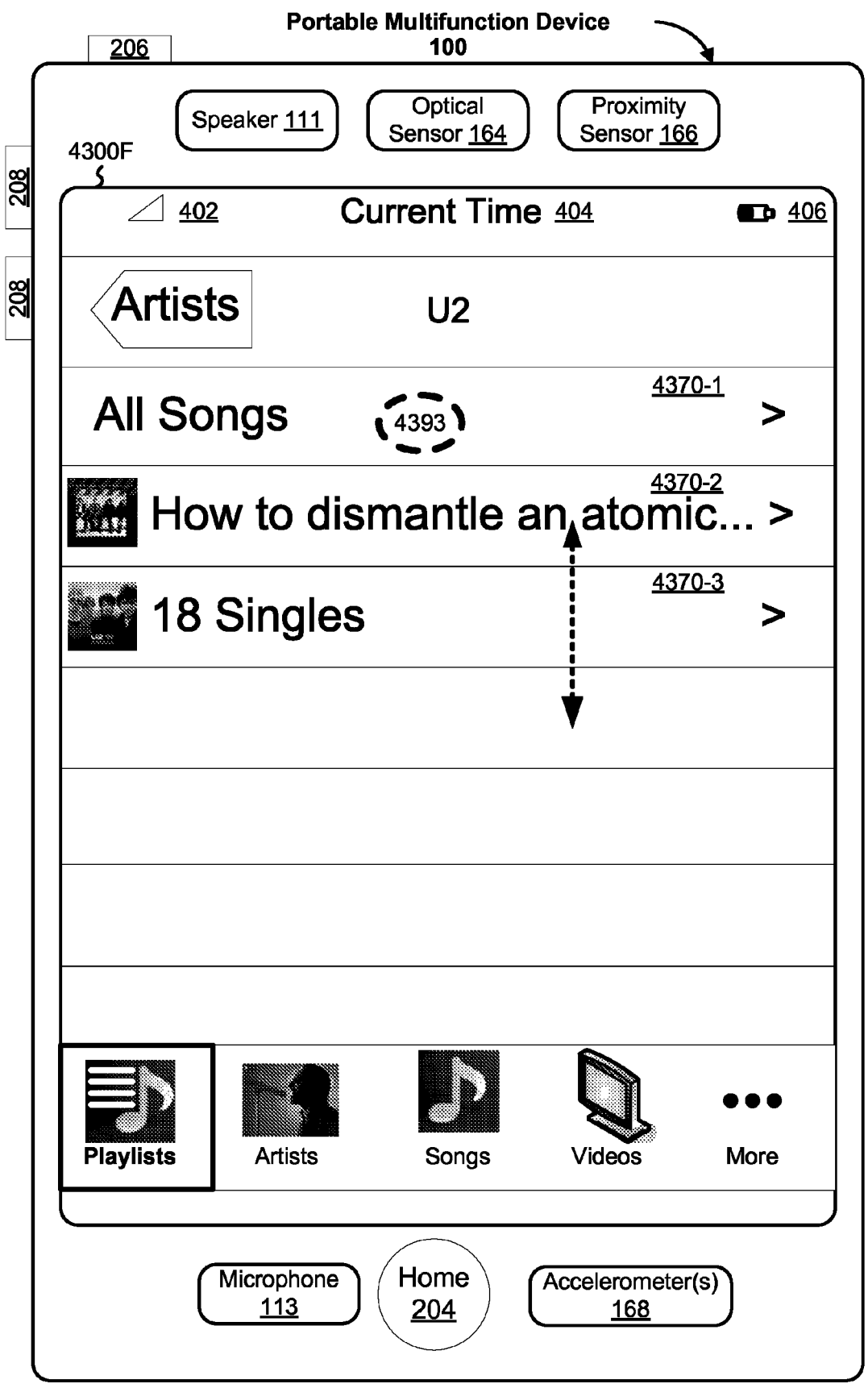

In FIG. 9E, in response to detecting selection by a user (e.g., by a finger tap 3591) of the Artist search result entry for "U2," the device displays a UI for accessing all Songs and/or Albums stored on the device 100 associated with the Artist, "U2" (e.g., UI 4300F, FIG. 9F). Three entries are displayed in UI 4300F: an entry 4370-1 for "All Songs" by the Artist U2, an entry 4370-2 for the album by U2, "How to dismantle an atomic bomb," and entry 4370-3 for the album by U2, "18 Singles." Note that, whereas the album titles are predefined and associated with particular media files, the entry 4370-1 for "All Songs" is returned by the Search module as a convenient place holder for all of the songs associated with an artist "U2" that were identified by the search module 151.

Figure 9G:
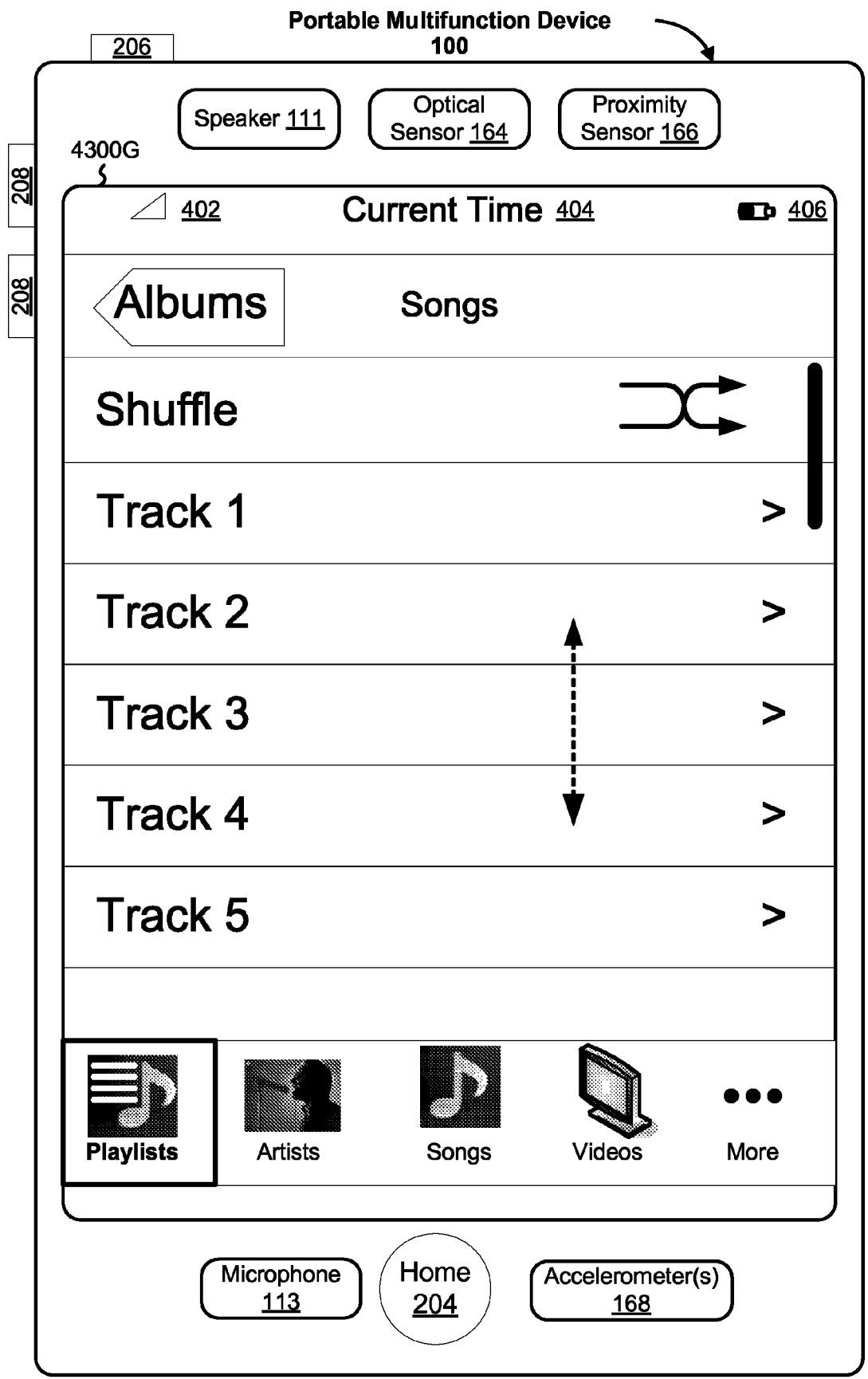
Figure 9H:

In some embodiments, in response to detecting selection of entry 4370-1 (e.g., by a finger tap 4393, FIG. 9F), the device displays a UI with a scrollable list of all media file descriptors 4332 of songs by the Artist U2 that are stored in device 100 (e.g., UI 4300G, FIG. 9G).

In response to detecting selection of the search icon 620 (FIG. 9E) (e.g., by a finger tap gesture), the device displays a UI (e.g., UI 4300H, FIG. 9H) with a scrollable list of search results that include the input entered in the search input area 3540 (e.g., "U2" in FIG. 9E). In some embodiments, if the search results belong to a single category, the scrollable list of search results is a flat list. In some embodiments, if the search results belong to multiple categories 4380, the scrollable list of search results is organized by categories. For example, for the "U2" search, the list of search results may include an album category 4380-1 with a list of U2 album descriptors (e.g., 4370-2 and 4370-3, FIG. 9H) and a song category 4380-2 with a list of U2 song descriptors. The list of U2 song descriptors is not shown in FIG. 9H because the list of "U2" search results must be scrolled to see the entire list, but the U2 song descriptors are analogous to the tracks shown in FIG. 9G. The U2 song descriptors may include U2 songs that are performed by music groups other than U2. Because there are a large number of U2 albums, the list of U2 album descriptors may only include the top N albums (where N is an integer, such as 2, 5, or 10) and an icon 4382 (e.g., a "See all albums" icon 4382) that when activated (e.g., by a finger tap) initiates display of more of the U2 album descriptors. Similarly, because there are a large number of U2 songs, the list of U2 song descriptors may only include the top M songs (where M is an integer, such as 10, 25 or 50) and an icon (e.g., a "Load M more results" icon, not shown but analogous to icon 4382) that when activated (e.g., by a finger tap) initiates display of more of the U2 songs descriptors. For the media player application, other exemplary categories include artists, videos, and podcasts. For other applications, an analogous scrollable list of search results is displayed in response to detecting selection of the search icon 620 while in the search mode for the application.

The preceding multi-stage search result display process enables a user who is performing a search on a portable multifunction device 100 with a relatively small display to easily manage and view a large set of search results.

Figure 10A:
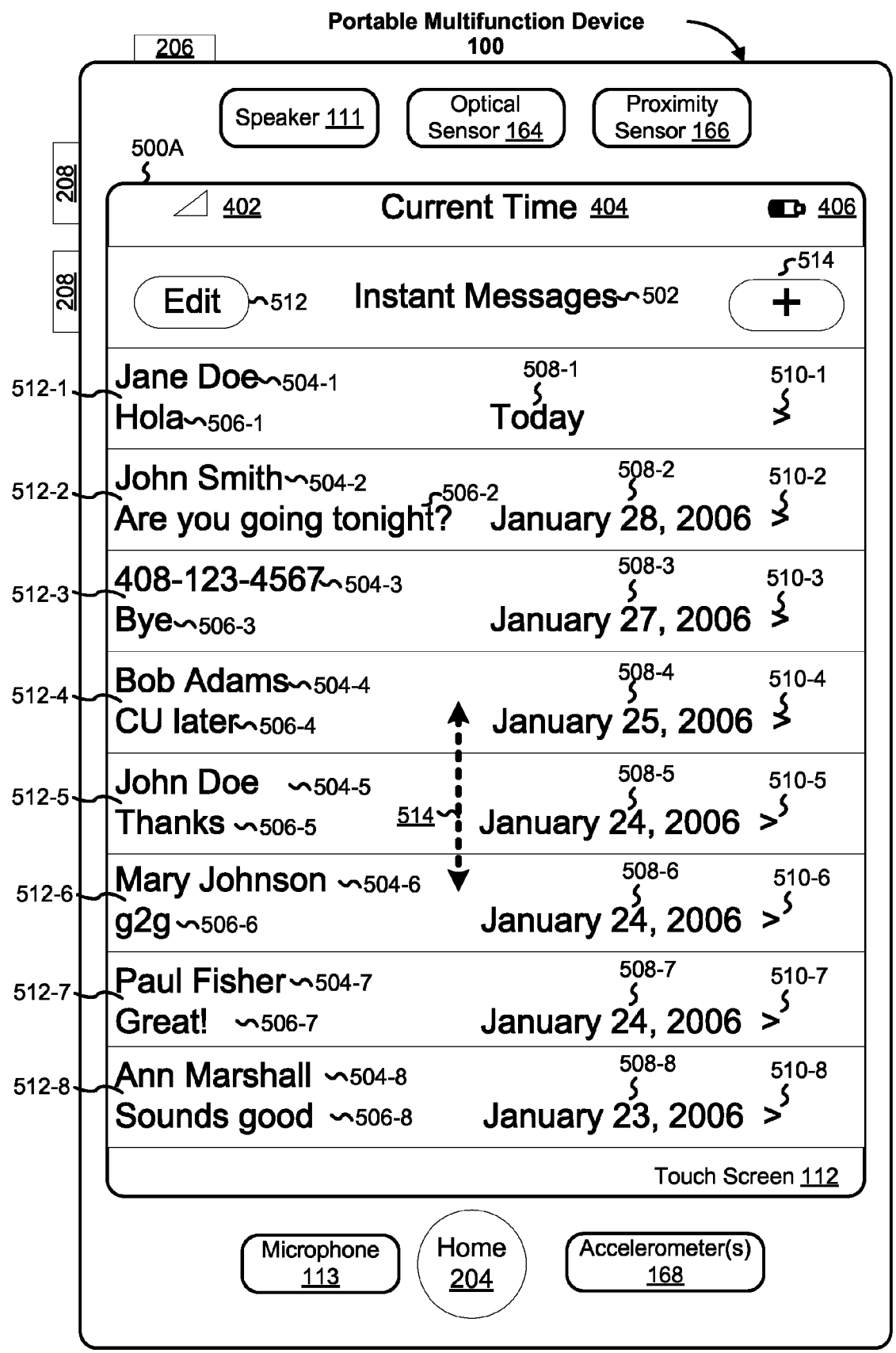
FIGS. 10A-10B illustrate exemplary user interfaces for a search facility for use with an instant messaging application in accordance with some embodiments.
Figure 10B:

FIGS. 10A-10B illustrate exemplary user interfaces for a search facility for use with an instant messaging (IM) module/application 141 (FIG. 1A) in accordance with some embodiments. As shown in FIG. 10A, an exemplary UI 500A for an IM application 141 includes the following elements, or a subset or superset thereof:

- 402, 404, 406, 616, 618, 620, 628, 3532, 3540, and 3554, as described above.
- A heading 502 that indicates the identity of the current application (in this case, "Instant Messages").
- An "edit" icon 512 ("Edit") that when activated (e.g., by a finger tap on the icon) initiates display of an edit interface in which a user can edit the list of IMs (e.g., to delete IMs or IM exchanges).
- An "add" icon (e.g., "+") 514 that allows a user to create a new IM using a virtual keyboard 3554.
- A collection of IM descriptors 512-i. In some embodiments, each descriptors includes:
  - the name of the sender 504-i,
  - the date sent 508-i,
  - an extract of the IM 506, and
  - a selection icon 510-i (">").

In some embodiments, the IM descriptor 512-i corresponds to a single IM. In some embodiments, the IM descriptor 512-i corresponds to a plurality of IMs exchanged between the sender 504-i and a user; the extract 506-i corresponds to a portion of the most recent IM in the exchange; and the date 508-i corresponds to the time of the most recent IM in the exchange.

The UI 500A typically shows information for at least a subset of the IMs that are stored locally on the device 100. In some embodiments, descriptors for additional IMs that are not in view on the UI 500A can be displayed in response to a user scroll gesture 514, which operates in some embodiments as described above in reference to FIG. 5A.

Referring to FIG. 10B, in some embodiments a user can open a search window 3540 as described in reference to FIGS. 5C-5E. By scrolling down past the top of the IM list (e.g., past the most recent IM 512-1) and continuing to pull down, a search window 3540 appears little by little until it is completely visible, and then snaps back into position adjacent to the IM heading 502 when the user ceases scrolling (i.e., the rubber-band effect described above). FIG. 10B shows the UI 500B after the user has opened a search window 3540 and tapped on the window, which initiates display of a virtual keyboard 3554 (FIG. 10B) for entry of one or more search terms. FIG. 10B also shows a further view of the UI 500 after the user has entered the character, "D" in the search input area 3540 using the virtual keyboard 3554.

In some embodiments, the search module 151 can perform predictive auto-completion wherein possible IM search terms are suggested based on matches between the one or more characters entered by the user and information associated with a dictionary and/or with prior IMs. For example, in FIG. 10B, in response to user entry of "D" in the search window 3540, the search module suggests a possible complete entry "Doe" to be searched, which corresponds to two senders of past IMs (Jane Doe 504-1 and John Doe 504-5, FIG. 10A). In some embodiments, additional suggested characters to complete the user's search input entry are shown inside parentheses. These additional characters may be displayed in any number of ways, including in a fainter or different font, or in a different color. In addition to or in place of the additional suggested characters, IM(s) or IM conversation(s) corresponding to the suggested search term (here, for senders Jane Doe 504-1 and John Doe 504-5) are displayed in a panel just below the search window 520. This method enables the user to search for and access IMs from past correspondents with fewer keystrokes, which is an advantage for portable multifunction devices.

In some embodiments, a portable multifunction device (e.g., device 100) includes: one or more processors 120; a touch screen display 112; and memory 102. Memory 102 stores a plurality of applications 136, including email 140, calendar 148, and contacts 137. In some embodiments, memory 102 stores other applications, such as a notes application 153 and an IM application 141. Memory 102 stores respective search input interfaces for the email 140, calendar 148, and contacts 137 applications. In some embodiments, memory 102 stores respective search input interfaces for other applications, such as a notes application 153 and an IM application 141. Each search input interface is used for entering a search query for the respective application. Each of the email 140, calendar 148, and contacts 137 applications has an application interface region for simultaneous display with the corresponding search input interface. In some embodiments, the notes application 153 and the IM application 141 each have an application interface region for simultaneous display with the corresponding search input interface.

In some embodiments, each search input interface includes a search input area (e.g., 3540). The search query comprises entering one or more letters in the search input area. A scrollable list of search results is displayed on the touch screen display as each letter in the one or more letters is entered in the search input area.

The user interfaces in FIGS. 5A-5I, 6A-6C, 7A-7H, 8A-8E, 9A-9H and 10A-10B are used to illustrate the processes described below with respect to FIGS. 11A-11C, and 12A-12B.

Figure 11A:
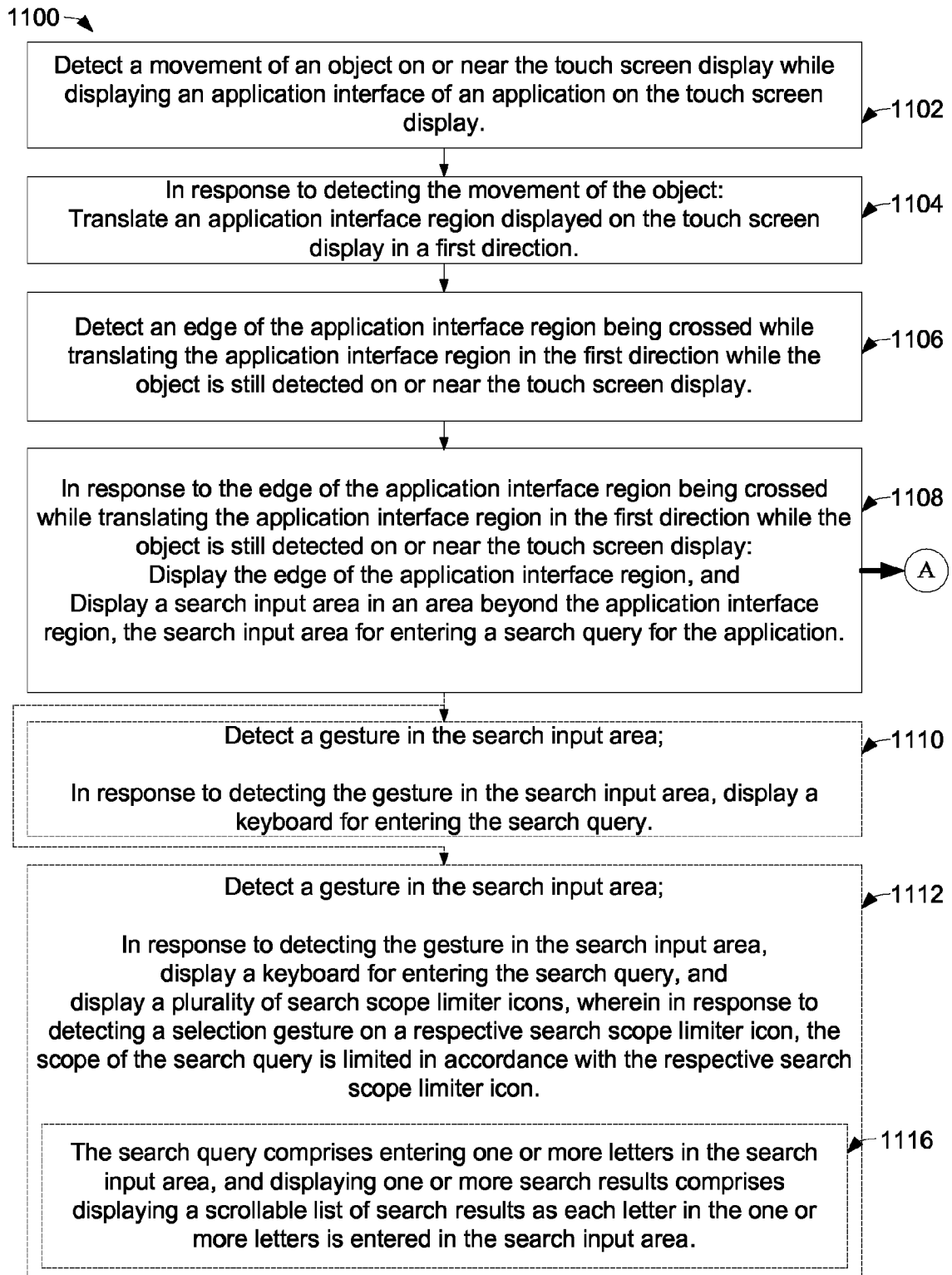
FIGS. 11A-11C are flow diagrams illustrating a method of searching application data in accordance with some embodiments.
Figure 11B:
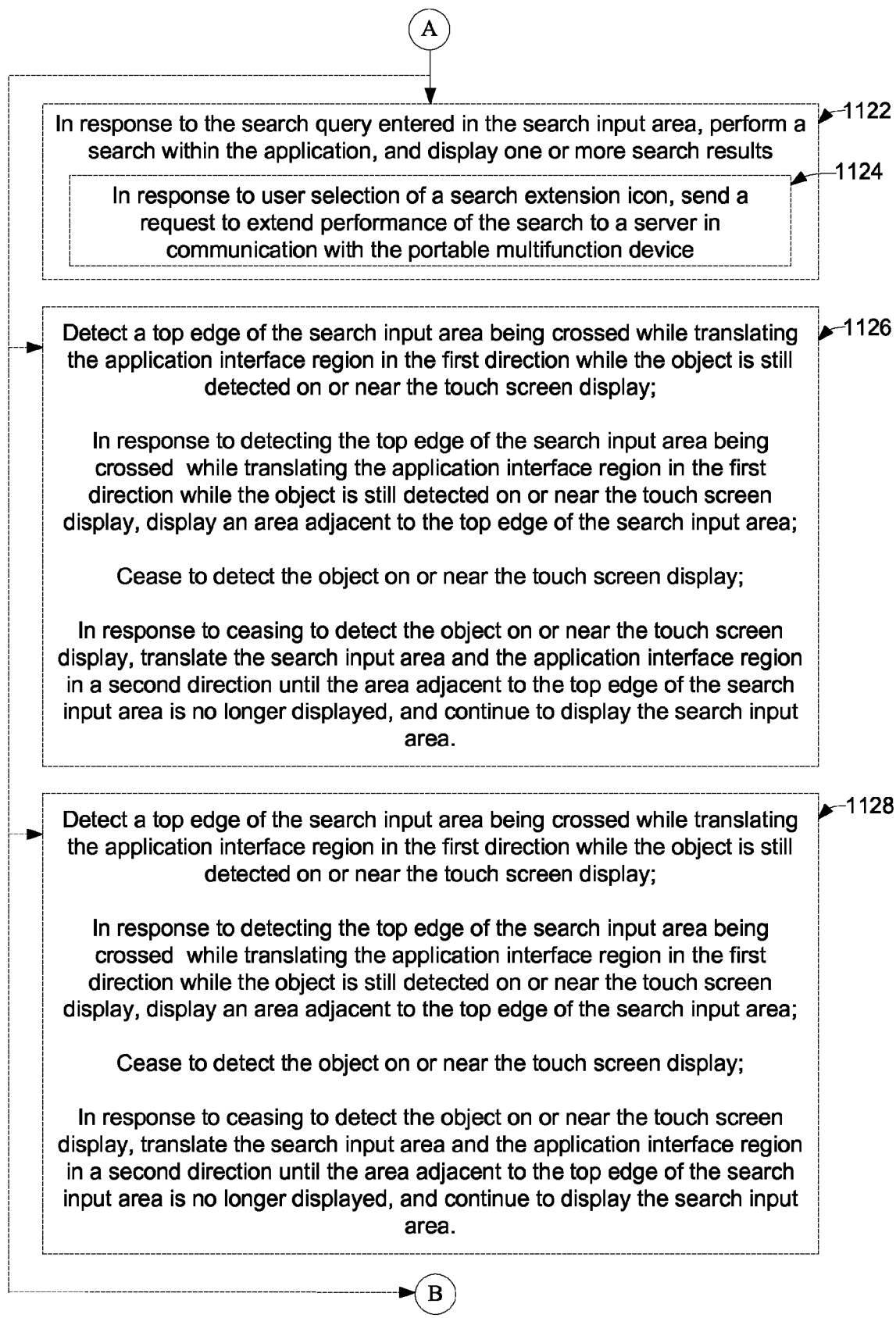
Figure 11C:
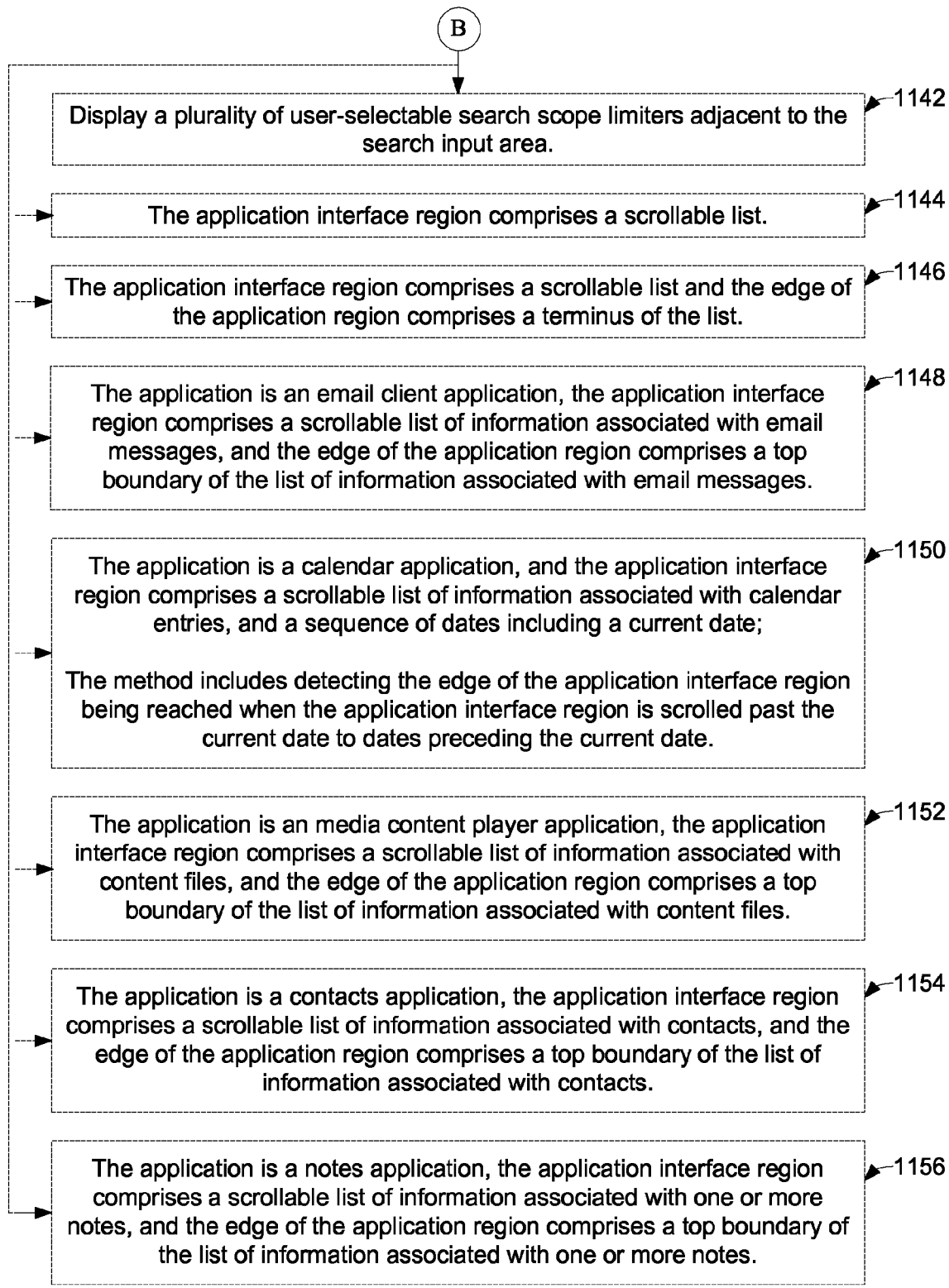

FIGS. 11A-11C are flow diagrams illustrating a method 1100 of searching application data in accordance with some embodiments. This method is performed at a portable multifunction device with a touch screen display (e.g., portable multifunction device 100). This method provides a simple and intuitive way for a user to search for and access information for a wide range of applications within a portable multifunction device with limited display and user input space.

The device detects (1102) a movement of an object (e.g., a finger) on or near the touch screen display while displaying an application interface of an application on the touch screen display (e.g., scroll gesture 3514 on a list of email message descriptors 3526, FIG. 5A).

In response to detecting the movement of the object, the device translates (1104) an application interface region displayed on the touch screen display in a first direction (e.g., a list of email descriptors 3526-i are scrolled downward from FIG. 5A to FIG. 5B, with FIG. 5B revealing an additional email descriptor 3526-1 at the top of the list of emails 3526-i).

The device detects (1106) an edge of the application interface region being crossed (e.g., the top edge 3501 of the list of email descriptors 3526-i, FIG. 5C) while translating the application interface region in the first direction while the object is still detected on or near the touch screen display. As used herein, an edge of the application interface region is crossed when the edge becomes visible on the touch screen display due to the translation of the application interface region.

In response to the edge 3501 of the application interface region being crossed while translating the application interface region in the first direction while the object is still detected on or near the touch screen display, the device displays (1108) the edge 3501 of the application interface region, and displays a search input area (e.g., 3540, FIGS. 5C-5E) in an area beyond the application interface region (e.g., beyond the edge 3501 of the list of email descriptors 3526-*i*). The search input area 3540 is for entering a search query for the application. In some embodiments the search input area is displayed adjacent to the application interface region (e.g., search input area 3540 is adjacent to the list of email descriptors 3526-*i*, FIG. 5E).

In some embodiments, the device detects (1110) a gesture (e.g., a finger tap gesture) in the search input area. In response to detecting the gesture in the search input area, the device displays a keyboard for entering the search query.

In some embodiments, the device detects (1112) a gesture (e.g., a finger tap gesture 3550, FIG. 5E) in the search input area 3540. In response to detecting the gesture in the search input area, the device displays a keyboard for entering the search query (e.g., keyboard 3554, FIG. 5G), and the device displays a plurality of search scope limiter icons (e.g., icons 3562-1-3562-4, FIG. 5G). In response to detecting a selection gesture on a respective search scope limiter icon (e.g., a finger tap gesture on the icon), the scope of the search query is limited in accordance with the respective search scope limiter icon (e.g., limiting an email search to "From", "To", or "Subject" searches, FIG. 5G).

In some embodiments, the search query comprises (1116) entering one or more letters in the search input area, and displaying one or more search results comprises displaying a scrollable list of search results as each letter in the one or more letters is entered in the search input area. For example, FIGS. 5G and 5H display a scrollable list of email search results 3576 after "A" and "Aa," respectively, are entered in the search input area 3540.

In some embodiments, in response to the search query entered in the search input area, the device performs (1122) a search within the application, and displays one or more search results.

In some embodiments, in response to user selection of a search extension icon, the device sends (1124) a request to extend performance of the search to a server in communication with the portable multifunction device (e.g., searching for additional emails in a remote email database in response to user selection (e.g., by finger tap 3580) on search extension icon 3590, FIG. 5I).

In some embodiments, the device detects (1126) a top edge of the search input area 3540 being crossed while translating the application interface region in the first direction while the object is still detected on or near the touch screen display. In response to detecting the top edge of the search input area being crossed while translating the application interface region in the first direction while the object is still detected on or near the touch screen display, the device displays an area adjacent to the top edge of the search input area (e.g., area 3544 adjacent to search input area 3540, FIG. 5D). The device ceases to detect the object on or near the touch screen display. In response to ceasing to detect the object on or near the touch screen display, the device translates (e.g., 3546, FIG. 5D) the search input area and the application interface region in a second direction until the area 3544 adjacent to the top edge of the search input area is no longer displayed, and the device continues to display the search input area (e.g., as shown in FIGS. 5D and 5E).

In some embodiments, the device detects (1128) a top edge of the search input area being crossed while translating the application interface region in the first direction while the object is still detected on or near the touch screen display. In response to detecting the top edge of the search input area being crossed while translating the application interface region in the first direction while the object is still detected on or near the touch screen display, the device displays an area between the search input area and the application interface region (not shown, but equivalent to swapping the positions of area 3544 and search input box 3540 in FIG. 5D). The device ceases to detect the object on or near the touch screen display. In response to ceasing to detect the object on or near the touch screen display, the device translates the application interface region in a second direction until the area between the search input area and the application interface region is no longer displayed, and the device continues to display the search input area (e.g., FIG. 5E).

In some embodiments, the device displays (1142) a plurality of user-selectable search scope limiters adjacent to the search input area 3540 (e.g., search scope limiters 3562, FIG. 5G).

In some embodiments, the application interface region comprises (1144) a scrollable list (e.g., the scrollable list of email descriptors 3526, FIG. 5A).

In some embodiments, the application interface region comprises (1146) a scrollable list and the edge of the application region comprises a terminus of the list. In some embodiments, the edge of the application region comprises a top boundary of the list (e.g., the top edge 3501 of the list of email descriptors 3526, FIG. 5C).

In some embodiments, the application is (1148) an email client application 140, the application interface region comprises a scrollable list of information associated with email messages (e.g., email descriptors 3526), and the edge of the application region comprises a top boundary (e.g., the top edge 3501, FIG. 5C) of the list of information associated with email messages. In some embodiments, the information associated with a respective email message may include the name of the email message sender 3506, the subject of the email message 3508, and/or a portion of text (e.g., the first few lines) from the email message.

In some embodiments, the application is (1150) a calendar application 148, and the application interface region comprises a scrollable list of information associated with calendar entries 4924 (FIG. 7A), and a sequence of dates including a current date (e.g., 4922-1, FIG. 7A). The device detects the edge of the application interface region being reached when the application interface region is scrolled past the current date to dates preceding the current date (as shown in FIGS. 7A and 7B).

In some embodiments, the application is (1152) a media content player application 152, the application interface region comprises a scrollable list of information associated with content files (e.g., shuffle option 4330 and tracks 4332, FIG. 9B), and the edge of the application region comprises a top boundary of the list of information associated with content files (e.g., the top boundary of the shuffle option 4330). The content may include music, videos, podcasts, and/or audio books. For music content, the scrollable list may include a list of playlists, a list of artists, a list of songs, a list of albums, or a list of genres.

In some embodiments, the application is (1154) a contacts application 137, the application interface region comprises a scrollable list of information associated with contacts (e.g., contact descriptors 812, FIG. 6B), and the edge of the application region comprises a top boundary of the list of information associated with contacts. The information associated with a respective contact may include the name of the contact.

In some embodiments, the application is (1156) a notes application 153, the application interface region comprises a scrollable list of information associated with one or more notes (e.g., note descriptors 4824, FIG. 8B), and the edge of the application region comprises a top boundary of the list of information associated with one or more notes. The information associated with a respective note may include a portion of the first line of information in the note.

Figure 12A:
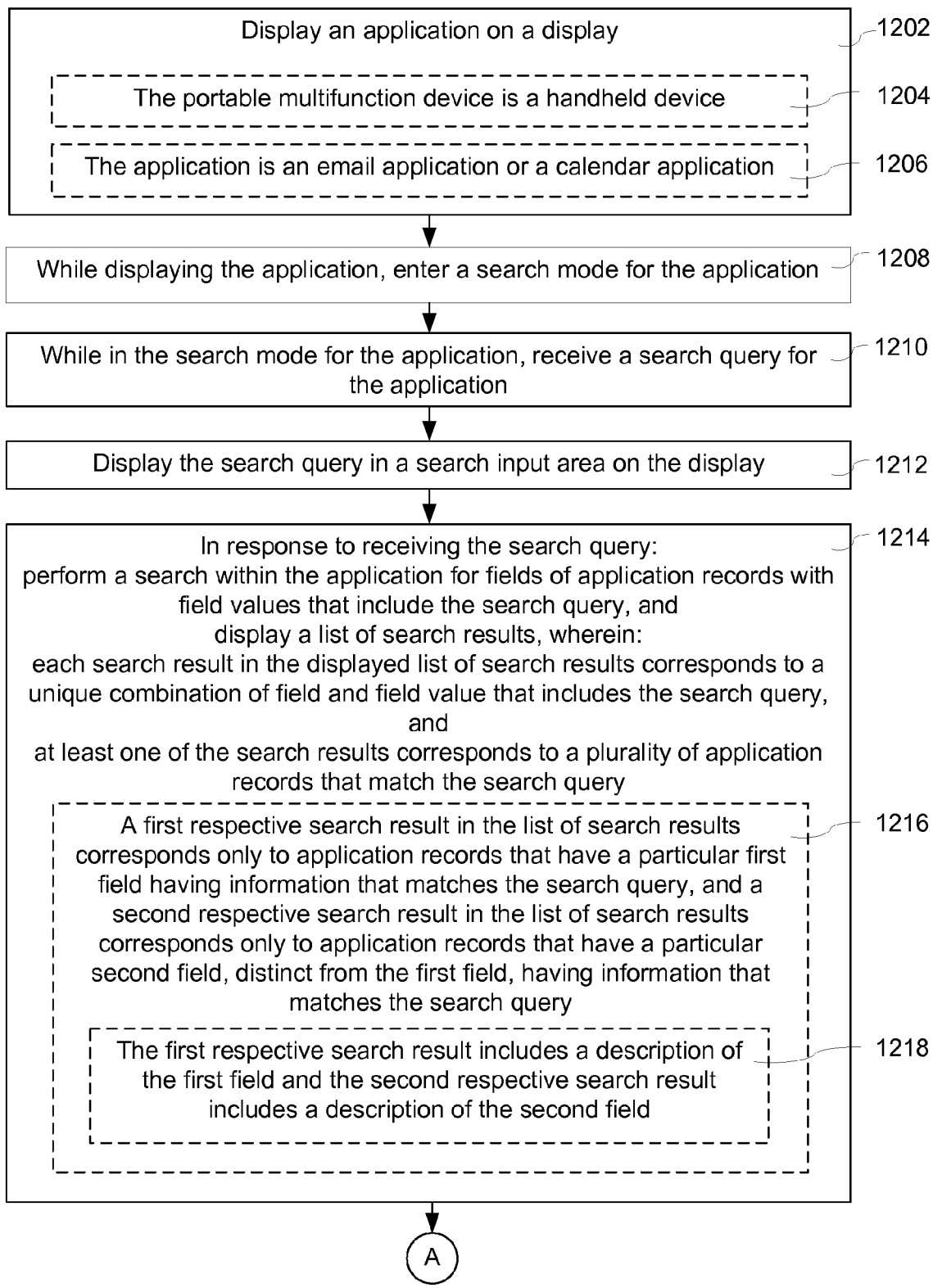
FIGS. 12A-12B are flow diagrams illustrating a method of searching application data in accordance with some embodiments.
Figure 12B:
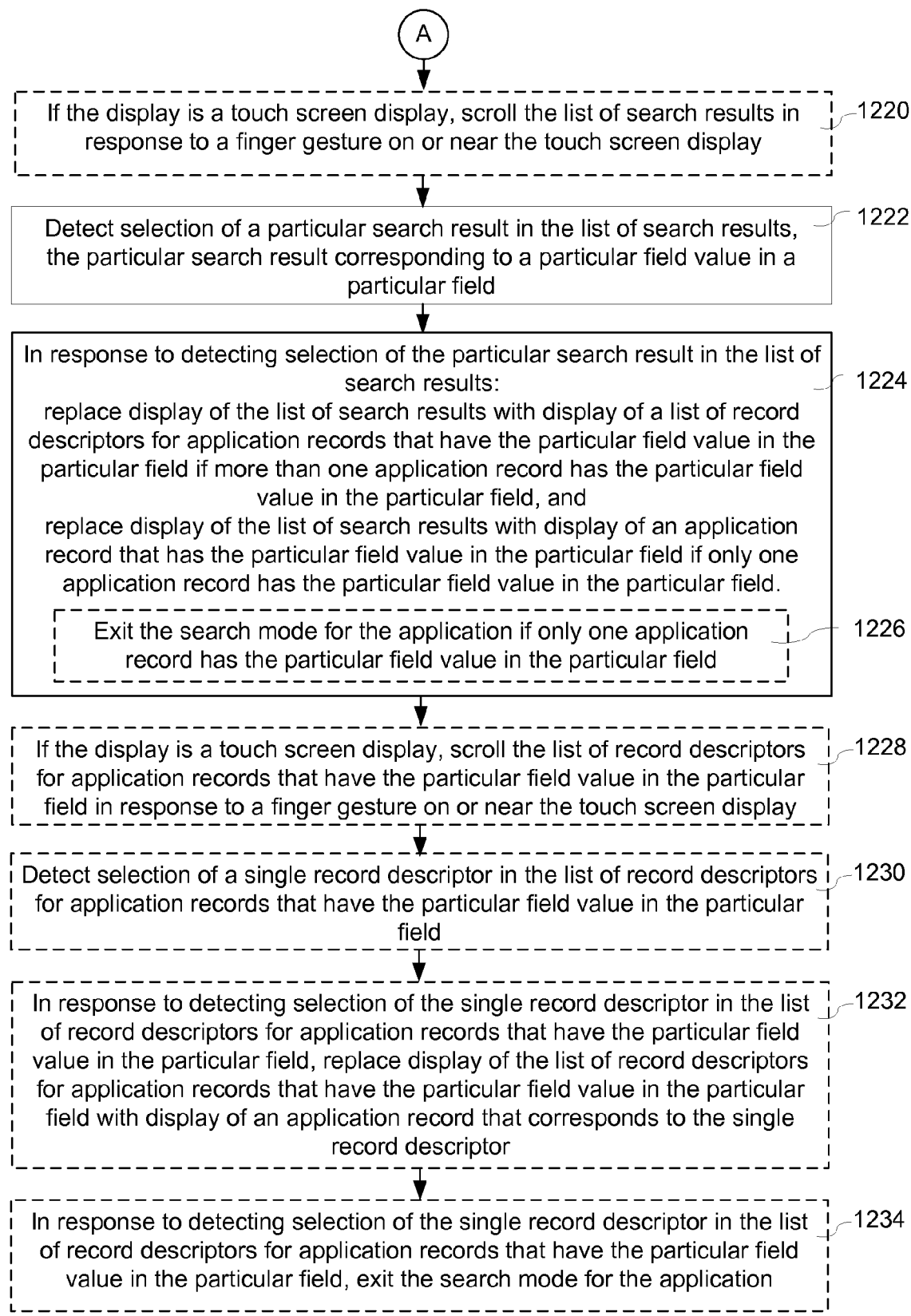

FIGS. 12A-12B are flow diagrams illustrating a method 1200 of searching application data in accordance with some embodiments. This method is performed at a portable multifunction device with a display (e.g., portable multifunction device 100). In some embodiments, the display is a touch screen display (e.g., touch screen display 112). This method provides a simple and intuitive way for a user to search for and access application information within a portable multifunction device with limited display and user input space.

The portable multifunction device displays (1202) an application on the display. In some embodiments, the portable multifunction device is a handheld device (1204). In some embodiments, the application is an email application 140 or a calendar application 148 (1206).

While displaying the application, the device enters (1208) a search mode for the application. For example, while displaying the calendar application (FIG. 7B), the device enters a search mode for the calendar application (FIG. 7C) in response to contact 3541 on search window 3540.

While in the search mode for the application, the device receives (1210) a search query for the application. The device displays (1212) the search query in a search input area on the display. For example, while in the search mode for the calendar application (FIG. 7C), the device receives the search query "S" and displays the "S" in search input area 3540.

In response to receiving the search query: the device performs (1214) a search within the application for fields of application records with field values that include the search query, and the device displays a list of search results. Each search result in the displayed list of search results corresponds to a unique combination of field and field value that includes the search query. In other words, no two search results in the displayed list of search results have the same combination of field and field value that includes the search query. At least one of the search results corresponds to a plurality of application records that match the search query. For example, in response to receiving the search query "S" in the calendar application: the device performs a search within the calendar application for fields of calendar application records with field values that include the search query "S", and the device displays a list of calendar search results, namely calendar components 4936 (FIG. 7C). Each calendar search result 4936 in the displayed list of search results corresponds to a unique combination of field and field value that includes the search query (e.g., title field with field value "Scott's Birthday," attendee field with field value "Scott Hertz," and location field with location value "Scott's Office"). Search result 4936-2 (Attendee=Scott Hertz) corresponds to a plurality of application records that match the search query (i.e., the calendar records that correspond to calendar entry descriptors 4924-6-4924-9 in FIG. 7F). Search result 4936-3 (Location=Scott's Office) corresponds to a plurality of application records that match the search query (i.e., the calendar records that correspond to calendar entry descriptors 4924-11-4924-13 in FIG. 7H).

In some embodiments, a first respective search result in the list of search results corresponds only to application records that have a particular first field having information that matches the search query, and a second respective search result in the list of search results corresponds only to application records that have a particular second field, distinct from the first field, having information that matches the search query (1216). In some embodiments, the first respective search result includes a description of the first field and the second respective search result includes a description of the second field (1218). For example, in FIG. 7C, calendar search result 4936-2 corresponds only to calendar application records that have a particular first field (attendee) having information that matches the search query, and calendar search result 4936-3 corresponds only to calendar application records that have a particular second field (location), distinct from the first field, having information that matches the search query. Calendar search result 4936-2 includes a description of the first field ("Attendee") and calendar search result 4936-3 includes a description of the second field ("Location").

In some embodiments, if the display is a touch screen display, the device scrolls (1220) the list of search results in response to a finger gesture on or near the touch screen display (e.g., scroll 4951, FIG. 7C).

The device detects (1222) selection of a particular search result in the list of search results, the particular search result corresponding to a particular field value in a particular field.

In response to detecting selection of the particular search result in the list of search results: the device replaces display of the list of search results with display of a list of record descriptors for application records that have the particular field value in the particular field if more than one application record has the particular field value in the particular field, and the device replaces display of the list of search results with display of an application record that has the particular field value in the particular field if only one application record has the particular field value in the particular field (1224). For example, in response to selection (e.g., with finger tap 4939) of calendar search result 4936-2 (FIG. 7E), the device replaces display of the list of calendar search results 4936 (FIG. 7E) with display of a list 4958 of event descriptors 4924 for calendar records that have the particular field value "Scott Hertz" in the attendee field (FIG. 7F). Similarly, in response to selection (e.g., with finger tap 4941) of calendar search result 4936-3 (FIG. 7G), the device replaces display of the list of calendar search results 4936 (FIG. 7G) with display of a list 4959 of event descriptors 4924 for calendar records that have the particular field value "Scott's Office" in the location field (FIG. 7H). On the other hand, in response to selection (e.g., with finger tap 4937) of calendar search result 4936-1 (FIG. 7C), the device replaces display of the list of calendar search results 4936 (FIG. 7C) with display of a calendar record that has the particular field value "Scott's Birthday" in the title field (FIG. 7D) because only one calendar record has the particular field value "Scott's Birthday" in the title field.

In some embodiments, in response to detecting selection of the particular search result in the list of search results, the device exits (1226) the search mode for the application if only one application record has the particular field value in the particular field. For example, in response to detecting selection of calendar search result 4936-1 in the list of search results (FIG. 7C), the device exits the search mode for the calendar application because only one calendar record has the particular field value "Scott's Birthday" in the title field (FIG. 7D). The device is no longer in the search mode in FIG. 7D.

In some embodiments, if the display is a touch screen display, the device scrolls (1228) the list of record descriptors for application records that have the particular field value in the particular field in response to a finger gesture on or near the touch screen display. For example, the lists (4958 and 4959) of event descriptors 4924 in FIGS. 7F and 7H, respectively, may be scrolled in response to a finger gesture on or near the touch screen display (as indicated by the double arrows).

In some embodiments, the device detects (1230) selection of a single record descriptor in the list of record descriptors for application records that have the particular field value in the particular field. In response to detecting selection of the single record descriptor in the list of record descriptors for application records that have the particular field value in the particular field, the device replaces (1232) display of the list of record descriptors for application records that have the particular field value in the particular field with display of an application record that corresponds to the single record descriptor. For example, in response to detecting selection of event descriptor 4924-6 in list 4958 (FIG. 7F), the device replaces display of the list 4958 with display of an application record that corresponds to the single record descriptor 4924-6 (not shown, but analogous to the display of the application record in FIG. 7D).

In some embodiments, in response to detecting selection of the single record descriptor in the list of record descriptors for application records that have the particular field value in the particular field, the device exits (1234) the search mode for the application. For example, in response to detecting selection of event descriptor 4924-6 in list 4958 FIG. 7F), the device exits the search mode for the calendar application.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method, comprising:
on a portable multifunction device having a touch screen display, while displaying an application interface of an application on the touch screen display,
detecting a movement of an object on or near the touch screen display;
in response to detecting the movement of the object, translating an application interface region displayed on the touch screen display in a first direction;
detecting an edge of the application interface region being crossed while translating the application interface region in the first direction while the object is still detected on or near the touch screen display; and
in response to the edge of the application interface region being crossed while translating the application interface region in the first direction while the object is still detected on or near the touch screen display, displaying the edge of the application interface region, and
displaying a search input area in an area beyond the application interface region; wherein the search input area is for entering a search query for the application.

2. The method of claim 1, including
detecting a gesture in the search input area; and
in response to detecting the gesture in the search input area, displaying a keyboard for entering the search query.

3. The method of claim 1, including
detecting a gesture in the search input area; and
in response to detecting the gesture in the search input area, displaying a keyboard for entering the search query, and displaying a plurality of search scope limiter icons, wherein in response to detecting a selection gesture on a respective search scope limiter icon, the scope of the search query is limited in accordance with the respective search scope limiter icon.

4. The method of claim 1, including
in response to the search query entered in the search input area, performing a search within the application, and displaying one or more search results.

5. The method of claim 4, further including, in response to user selection of a search extension icon, sending a request to extend performance of the search to a server in communication with the portable multifunction device.

6. The method of claim 1, including
detecting a top edge of the search input area being crossed while translating the application interface region in the first direction while the object is still detected on or near the touch screen display;
in response to detecting the top edge of the search input area being crossed while translating the application interface region in the first direction while the object is still detected on or near the touch screen display, displaying an area adjacent to the top edge of the search input area;
ceasing to detect the object on or near the touch screen display; and
in response to ceasing to detect the object on or near the touch screen display, translating the search input area and the application interface region in a second direction until the area adjacent to the top edge of the search input area is no longer displayed, and continuing to display the search input area.

7. The method of claim 1, including
detecting a top edge of the search input area being crossed while translating the application interface region in the first direction while the object is still detected on or near the touch screen display;
in response to detecting the top edge of the search input area being crossed while translating the application interface region in the first direction while the object is still detected on or near the touch screen display, displaying an area between the search input area and the application interface region;
ceasing to detect the object on or near the touch screen display; and
in response to ceasing to detect the object on or near the touch screen display, translating the application interface region in a second direction until the area between the search input area and the application interface region is no longer displayed, and continuing to display the search input area.

8. The method of claim 1, including displaying a plurality of user-selectable search scope limiters adjacent to the search input area.

9. The method of claim 1, wherein the application interface region comprises a scrollable list.

10. The method of claim 1, wherein the application interface region comprises a scrollable list and the edge of the application region comprises a terminus of the list.

11. The method of claim 1, wherein the application is an email client application, the application interface region comprises a scrollable list of information associated with email messages, and the edge of the application region comprises a top boundary of the list of information associated with email messages.

12. The method of claim 1, wherein,
the application is a calendar application, and
the application interface region comprises
a scrollable list of information associated with calendar entries, and
a sequence of dates including a current date;
the method including detecting the edge of the application interface region being reached when the application interface region is scrolled past the current date to dates preceding the current date.

13. The method of claim 1, wherein the application is a media content player application, the application interface region comprises a scrollable list of information associated with content files, and the edge of the application region comprises a top boundary of the list of information associated with content files.

14. The method of claim 1, wherein the application is a contacts application, the application interface region comprises a scrollable list of information associated with contacts, and the edge of the application region comprises a top boundary of the list of information associated with contacts.

15. The method of claim 1, wherein the application is a notes application, the application interface region comprises a scrollable list of information associated with one or more notes, and the edge of the application region comprises a top boundary of the list of information associated with one or more notes.

16. The method of claim 3, wherein,
the search query comprises entering one or more letters in the search input area, and
displaying one or more search results comprises displaying a scrollable list of search results as each letter in the one or more letters is entered in the search input area.

17. A portable multifunction device, comprising:
a touch screen display;
one or more processors;
memory; and
one or more programs, wherein the one or more programs are stored in the memory and configured to be executed by the one or more processors, the one or more programs including:
instructions for detecting a movement of an object on or near the touch screen display while displaying an application interface of an application on the touch screen display;
instructions for, in response to detecting the movement of the object, translating an application interface region displayed on the touch screen display in a first direction;
instructions for detecting an edge of the application interface region being crossed while translating the application interface region in the first direction while the object is still detected on or near the touch screen display; and
instructions for, in response to the edge of the application interface region being crossed while translating the application interface region in the first direction while the object is still detected on or near the touch screen display,
displaying the edge of the application interface region, and
displaying a search input area in an area beyond the application interface region; wherein the search input area is for entering a search query for the application.

18. A non-transitory computer readable storage medium having stored therein instructions, which when executed by a portable multifunction device with a touch screen display, cause the device to:
detect a movement of an object on or near the touch screen display while displaying an application interface of an application on the touch screen display;
in response to detecting the movement of the object, translate an application interface region displayed on the touch screen display in a first direction;
detect an edge of the application interface region being crossed while translating the application interface region in the first direction while the object is still detected on or near the touch screen display; and
in response to the edge of the application interface region being crossed while translating the application interface region in the first direction while the object is still detected on or near the touch screen display,
display the edge of the application interface region, and
display a search input area in an area beyond the application interface region; wherein the search input area is for entering a search query for the application.

19. A graphical user interface on a portable multifunction device with a touch screen display, comprising:
an application interface of an application that includes an application interface region with an edge; and
a search input area for entering a search query for the application;
wherein:
in response to detecting a movement of an object on or near the touch screen display, the application interface region is translated on the touch screen display in a first direction; and
in response to the edge of the application interface region being crossed while translating the application interface region in the first direction while the object is still detected on or near the touch screen display,
the edge of the application interface region is displayed, and
the search input area is displayed in an area beyond the application interface region.

20. The device of claim 17, including instructions for:
detecting a gesture in the search input area; and
in response to detecting the gesture in the search input area,
displaying a keyboard for entering the search query, and
displaying a plurality of search scope limiter icons, wherein in response to detecting a selection gesture on a respective search scope limiter icon, the scope of the search query is limited in accordance with the respective search scope limiter icon.

21. The device of claim 17, including instructions for:
detecting a top edge of the search input area being crossed while translating the application interface region in the first direction while the object is still detected on or near the touch screen display;
in response to detecting the top edge of the search input area being crossed while translating the application interface region in the first direction while the object is still detected on or near the touch screen display, displaying an area adjacent to the top edge of the search input area;
ceasing to detect the object on or near the touch screen display; and in response to ceasing to detect the object on or near the touch screen display, translating the search input area and the application interface region in a second direction until the area adjacent to the top edge of the search input area is no longer displayed, and continuing to display the search input area.

22. The device of claim 17, including instructions for:
   detecting a top edge of the search input area being crossed while translating the application interface region in the first direction while the object is still detected on or near the touch screen display;
   in response to detecting the top edge of the search input area being crossed while translating the application interface region in the first direction while the object is still detected on or near the touch screen display, displaying an area between the search input area and the application interface region;
   ceasing to detect the object on or near the touch screen display; and
   in response to ceasing to detect the object on or near the touch screen display, translating the application interface region in a second direction until the area between the search input area and the application interface region is no longer displayed, and continuing to display the search input area.

23. The device of claim 17, including instructions for displaying a plurality of user-selectable search scope limiters adjacent to the search input area.

24. The device of claim 17, wherein the application interface region comprises a scrollable list and the edge of the application region comprises a terminus of the list.

25. The device of claim 17, wherein the application is an email client application, the application interface region comprises a scrollable list of information associated with email messages, and the edge of the application region comprises a top boundary of the list of information associated with email messages.

26. The computer readable storage medium of claim 18, including instructions which when executed, cause the device to:
   detect a gesture in the search input area; and
   in response to detecting the gesture in the search input area, display a keyboard for entering the search query, and display a plurality of search scope limiter icons, wherein in response to detecting a selection gesture on a respective search scope limiter icon, the scope of the search query is limited in accordance with the respective search scope limiter icon.

27. The computer readable storage medium of claim 18, including instructions which when executed, cause the device to:
   detect a top edge of the search input area being crossed while translating the application interface region in the first direction while the object is still detected on or near the touch screen display;
   in response to detecting the top edge of the search input area being crossed while translating the application interface region in the first direction while the object is still detected on or near the touch screen display, display an area adjacent to the top edge of the search input area;
   cease to detect the object on or near the touch screen display; and
   in response to ceasing to detect the object on or near the touch screen display, translate the search input area and the application interface region in a second direction until the area adjacent to the top edge of the search input area is no longer displayed, and continue to display the search input area.

28. The computer readable storage medium of claim 18, including instructions which when executed, cause the device to:
   detect a top edge of the search input area being crossed while translating the application interface region in the first direction while the object is still detected on or near the touch screen display;
   in response to detecting the top edge of the search input area being crossed while translating the application interface region in the first direction while the object is still detected on or near the touch screen display, display an area between the search input area and the application interface region;
   cease to detect the object on or near the touch screen display; and
   in response to ceasing to detect the object on or near the touch screen display, translate the application interface region in a second direction until the area between the search input area and the application interface region is no longer displayed, and continue to display the search input area.

29. The computer readable storage medium of claim 18, including instructions which when executed, cause the device to display a plurality of user-selectable search scope limiters adjacent to the search input area.

30. The computer readable storage medium of claim 18, wherein the application interface region comprises a scrollable list and the edge of the application region comprises a terminus of the list.

31. The computer readable storage medium of claim 18, wherein the application is an email client application, the application interface region comprises a scrollable list of information associated with email messages, and the edge of the application region comprises a top boundary of the list of information associated with email messages.

32. A method, comprising:
   on a portable multifunction device having a touch screen display, while displaying an application interface of an application on the touch screen display,
      detecting a movement of a contact on the touch screen display;
      in response to detecting the movement of the contact, translating an application interface region displayed on the touch screen display in a first direction;
      detecting an edge of the application interface region being crossed while translating the application interface region in the first direction in accordance with the movement of the contact on the touch screen display; and
      in response to the edge of the application interface region being crossed while translating the application interface region in the first direction:
         displaying the edge of the application interface region; and
         displaying a search input area in an area beyond the application interface region, wherein the search input area is for entering a search query for the application.

33. A portable multifunction device, comprising:
   a touch screen display;
   one or more processors;
   memory; and one or more programs, wherein the one or more programs are stored in the memory and configured to be executed by the one or more processors, the one or more programs including instructions for:
  detecting a movement of a contact on the touch screen display;
  in response to detecting the movement of the contact, translating an application interface region displayed on the touch screen display in a first direction;
  detecting an edge of the application interface region being crossed while translating the application interface region in the first direction in accordance with the movement of the contact on the touch screen display; and
  in response to the edge of the application interface region being crossed while translating the application interface region in the first direction:
    displaying the edge of the application interface region; and
    displaying a search input area in an area beyond the application interface region, wherein the search input area is for entering a search query for the application.

34. A non-transitory computer readable storage medium having stored therein instructions, which when executed by a portable multifunction device with a touch screen display, cause the device to:
  detect a movement of a contact on the touch screen display;
  in response to detecting the movement of the contact, translate an application interface region displayed on the touch screen display in a first direction;
  detect an edge of the application interface region being crossed while translating the application interface region in the first direction in accordance with the movement of the contact on the touch screen display; and
  in response to the edge of the application interface region being crossed while translating the application interface region in the first direction:
    display the edge of the application interface region; and
    display a search input area in an area beyond the application interface region, wherein the search input area is for entering a search query for the application.

* * * * *